US007055096B2

(12) United States Patent
Namioka

(10) Patent No.: US 7,055,096 B2
(45) Date of Patent: May 30, 2006

(54) DATA INTEGRATE SYSTEM AND DATA INTEGRATE METHOD

(75) Inventor: Yasuo Namioka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 612 days.

(21) Appl. No.: 10/134,531

(22) Filed: Apr. 30, 2002

(65) Prior Publication Data

US 2002/0178192 A1 Nov. 28, 2002

(30) Foreign Application Priority Data

May 1, 2001 (JP) ............................ 2001-134572
May 1, 2001 (JP) ............................ 2001-134573

(51) Int. Cl.
*G06F 17/21* (2006.01)

(52) U.S. Cl. ...................................... 715/523; 715/524

(58) Field of Classification Search ................ 715/523, 715/524, 513

See application file for complete search history.

(56) References Cited

U.S. PATENT DOCUMENTS 5,768,521 A * 6/1998 Dedrick ...................... 709/224
5,970,490 A * 10/1999 Morgenstern ................ 707/10
6,195,662 B1 * 2/2001 Ellis et al. .............. 707/103 R
6,308,178 B1 * 10/2001 Chang et al. ............... 707/100
6,397,232 B1 * 5/2002 Cheng-Hung et al. ...... 715/523
6,453,356 B1 * 9/2002 Sheard et al. ............... 709/231
6,470,333 B1 * 10/2002 Baclawski ..................... 707/3
6,523,172 B1 * 2/2003 Martinez-Guerra et al. . 717/143
6,728,758 B1 * 4/2004 Sato ........................... 709/206
6,742,054 B1 * 5/2004 Upton, IV ..................... 710/6
6,792,431 B1 * 9/2004 Tamboli et al. ............. 707/102
6,847,384 B1 * 1/2005 Sabadell et al. ............ 345/672

FOREIGN PATENT DOCUMENTS

JP 2-204862 8/1990
JP 10-269285 10/1998

* cited by examiner

*Primary Examiner*—Heather R. Herndon
*Assistant Examiner*—Peter J. Smith
(74) *Attorney, Agent, or Firm*—Oblon, Spivak, McClelland, Maier & Neustadt, P.C.

(57) ABSTRACT

There is disclosed a translation apparatus 1 which obtains a plurality of data/information concerning a manufacturing managed by mutually different formats in a plurality of quality control apparatuses 5-1 to **5-*n*, integrates these data/information and translates the data/information into data/information to be handled in common in the plurality of quality control apparatuses 5-1 to 5-*n***.

1 Claim, 49 Drawing Sheets

| Data classification 1 | Data classification 2 | Data classification 3 |
|---|---|---|
| MenteCent | Common | TableADMDF |

Relational DB

| Command | Element | Data | ··· |
|---|---|---|---|
| Update Element | /translation method dictionary/translation method[data classification 1=JPNCorp and data classification 2= Japanese and data classification 3=TableJ1]/ CreateORUpdateNode/CreateORUpdateElement/ Translate/GCodeDefSearchRoot | /product, part root/product, part category [GlobalCode= GPC] | ··· |
| AddNode | /translation method dictionary/translation method/ CreateORUpdate/CreateORUpdateNode/ CreateORUpdate Element | | |
| AddElement | /translation method dictionary/translation method/ CreateORUpdate/CreateORUpdateNode/ CreateORUpdate Element/ElementName | Local product model No. | |
| AddNode | /translation method dictionary/translation method/ CreateORUpdate/CreateORUpdateNode/ CreateORUpdate Element/Copy/ | /input data, information/ data set [$DS_current]/ data string [$DL_current] /product code | |
| AddElement | /translation method dictionary/translation method/ CreateORUpdate/CreateORUpdateNode/ CreateORUpdate Element/CopyFrom | | |

F I G. 9

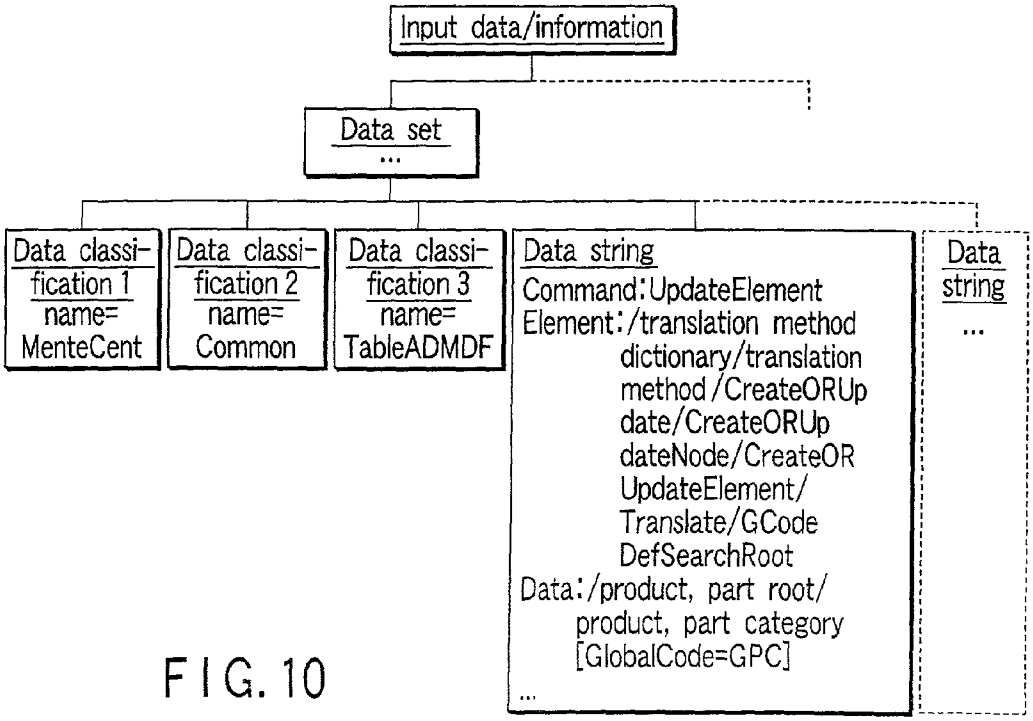

F I G. 10

```
<Products>
  <PCs>
    <Compact PCs>
      <Note PCs>
        <Note PC id=PRDCT-101111>
          <Product model>GT810</Product model>
          . . . .
        </Note PC>
        <Note PC id=PRDCT-******>
          . . . .
        </Note PC>
      </Note PCs>
      . . . .
    </Compact PCs>
  </PCs>
  <ODDs>
    <CD-ROM-Drives>
      <CD-ROM-Drive id=PRT-A1211001>
        <Product model>GT810</Product model>
        . . . .
      </CD-ROM-Drive>
      <CD-ROM-Drive id=PRT-********>
        . . . .
      </CD-ROM-Drive>
    </CD-ROM-Drives>
    . . . .
  </ODDs>
</Products>
```

FIG. 12

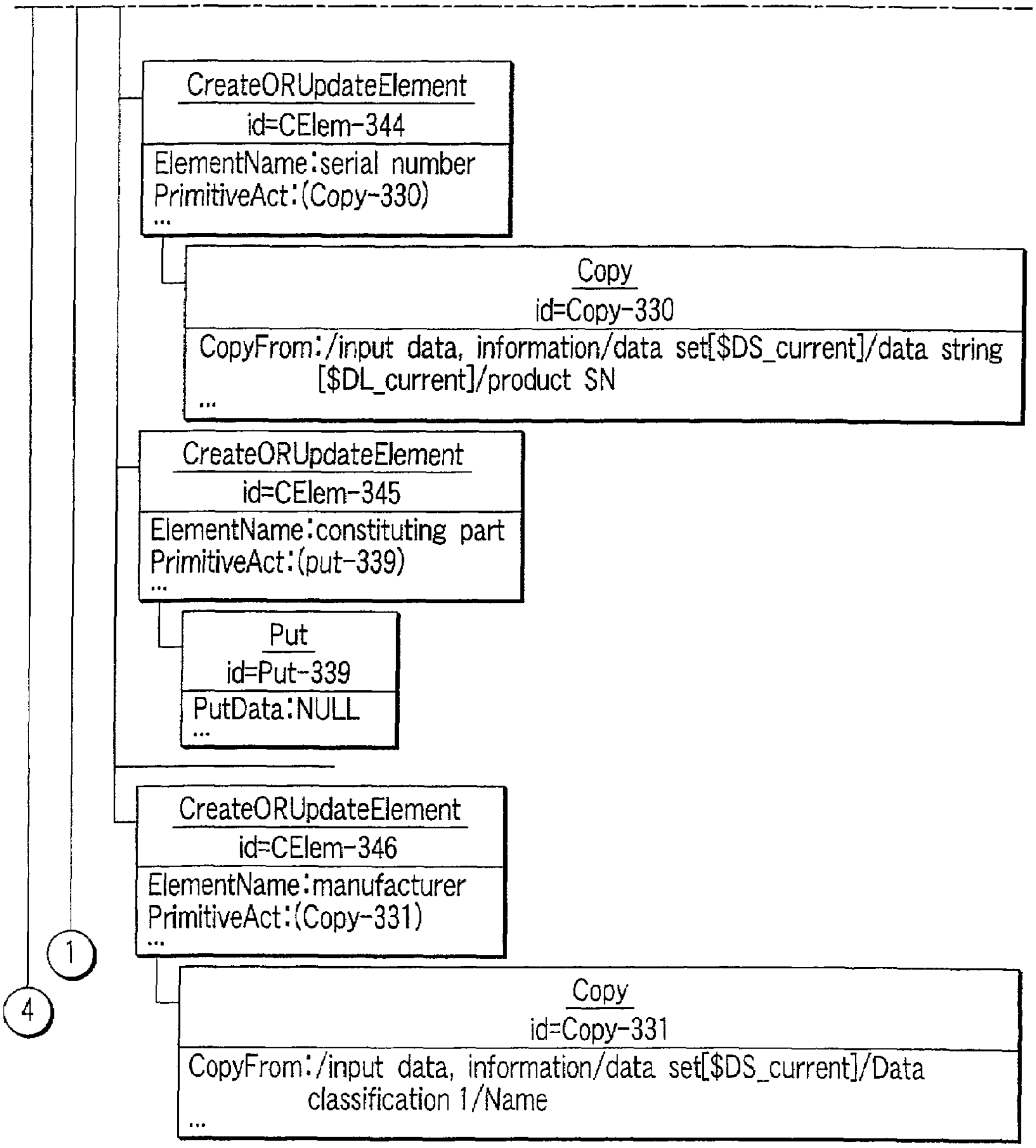
F I G. 15B

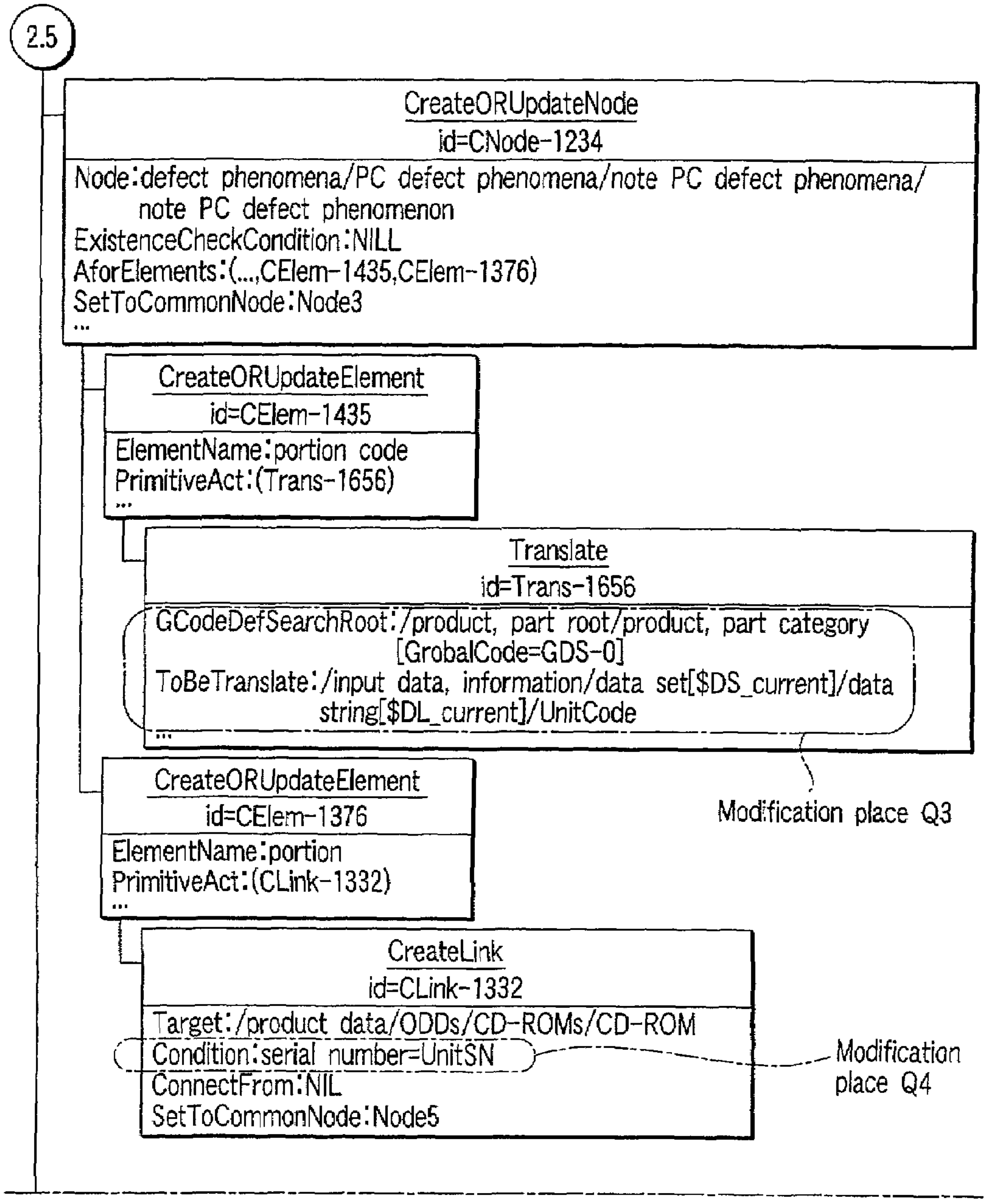
F I G. 23A

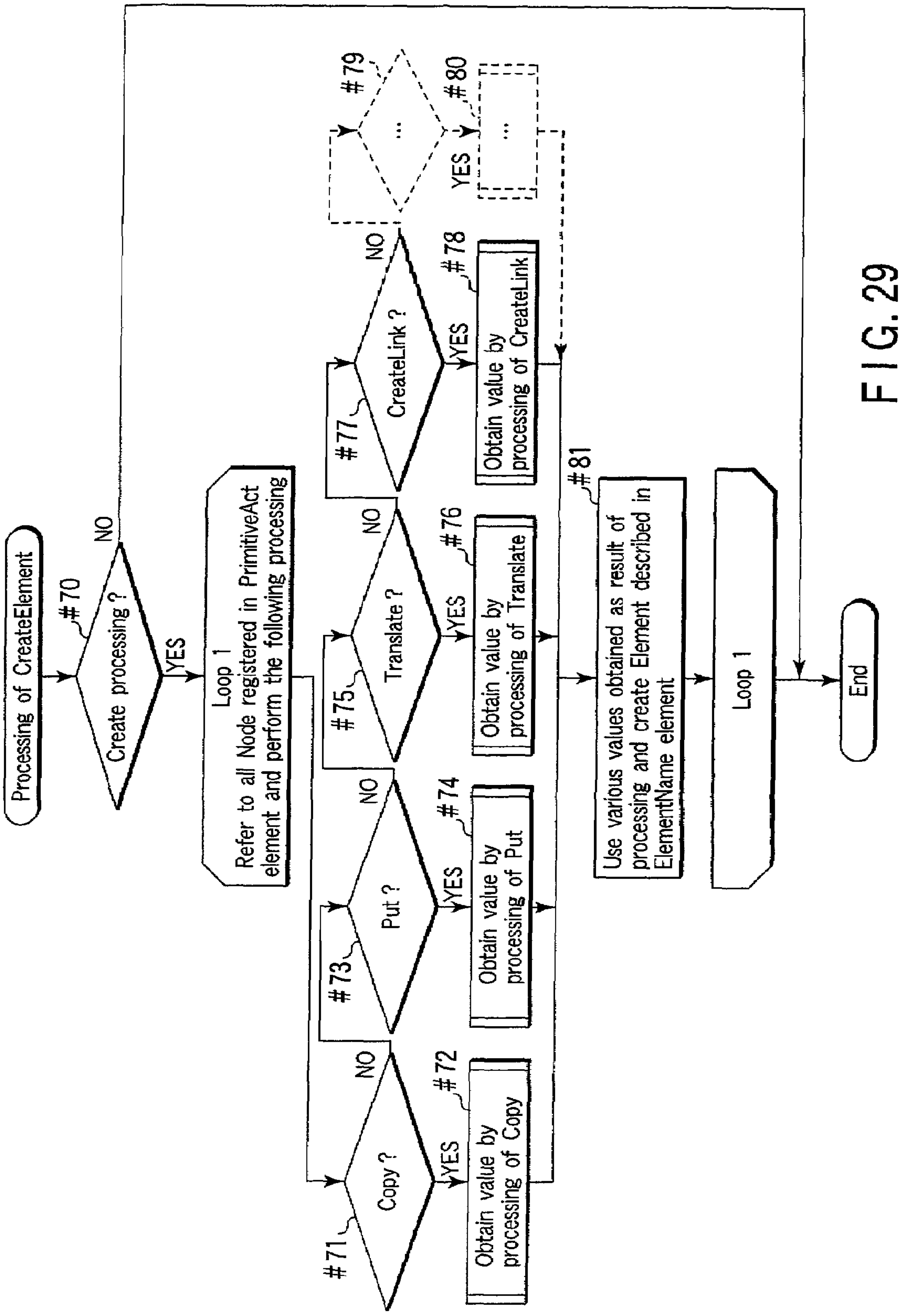
F I G. 29

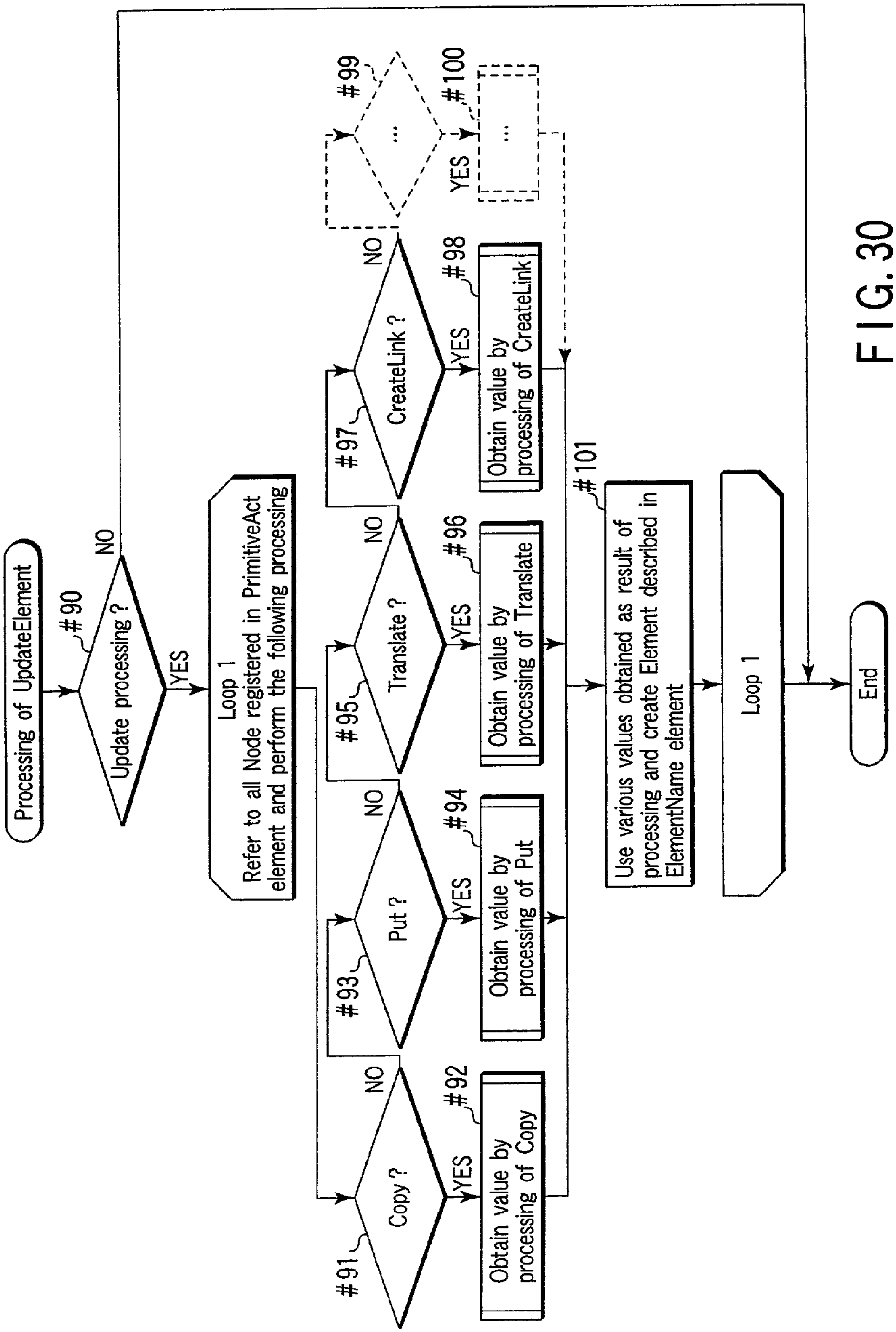
F I G. 30

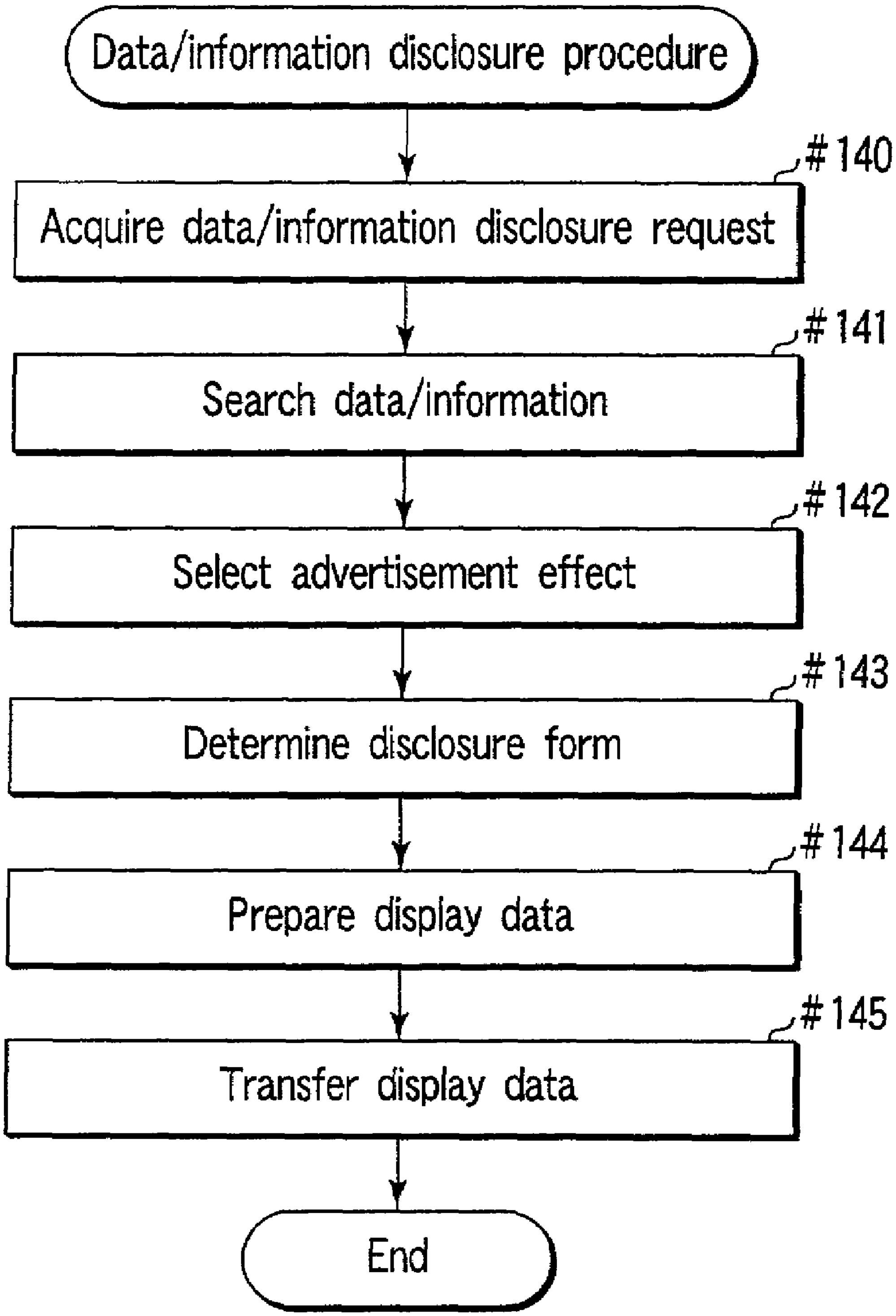
F I G. 38

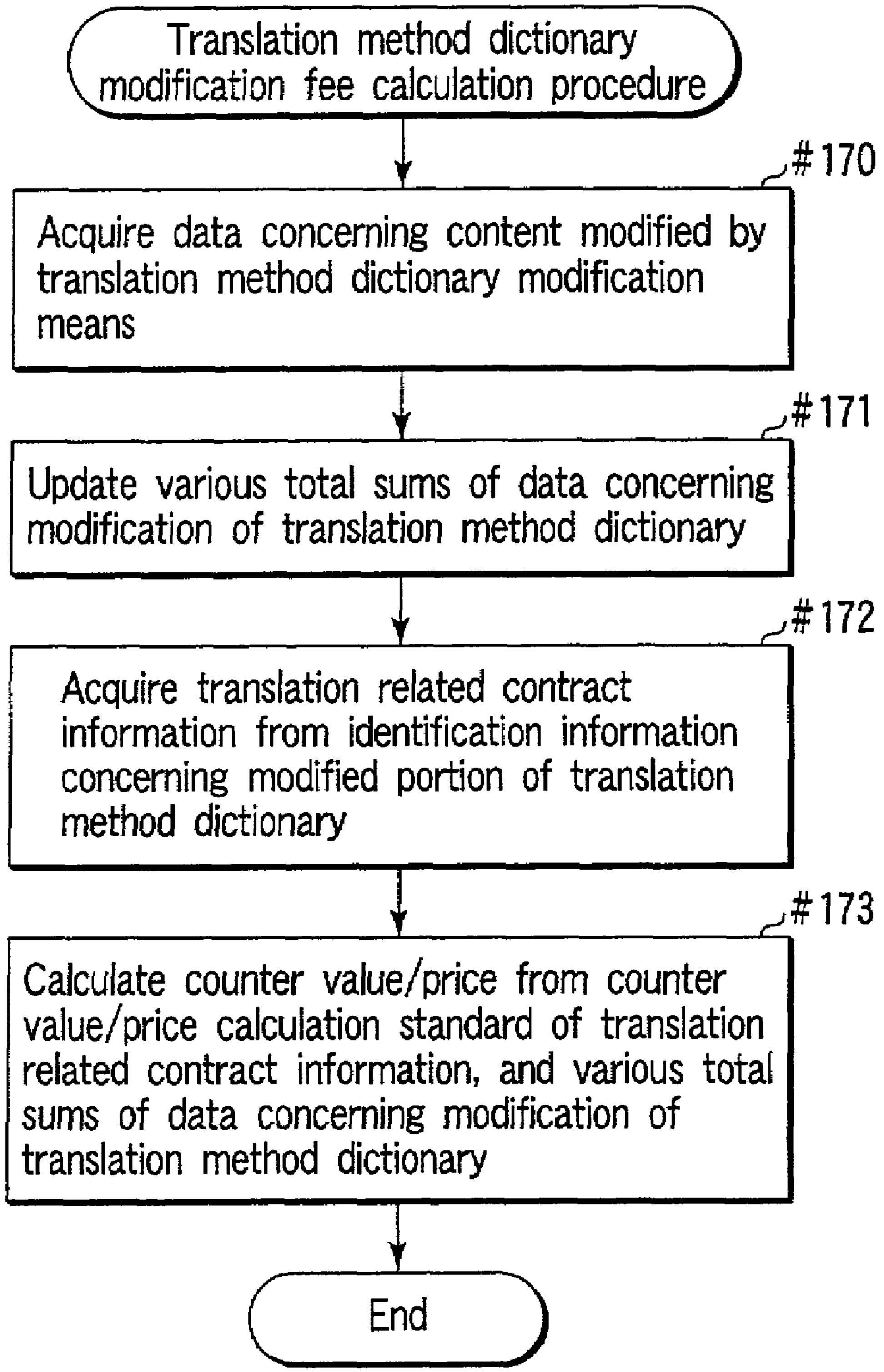
F I G. 41

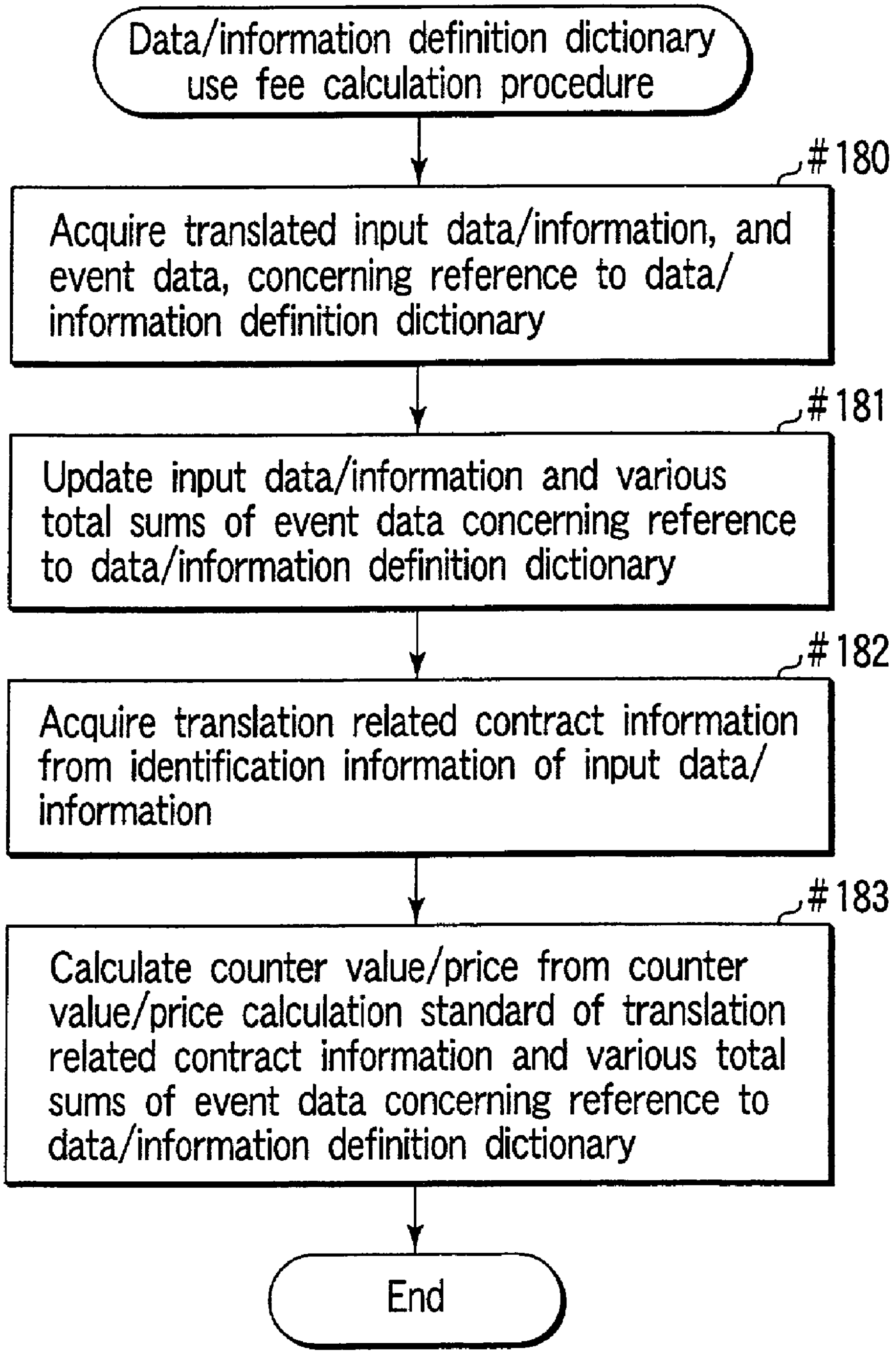
F I G. 42

DATA INTEGRATE SYSTEM AND DATA INTEGRATE METHOD

CROSS-REFERENCE TO RELATED APPLICATIONS

This application is based upon and claims the benefit of priority from the prior Japanese Patent Applications No. 2001-134572, May 1, 2001; and No. 2001-134573, May 1, 2001, the entire contents of both of which are incorporated herein by reference.

BACKGROUND OF THE INVENTION

1. Field of the Invention

The present invention relates to a data integrate system and data integrate method in which an organic link among a plurality of pieces of information generated by different various backgrounds such as nation, district, race, language, and development concept and having different data formats is held, and a plurality of pieces of information are handled in common among a plurality of information systems.

2. Description of the Background Art

Various information systems are constructed everywhere in contemporary society with a progress in computerization. In the information systems, there are many systems in which information to be handled is collected and accumulated in a database (hereinafter abbreviated as DB). Many pieces of the information held by the information system are defined/developed based on specific needs.

Therefore, the information of each information system includes a large amount of expertise information. The information system includes sufficient expertise and range of information for an original user involved in development in many cases. When the information is relatively accurately held/stored in various places, in a plurality of information systems, the information is allowed to transversely/longitudinally travel among the respective information systems, and the data is used and interchanged in a broader range. Thereby, there has been an increasing demand for the use of more sophisticated information.

A method of using the sophisticated information comprises: obtaining an access right to various information systems as data sources, for example, in some of investigation agencies; and individually accessing the various information systems. Moreover, the information collected from the various information systems is linked by high skills of investigators.

Elements constituting the sophisticated information system include a knowledge database. Researches have been conducted concerning the use of the data having transversely/longitudinally traveled among the respective systems having the knowledge database and the interchange of the knowledge. The researches are represented by Knowledge Interchange Format (KIF) developed by Knowledge Systems Laboratory (KSL) of Stanford University in the U.S. in 1990s. In the KIF the knowledge data is represented in a common format. In the KIF, the knowledge data is outputted in the common format, so that the knowledge data is shared.

There is a technique started from an object orientation database technique, and developed to share the data defined as an object. The technique includes Common Object Request Broker Architecture (CORBA) in which an inquiry format and transmitted/received data format are standardized.

In recent years, the data described using extensible Markup Language (XML) has been subjected to data conversion using a framework of extensible Stylesheet Language Transformation (XSLT) as one of specifications concerning the XML. Moreover, BizTalk server of Microsoft Co., Ltd. has also been brought into use.

However, in the various information systems, the respective pieces of information are represented by independent definitions, and independent classifications, code definitions, structures, evaluation standards and unit systems. Therefore, a plurality of pieces of information need to be translated into a common classification, code definition, structure, evaluation standard and unit system.

Very much cost is required in translating the plurality of pieces of information and accumulating/disclosing the information as a translated result.

That is, the information as the translation object tends to increase every moment. Moreover, a translation method and the definition of information daily change. Therefore, much cost is required in maintaining the information. Moreover, there are only a few individuals or organizations which can maintain the translation method and the definition of information by themselves under the present situations.

The respective pieces of information among the plurality of information systems are manually associated in many cases. The associated information is imparted among the translated information every time the information is translated/collected. However, the imparting of the related information requires very much cost, and is not practical.

The respective pieces of information of the individual information systems are totaled on the same standards and used in data analysis. Even an operation of the data analysis requires very much cost, and is not practical.

The respective pieces of information of the plurality of information systems are synthesized with the common standard/index and new information is prepared. Even the preparing of the new information requires very much cost and is not practical.

The unnecessary information is selected with the common standard/index and deleted. Even this deleting operation requires very much cost.

Therefore, with the daily change of the common classification, code definition, structure, evaluation standard, and unit system of each information, it is very expensive to maintain and associate the once translated/collected data/information with a new classification, code definition, structure, evaluation standard, and unit system.

Additionally, it is also difficult to quantitatively represent an additional value and counter value with respect to a translating operation.

BRIEF SUMMARY OF THE INVENTION

An object of the present invention is to little modify a plurality of information systems, translate each information from the plurality of information systems, and organically link and flexibly integrate the respective pieces of information which are to be originally associated with one another.

According to a major aspect of the present invention, there is provided a data integrate system comprising: an information obtaining section to obtain at least one piece of first information managed by mutually different formats; and a translation apparatus to integrate the first information obtained by the information obtaining section, and to translate a plurality of pieces of first information into second information which can be handled in common.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 9 is a schematic diagram showing one example of the original format of the data/information for use in maintaining a translation method dictionary;

FIG. 10 is a data structure diagram of the data/information for use in maintaining the translation method dictionary;

FIG. 12 is a diagram showing XML represented by nesting a tag;

FIG. 29 is a flowchart showing a processing of CreateElement;

FIG. 30 is a flowchart showing a processing of UpdateElement;

FIG. 31 is a flowchart showing the procedure of the processing in a case in which Copy is referred to;

FIG. 32 is a flowchart showing the procedure of the processing in a case in which Put is referred to;

FIG. 33 is a flowchart showing the procedure of the processing in a case in which Translate is referred to;

FIG. 34 is a flowchart showing the procedure of the processing in a case in which CreateLink is referred to;

FIG. 36 is a flowchart showing the procedure of the processing in a case in which TranslateClassifiedCodes are referred to;

FIG. 38 is a flowchart of a data/information disclosure processing procedure;

FIG. 41 is a flowchart of a procedure of a translation method dictionary modification fee calculation processing;

FIG. 42 is a flowchart of a procedure of data/information definition dictionary use fee calculation;

DETAILED DESCRIPTION OF THE INVENTION

One embodiment of the present invention will be described hereinafter with reference to the drawings.

Figure 1:
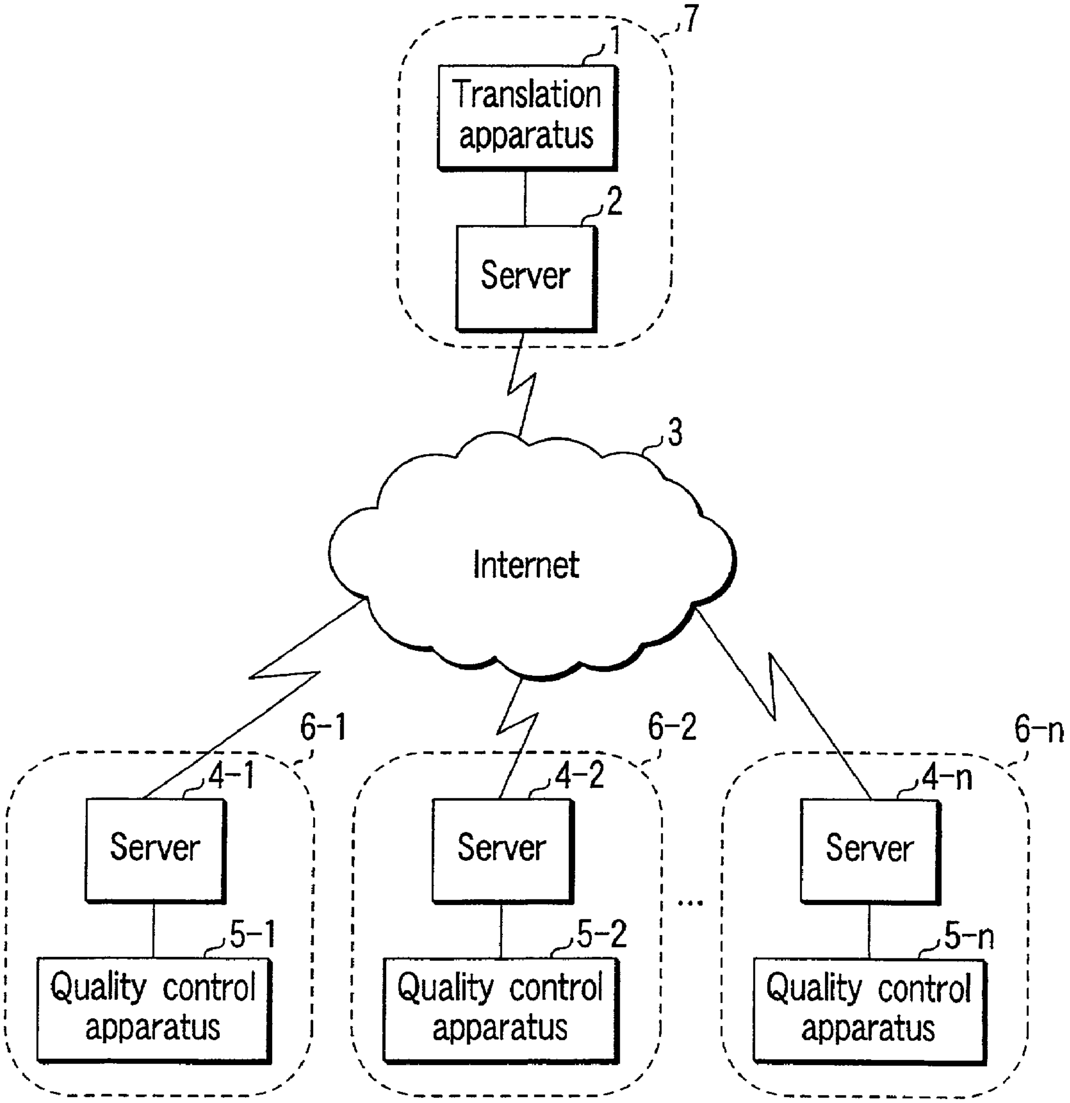
FIG. 1 is a whole constitution diagram of a manufacturing data integrate system according to one embodiment of the present invention.

FIG. 1 is a whole constitution diagram of a manufacturing data integrate system. A translation apparatus 1 is connected to Internet (communication circuit) 3 via a server 2. The Internet 3 is connected to a plurality of quality control apparatuses 5-1 to 5-n as various data systems via a plurality of servers 4-1 to 4-n.

The respective quality control apparatuses 5-1 to 5-n are disposed in installation districts 6-1 to 6-n of manufacturing facilities. Examples of the installation districts 6-1 to 6-n include business places in Japan, divisions in the business places, and business places in foreign countries.

The respective quality control apparatuses 5-1 to 5-n control data concerning product manufacturing in the business places in the installation districts 6-1 to 6-n.

The respective quality control apparatuses 5-1 to 5-n control the data in individual formats in the installation districts. The quality control apparatuses 5-1 to 5-n manage data/information in the formats based on different various backgrounds such as the business place in Japan, nation, district, race, language, and development concept.

The translation apparatus 1 receives the data from the quality control apparatuses 5-1 to 5-n via the Internet 3, translates and consolidates the data of the individual formats, and holds organic connection of data which are to be originally associated with one another, such as data of the same part or product. Examples of an installation district 7 of the translation apparatus 1 may include the business place in Japan and the business place in the oversea country.

The translation apparatus 1 executes various types of processing for translating the data handled in the quality control apparatuses 5-1 to 5-n. The translation apparatus 1 converts a structure of data, copies the data, supplements the data, converts numeric data in the information, performs calculation associated numeric value data in the information, converts a code of coded information, adds associated information among the information, and updates the information. Moreover, the translation apparatus 1 reconstitutes the information handled in the quality control apparatuses 5-1 to 5-n.

Figure 2A:
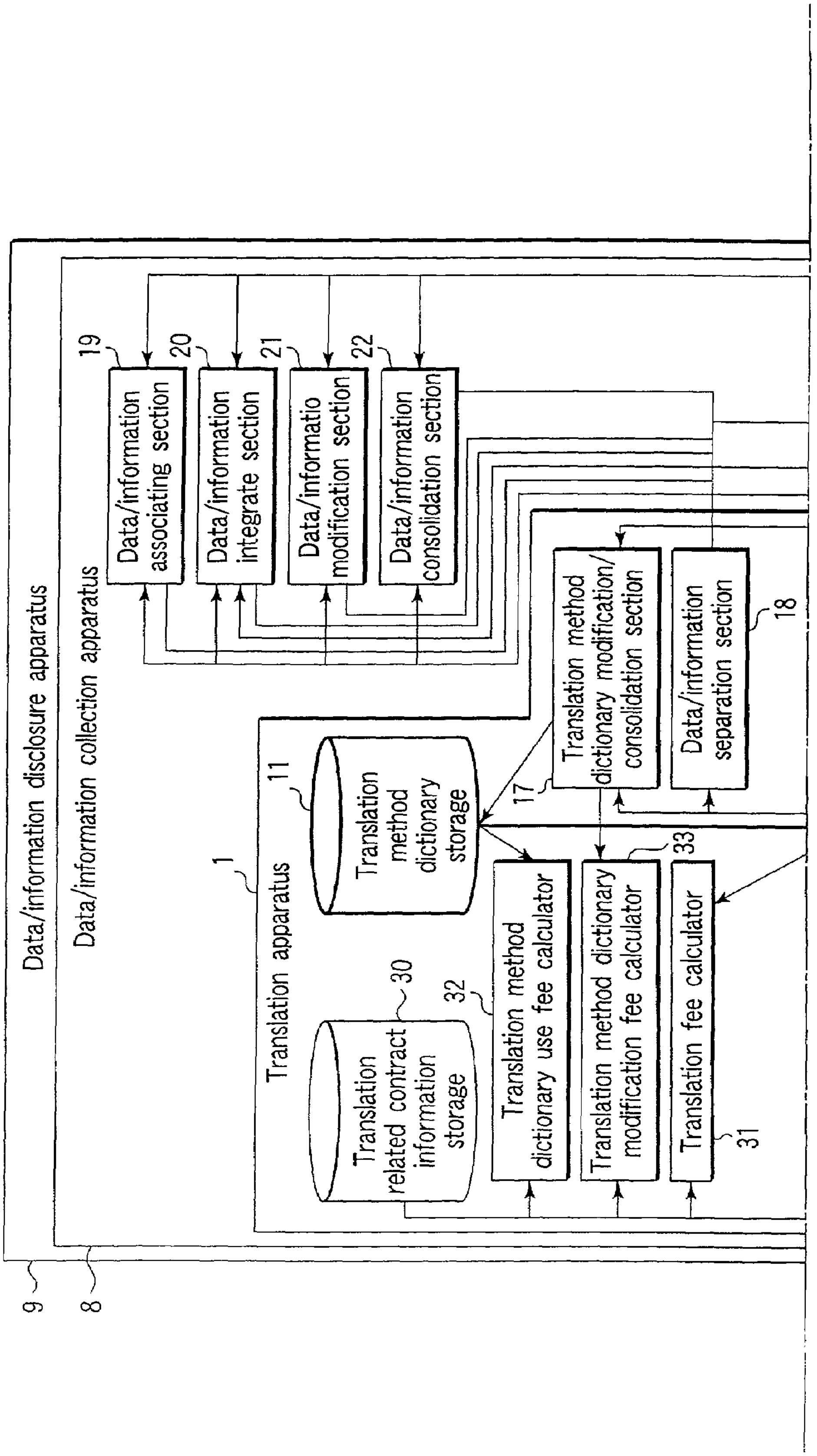
FIG. 2 is a whole constitution diagram of a translation apparatus according to one embodiment of the present invention.
Figure 2B:
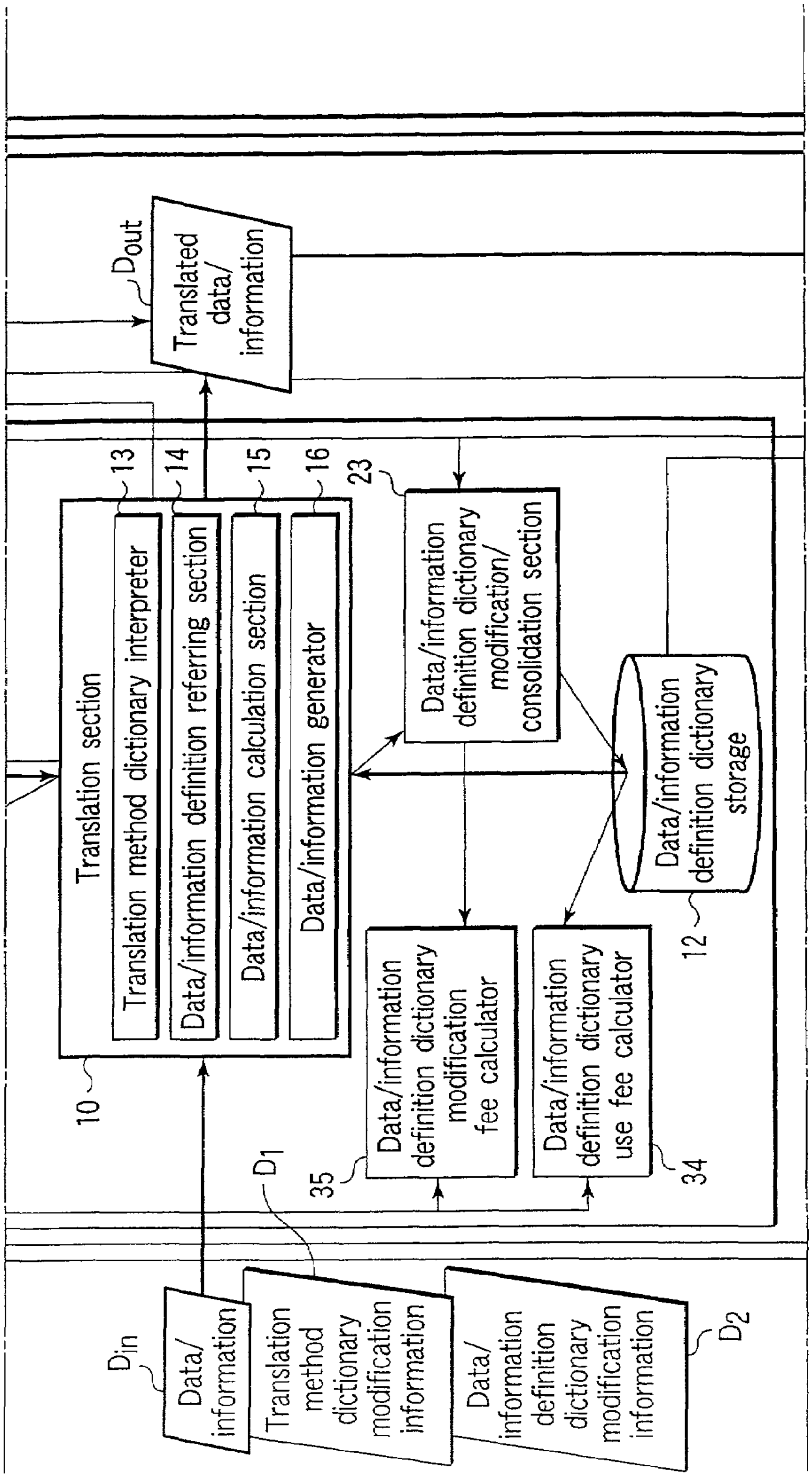
Figure 2C:
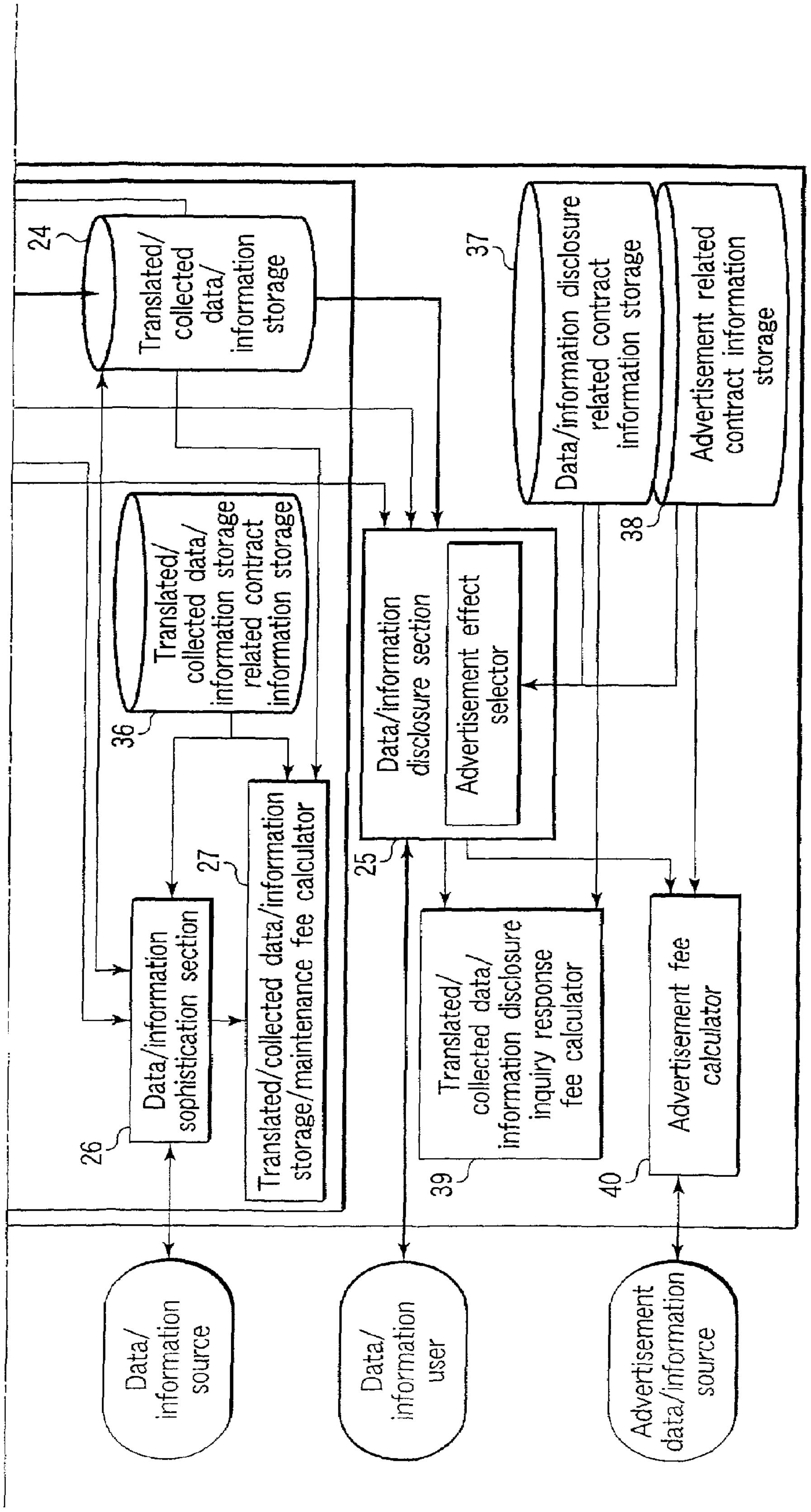

FIG. 2 is whole constitution diagrams of the translation apparatus 1. The translation apparatus 1 includes a data/information collection apparatus 8 and data/information disclosure apparatus 9.

The translation apparatus 1 includes a translation section 10 for performing translation of information Din from the quality control apparatuses 5-1 to 5-n, translation method dictionary storage 11 connected to the translation section 10, and data/information definition dictionary storage 12.

In the translation method dictionary storage 11, a translation method dictionary for translating the information Din is stored. The translation method dictionary is supplied to the translation section 10.

The translation method dictionary includes a method of modifying the translation method dictionary. The translation method dictionary includes a method of modifying a data/information definition dictionary stored in the data/information definition dictionary storage 12.

In the data/information definition dictionary storage 12, the data/information definition dictionary is stored. In the data/information definition dictionary, representing formats of a value for use in the information Din and information Din, and a value of information Dout for use in the information Dout indicating a result of translation in the translation section 10 and correspondence with the representing format of the information Dout are described. The data/information definition dictionary is supplied to the translation section 10.

The translation section 10 translates the information Din based on the translation method of the translation method dictionary stored in the translation method dictionary storage 11, and referring to the data/information definition dictionary stored in the data/information definition dictionary storage 12 if necessary, and outputs the information Dout as a translation result.

Additionally, the translation section 10 is constituted by a computer including a CPU, data memory, program memory, and the like. In the program memory, translation program is stored for translating the information Din based on the translation method dictionary, and translating the information Din referring to the data/information definition dictionary if necessary. The translation program is executed by a calculation processing of the computer.

The information Dout is stored in a translated/collected data/information storage 24.

Concretely, the translation section 10 includes: a translation method dictionary interpreter 13 for applying the translation method dictionary to a translation processing; a data/information definition referring section 14 for referring to the data/information definition stored in the data/information definition dictionary storage 12; a data/information generator 15 for preparing different information from the information Din having each format based on the translation method dictionary and data/information definition dictionary; and a data/information calculation section 16 for subjecting the information Din having each format to various types of calculation processing if necessary.

The information Din may include either one or both of translation method dictionary modification information $D_1$ for modifying the translation method dictionary stored in the translation method dictionary storage 11, and data/information definition dictionary modification information $D_2$ stored in the data/information definition dictionary storage 12.

To expand a translation function, the translation section 10 is connected to a translation method dictionary modification/consolidation section 17, data/information separation section 18, data/information associating section 19, data/information integrate section 20, data/information modification section 21, data/information consolidation section 22, and data/information definition dictionary modification/consolidation section 23.

When the information Din concerning the modification of the translation method dictionary stored in the translation method dictionary storage 11 is obtained in the process of translation of the information Din, the translation method dictionary modification/consolidation section 17 modifies the translation method dictionary based on the obtained modification information.

When a necessity of dividing the information Din into a plurality of contents and preparing a plurality of translated pieces of information Dout is generated in the process of translation of the information Din, the data/information separation section 18 prepares information of division if necessary, and adds the information of division to the translated information Dout.

When association is generated between the translated information Dout, between the information Dout stored in the translated/collected data/information storage 24, and between the information Dout and the information Dout stored in the translated/collected data/information storage 24 in the process of translation of the information Din, the data/information associating section 19 prepares information indicating the association, and adds the information indicating the association to the translated information Dout.

The data/information integrate section 20 obtains the information Dout which can be integrated from the already translated/collected information Dout, and integrates the information with the existing information Dout in the process of translation of the information Din. The information Dout to be integrated may include the data/information totaled based on classification concerning various events/objects.

When a necessity of modifying the information Dout stored in the translated/collected data/information storage 24 is generated in the process of translation of the information Din, the data/information modification section 21 prepares modification information for modifying the information Dout, and adds the modification information to the translated information Dout.

When consolidation information concerning consolidation of the information Dout stored in the translated/collected data/information storage 24 is obtained in the process of translation of the information Din, the data/information consolidation section 22 adds the consolidation information to the translated information Dout.

When the modification information concerning the modification of the data/information definition dictionary stored in the data/information definition dictionary storage 12 is obtained in the process of translation of the information Din, the data/information definition dictionary modification/consolidation section 23 modifies the data/information definition dictionary based on the modification information.

Therefore, depending on the translation content during the translation of the information Din, the translation section 10 appropriately calls at least one of the translation method dictionary modification/consolidation section 17, data/information separation section 18, data/information associating section 19, data/information integrate section 20, data/information modification section 21, data/information consolidation section 22, and data/information definition dictionary modification/consolidation section 23, and expands the translation function.

Additionally, the data/information associating section 19, data/information integrate section 20, data/information modification section 21, data/information consolidation section 22, data/information definition dictionary modification/consolidation section 23, and translated/collected data/information storage 24 are disposed in the data/information collection apparatus 8. The data/information collection apparatus 8 also includes a data/information sophistication section 26.

In the translated/collected data/information storage 24, the translated information Dout is stored. When information concerning an updating/consolidating processing for the stored information Dout is included, the translated/collected data/information storage 24 executes the updating/consolidating processing for the information Dout.

The translated/collected data/information storage 24 supplies the stored information Dout to a data/information disclosure section 25, supplies the stored information Dout to the data/information modification section 21, and executes a modification processing requested by the data/information modification section 21.

The data/information sophistication section 26 monitors freshness of the information Dout stored in the translated/collected data/information storage 24, and notifies a supplier (data/information source) of the information Dout of a drop of freshness, if there is information Dout having the drop of freshness.

The freshness of the information can be judged from various viewpoints concerning maintenance of the data, such as a time elapsed since the preparation of the information Dout, and consistency with the classification, code definition, structure, evaluation standard, and unit system of the information Dout on the translated/collected data/information storage 24.

The data/information sophistication section 26 modifies the value of the information Dout stored in the translated/collected data/information storage 24 based on the interchange with the information source.

The data/information sophistication section 26 modifies the translation method dictionary stored in the translation method dictionary storage 11, and the data/information definition stored in the data/information definition dictionary storage 12.

The data/information sophistication section 26 judges the freshness of the translation method dictionary stored in the translation method dictionary storage 11 and data/information definition stored in the data/information definition dictionary storage 12.

The data/information sophistication section 26 supplies service information concerning the maintenance of the freshness of the information Dout to a translated/collected data/information storage/maintenance fee calculator 27.

The data/information disclosure section 25 is disposed in the data/information disclosure apparatus 9. The data/information disclosure section 25 refers to the information Dout stored in the translated/collected data/information storage 24 and notifies the information, for example, displays the information to a display, or sends the information to the quality control apparatuses 5-1 to 5-n through the Internet 3.

In this case, the data/information disclosure section 25 directly refers to and notifies the translated information Dout, processes and notifies the information Dout to be referred to if necessary, or notifies data useful for advertisement or link information to the data useful for the advertisement during the display of the information Dout.

The data/information disclosure section 25 disposes a calculation standard concerning a processing of producing an advertisement effect, when the processing of indirectly producing the advertisement effect is performed by a notification method of the information Dout to notify, not by direct advertisement data.

Examples of the processing of producing the advertisement effect include: adjustment of a display size of the information Dout during the notification of the information Dout; application of symbols and marks which easily and visually attract attentions; adjustment of a display order; adjustment of a notification timing; repeated notification; rendition for attracting attentions using image and sound during the information notification; and the like.

The data/information disclosure section 25 totals and classifies a plurality of pieces of information Dout, for example, classifies, totals and displays the information by classifications of dates, products, parts, phenomena, treatments, steps and transmitters, when reading the information Dout stored in the translated/collected data/information storage 24 and displaying the information in the display.

Functions for calculating a fee of translation will next be described.

The translation apparatus 1 includes a translation related contract information storage 30. In the translation related contract information storage 30, translation related contract information as contract information for receiving a service of translation processing using the translation section 10 is stored.

The translation related contract information includes the access right to the translation section 10, standard of price calculation, and the like. The information of the standard of price calculation includes an amount of information Din to be translated, startup unit price and use time unit price of various sections started by the translation section 10 during an translating operation, time or period unit price of the translation service, and the like.

The translation related contract information storage 30 is referred to by a translation fee calculator 31 for calculating the counter value to the service related to the translation, translation method dictionary use fee calculator 32, translation method dictionary modification fee calculator 33, data/information definition dictionary use fee calculator 34, and data/information definition dictionary modification fee calculator 35.

The translation fee calculator 31 prepares information concerning the counter value to the translation processing by use situations of the translation section 10. The translation section 10 may call and execute the use situations of the translation method dictionary use fee calculator 32, translation method dictionary modification fee calculator 33, data/information definition dictionary use fee calculator 34 and data/information definition dictionary modification fee calculator 35 as calculation objects of the counter value.

The translation fee calculator 31 changes a method of calculating the price, charging destination, bill collection method, and the like by the translation method dictionary use fee calculator 32, translation method dictionary modification fee calculator 33, data/information definition dictionary use fee calculator 34 or data/information definition dictionary modification fee calculator 35 called by the translation section 10.

The translation method dictionary use fee calculator 32 prepares the information concerning the calculation of the dictionary use fee by the use situations of the translation method dictionary stored in the translation method dictionary storage 11. The standards of the counter value/price calculation include a unit price concerning the number of accesses during the using of the translation method dictionary, unit price of the data size with the translation method described therein, unit price based on a content of the translation method, and unit price of a use time or period.

The translation method dictionary modification fee calculator 33 prepares counter value data by situations in which the translation method dictionary stored in the translation method dictionary storage 11 is modified. The standards of the counter value/price calculation include the unit price concerning the number of accesses during the modifying of the translation method dictionary, unit price of the data size transmitted for the modification of the translation method, unit price based on a modification content of the translation method, and unit price of the use time or period.

The data/information definition dictionary use fee calculator 34 prepares the information concerning the counter value by the use situations of the data/information definition dictionary stored in the data/information definition dictionary storage 12. The standards of the counter value/price calculation include the unit price concerning the number of accesses during the using of the data/information definition dictionary, unit price of the data size with the data/information definition described therein, unit price based on the content of the data/information definition, and unit price of the use time or period.

The data/information definition dictionary modification fee calculator 35 prepares the counter value data by the situations in which the data/information definition dictionary stored in the data/information definition dictionary storage 12 is modified. The standards of the counter value/price calculation include the unit price concerning the number of accesses during the modifying of the data/information definition dictionary, unit price of the data size transmitted for the modification of the data/information definition, unit price based on the modification content of the data/information definition, and unit price of the use time or period.

Moreover, the data/information collection apparatus 8 includes the translated/collected data/information storage/maintenance fee calculator 27 and translated/collected data/information storage related contract information storage 36.

In the translated/collected data/information storage related contract information storage 36, translated/collected data/information storage related contract information, such as the counter value/price calculation standards, is stored.

The translated/collected data/information storage/maintenance fee calculator 27 detects the use situations of the information Dout stored in the translated/collected data/information storage 24, and calculates the storage/maintenance fee of the information Dout based on the use situations and the translated/collected data/information storage related contract information stored in the translated/collected data/information storage related contract information storage 36.

The translated/collected data/information storage/maintenance fee calculator 27 receives the service information concerning the freshness maintenance of the information Dout obtained by the data/information sophistication section 26, and calculates the counter value/price based on the translated/collected data/information storage related contract information stored in the translated/collected data/information storage related contract information storage 36.

Furthermore, the data/information disclosure apparatus 9 includes a data/information disclosure related contract information storage 37, advertisement related contract information storage 38, translated/collected data/information disclosure inquiry response fee calculator 39, and advertisement fee calculator 40.

In the data/information disclosure related contract information storage 37, the data/information disclosure related contract information for notifying the information Dout by the data/information disclosure section 25 is stored.

In the advertisement related contract information storage 38, advertisement related contract information for notifying the information Dout and producing the advertisement effect is stored.

The translated/collected data/information disclosure inquiry response fee calculator 39 calculates the counter value/price based on various uses of the translated/collected data via the data/information disclosure section 25. The calculation standards of the counter value/price set the unit price based on the amount of information and the type of processing in a time of notification, and the unit price based on the use time or period.

The translated/collected data/information disclosure inquiry response fee calculator 39 may set a fee structure based on a disclosed content of the information Dout, and items associated with a setting of use environment as to whether or not to display the advertisement. The setting of the fee structure is differentiated. For example, a case in which the advertisement may be displayed is set to be more inexpensive than a case in which the display of advertisement is rejected.

The advertisement fee calculator 40 prepares information concerning the counter value based on the data useful for the advertisement, or disclosure situations for the link information for obtaining the data useful for the advertisement in using the data/information disclosure section 25 to transmit/receive the information Dout.

The calculation standards of the counter value/price are used such as the unit price based on a type of the data useful for the advertisement, number of disclosures of advertisement data, disclosure frequency, disclosure destination, or arrangement of the data useful for the advertisement.

Moreover, to perform the processing for producing the advertisement effect indirectly by the disclosure method of the data/information to be disclosed, not directly by the advertisement data, the calculation standards concerning the processing for producing the indirect advertisement effect may be disposed.

Concrete structures of the data/information Din, translation method dictionary, and data/information definition dictionary will next be described.

The information Din is sent to the translation apparatus 1 via the Internet 3 from the quality control apparatuses 5-1 to 5-n installed in the installation districts 6-1 to 6-n. Each information Din has a different format.

Figure 3:
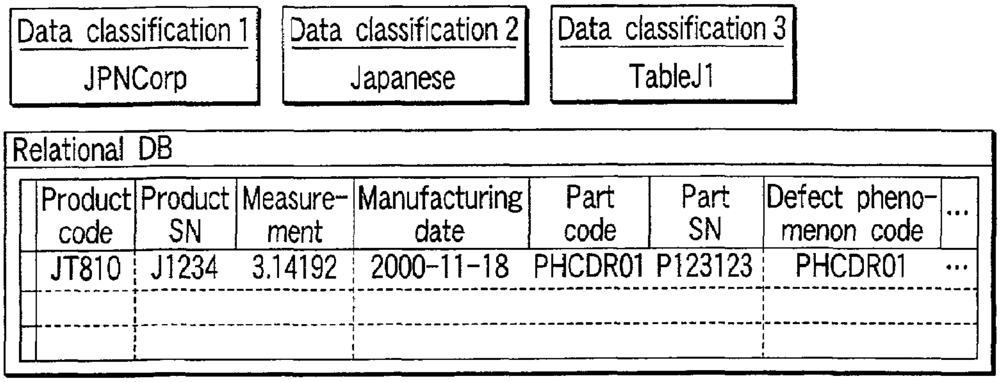
FIG. 3 is a schematic diagram showing one example of an original format of information inputted into the translation apparatus.

FIG. 3 is a schematic diagram showing one example of an original format of the information Din inputted into the translation section 10 of the translation apparatus 1. It is assumed that the information Din is sent, for example, from the quality control apparatus 5-1. The original information Din is represented by the format of a table of a relational database or a work sheet of table calculation software.

The representing format of the information Din is not limited in data structure as long as the information Din can easily be referred to in the format. Examples of data format include data of an object format as seen in a concept of object orientation, text data described in XML, and data having a Document Object Model (DOM) format as one representing format on a calculator memory of the data described in the XML.

Information for identifying the information Din is information for specifying the format of the information Din or the type of the information Din. Even if identification data is not especially added, the data/information Din can be identified from a timing or arrival order of input of the information Din into the translation section 10, or the data/information Din. In this case, it is unnecessary to especially add the identification data.

Examples of the information Din with respect to a product having a product code JT810 shown in FIG. 3 will be described. In the information Din, data classifications “1”, “2”, “3” are used as data to identify the information Din.

In the information Din, for example, a corporation and language for use in the installation districts 6-1 to 6-n as the sources of the information Din, and table name of original data are used as the identification data.

For example, the data classification “1” is JPNCorp, “2” is Japanese, and “3” is TableJ1.

In the information Din, a data string is formed of a product code, product SN, measured value, manufacturing date, part code, part SN, defect phenomenon code, and the like.

Figure 4:
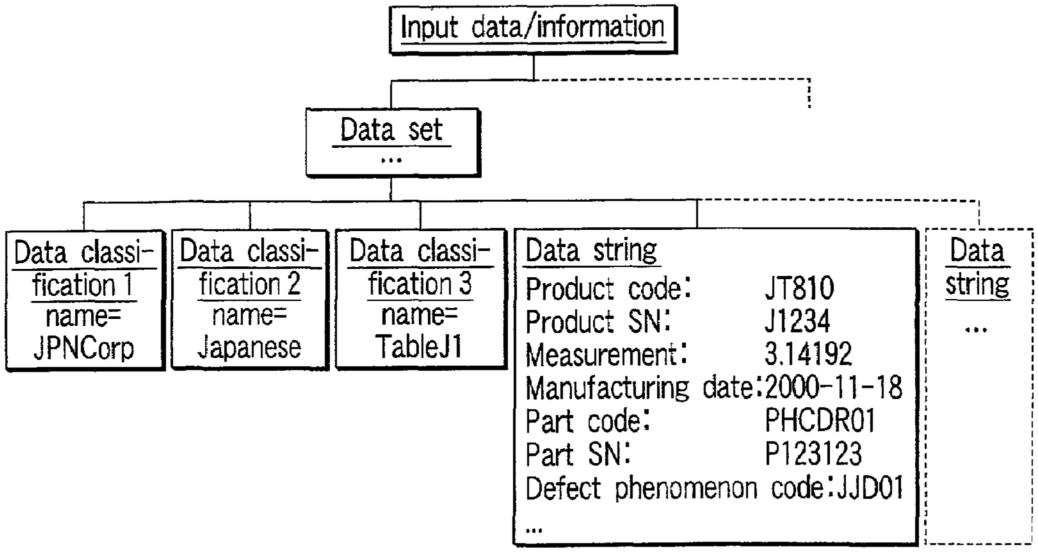
FIG. 4 is a data structure diagram in a manufacturing data integrate system according to one embodiment of the present invention.

FIG. 4 is a data structure diagram of the original data/information Din shown in FIG. 3. The information Din is represented as a data structure in a type of tree structure. For the information Din, a data set is constituted every information (the data classifications “1”, “2”, “3”) for identifying the original data, and every group of data identified by the information. THE information Din can also include even the data set having different identification information.

As described above, in the present embodiment, the content and identification information of the original data are held in the same tree structure in the data structure. This is not limited. In the present embodiment, as long as the content of the original data can easily be referred to and the data identification information can be referred to if necessary, the content of the original data and the identification information of the original data may be handled in separate data structures.

In the example of the information Din, the original data for one record is held as one data string in the data set, but any data structure in which the content of data can easily be referred to may be used. That is, the data of the original table format may be referred to as such.

Figure 5:
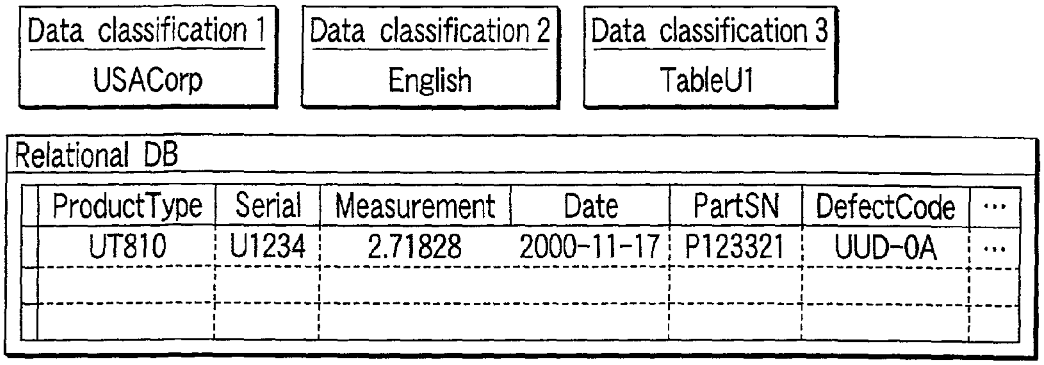
FIG. 5 is a schematic diagram showing one example of the original format of another information inputted into the translation apparatus.

FIG. 5 is a schematic diagram showing one example of the original format of another information Din inputted into the translation section 10. The information Din is sent, for example, from the quality control apparatus 5-2. The information Din from the quality control apparatus 5-2 is similar to the information Din shown in FIG. 3, but a column corresponding to the part code does not exist, the data identification information differs, and the column name of the table also differs.

The data classification “1” is, for example, USA Corp, “2” is English, and “3” is Table U1.

In the information Din, the data string is formed of ProductType, Serial, Measurement, Data, PartSN, DefectCode, and the like.

Figure 6:
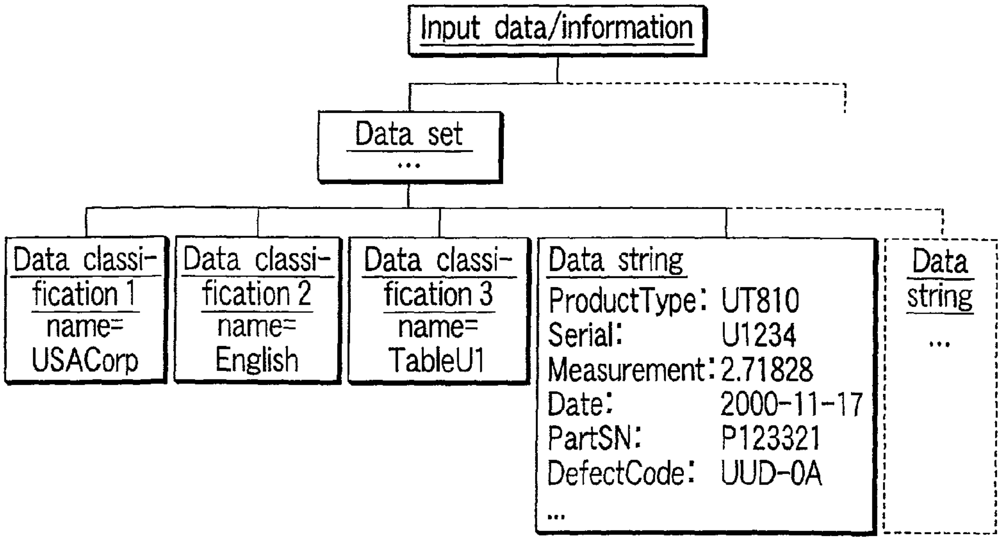
FIG. 6 is a data structure diagram of another data/information in the manufacturing data integrate system.

FIG. 6 is a data structure diagram of the original data/information Din shown in FIG. 5. The information Din is represented by one type of tree structure in the data structure. In the information Din, the data set is constituted for the information to identify the original data (the data classifications “1”, “2”, “3”) and every group of data identified by the information.

Figure 7:
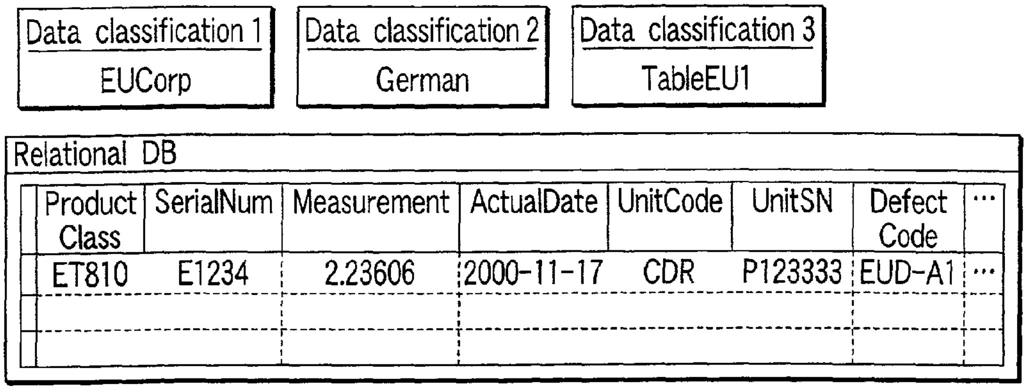
FIG. 7 is a schematic diagram showing one example of the original format of another information inputted into the translation apparatus.

FIG. 7 is a schematic diagram showing one example of the original format of another data/information Din inputted into the translation section 10. The information Din is sent, for example, from the quality control apparatus 5-n. The information Din from the quality control apparatus 5-n is similar to the information Din shown in FIG. 3.

The code inserted in the UnitCode column of the information Din is classified more roughly than the code inserted in the part code of the data of FIG. 3. This respect will be described later in detail. For the information Din, the data identification information differs, and the column name of the table also differs.

The data classification “1” is, for example, EU (Europe) Corp, “2” is German, and “3” is TableEU1.

In the information Din, the data string is formed of ProductClass, SerialNum, ActuaData, UnitCode, UnitSN, DefectCode, and the like.

Figure 8:
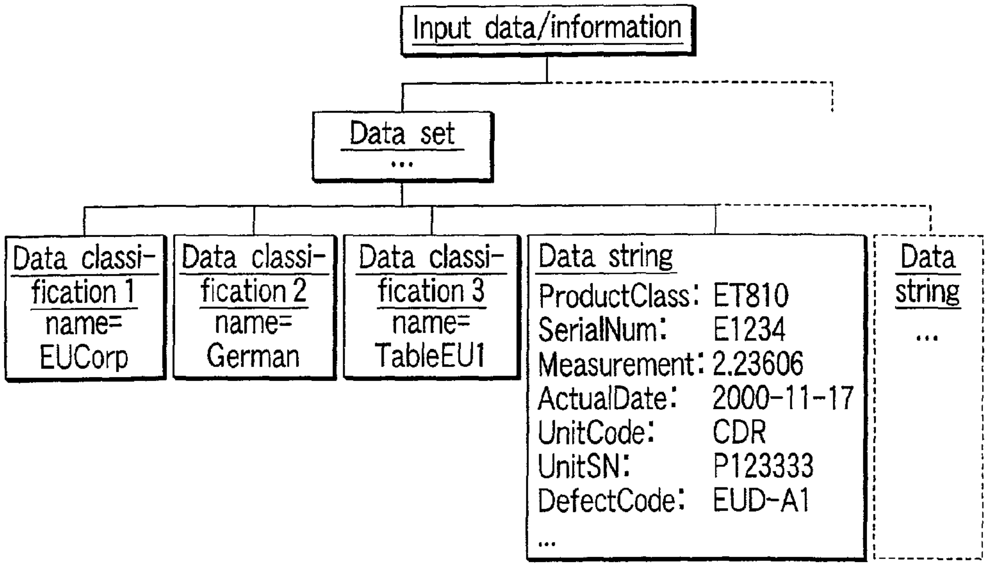
FIG. 8 is another data structure diagram in the manufacturing data integrate system.

FIG. 8 is a data structure diagram of the original data/information Din shown in FIG. 7. The information Din is represented as one type of tree structure in the data structure. In the information Din, the data set is constituted for the information to identify the original data (the data classifications “1”, “2”, “3”) and every group of data identified by the information.

FIG. 9 is a schematic diagram showing one example of the original format of the information Din inputted into the translation section. The information Din is used in maintaining the translation method dictionary stored in the translation method dictionary storage 11.

The data classification “1” is, for example, MentCent, “2” is Common, and “3” is TableADMDF.

In the format of the information Din, the columns such as Command, Element, and Data are formed. In the Command column, a primitive operation name is described. In the Element column, the name or place of the data/information as an operation object is described. In the Data column, values are described with respect to the data/information designated in the Element column if necessary.

FIG. 10 is a data structure diagram of the original information Din shown in FIG. 9. The information Din is represented as one type of tree structure in the data structure. In the information Din, the data set is constituted for the information to identify the original data (the data classifications "1", "2", "3") and every group of data identified by the information.

Figure 11:
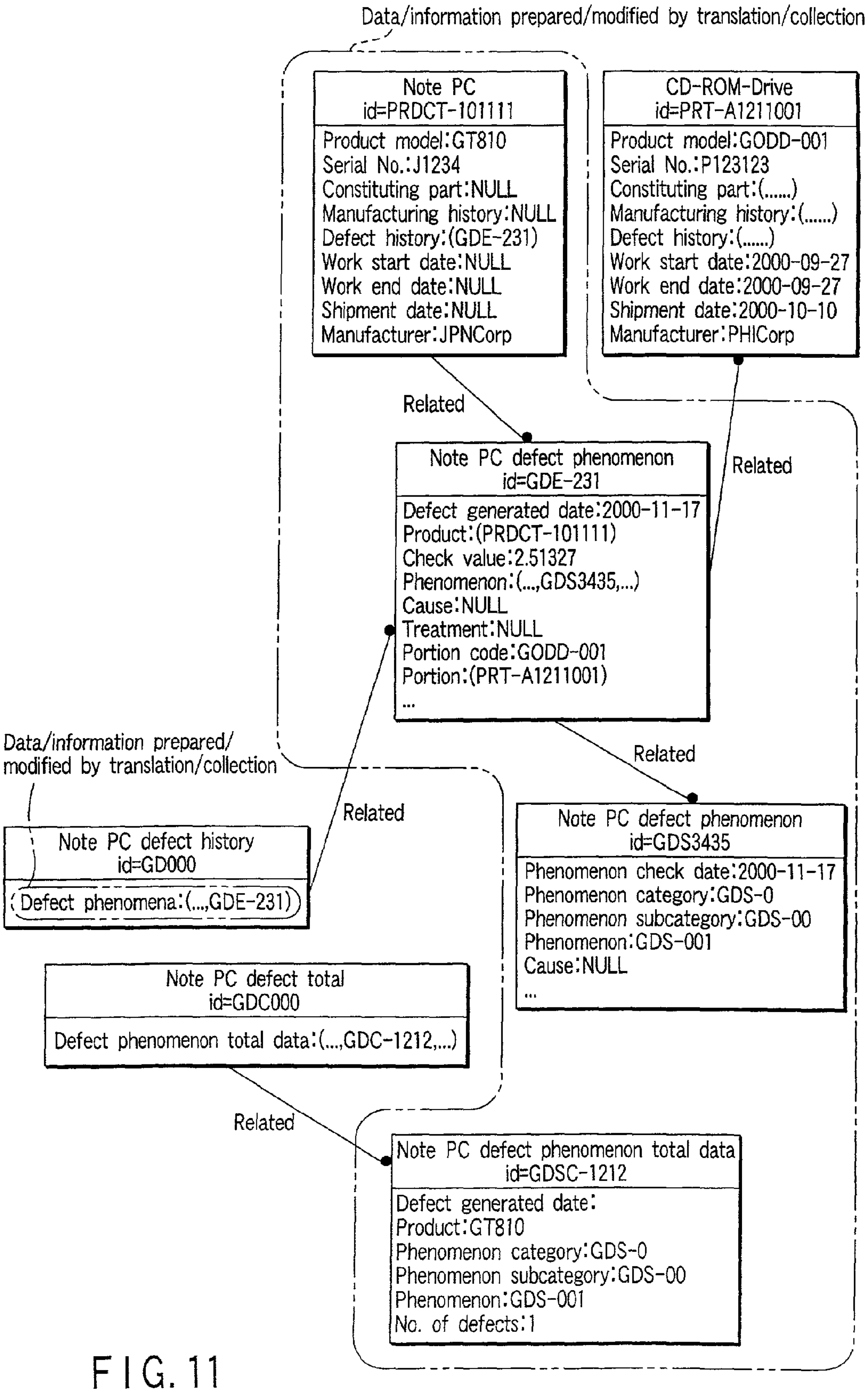
FIG. 11 is a diagram showing one example of the information obtained by the translation of information.

FIG. 11 is a diagram showing one example of the translated/collected data/information obtained by the translation of the data/information Din having the data structure with respect to a product having a product code JT810 shown in FIGS. 3 and 4.

In the information, for a notebook-sized personal computer (hereinafter referred to as a note PC) (id=PRDCT-101111), one group of data is formed including elements such as a product model number, serial number, constituting part, manufacturing history, defect history, . . . , manufacturer.

One group of data will be referred to as a node. In each element, NULL indicates that the data is undefined.

Examples of information related with the node of the note PC is "note PC defect phenomenon" (id=GDE-231). The "note PC defect phenomenon" (id=GDE-231) is also the node. Examples of elements of the "note PC defect phenomenon" include a defect generated date, product, check value, phenomenon, . . . , portion. The "note PC defect phenomenon" (id=GDE-231) is related with a defect history (GDE-231) as one of the elements of the node of the "note PC".

The "note PC defect phenomenon" (id=GDE-231) is related with "note PC defect phenomenon" (id=GDS3435). The "note PC defect phenomenon" (id=GDS3435) is also the node. Examples of elements of the "note PC defect phenomenon" include a phenomenon checked date, phenomenon category, . . . , cause. The "note PC defect phenomenon" (id=GDS3435) is related with a phenomenon (GDS3435) as the element of the "note PC defect phenomenon" (id=GDE-231).

When part information is stored beforehand in a portion (part) (PRT-A1211001) as one of the elements of the "note PC defect phenomenon" (id=GDE-231), the part information is related. The part information is "part CD-ROM-Drive" (id=PRT-A1211001).

As the node, "note PC defect phenomenon total data" (id=GDSC-1212) is newly prepared. The elements of the "note PC defect phenomenon total data" (id=GDSC-1212) include the defect generated date, product, phenomenon category, phenomenon subcategory, phenomenon, and number of phenomena.

Various classifications may be disposed in each node. Examples of a leading concept of the note PC include a compact PC, PC, product, and the like. As a sub concept of the product, data/information concerning the products such as HDD and CD-ROM may be included in the translated/collected data/information.

Such information can be represented as a class hierarchy in a way of thinking of object orientation. For example, the XML can be represented by nesting a tag as shown in FIG. 12.

Some of the elements may be used in associating the respective nodes with one another. In the drawing, the product element and portion element in the node of the "note PC defect phenomenon" represent a relation with the node of the "note PC" and relation with "CD-ROM-Drive".

The relation may be represented using an address (or a pointer) on the calculator memory, or represented using an object ID for use in specifying object data on data storage for perpetuating and storing the object data such as object orientation database, or an idref attribute for referring to an id attribute of the tag of XML (idrefs attribute in referring to a plurality of attributes).

Figure 13:
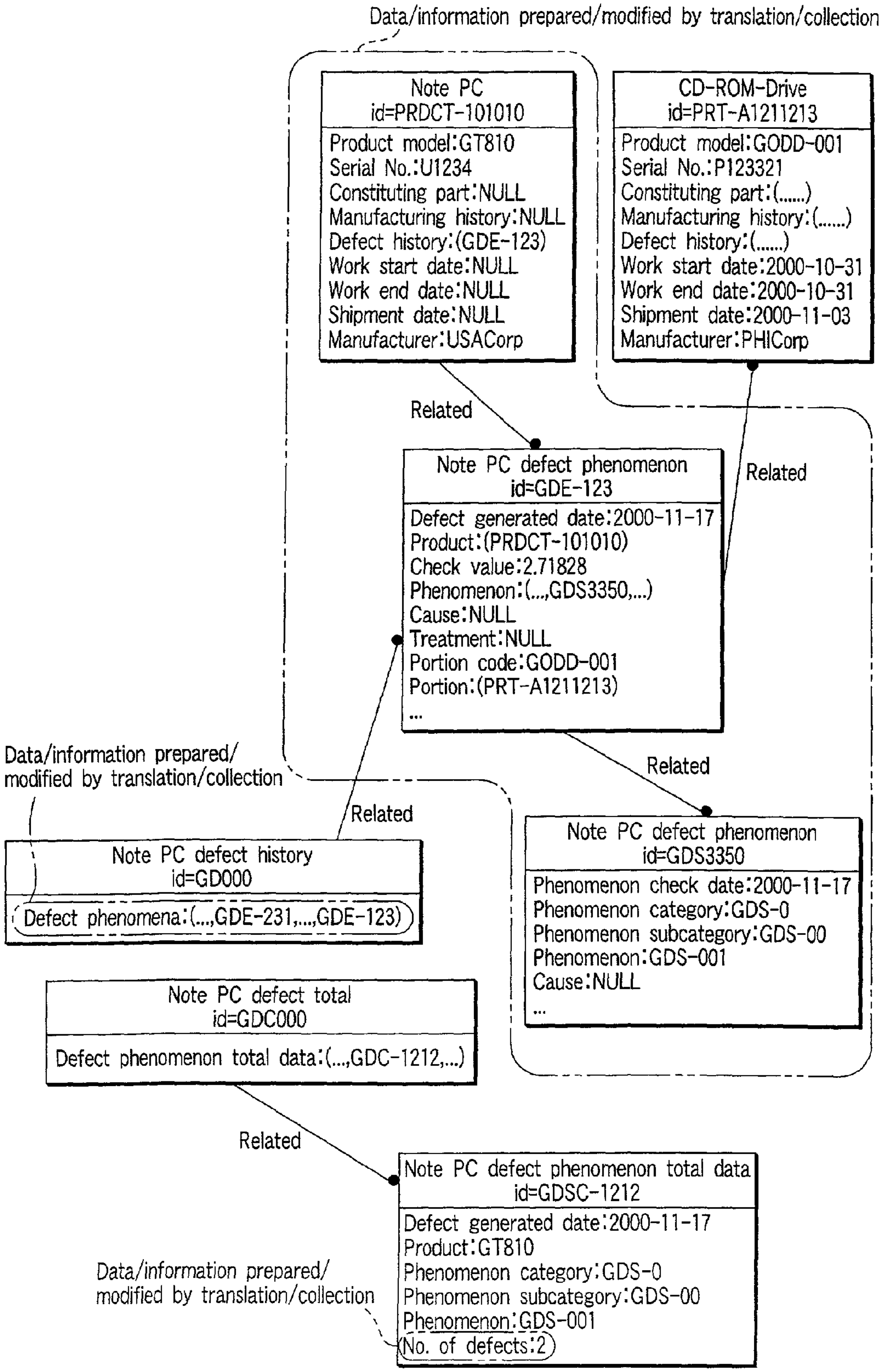
FIG. 13 is a diagram showing one example of another information obtained by the translation of information.
Figure 14:
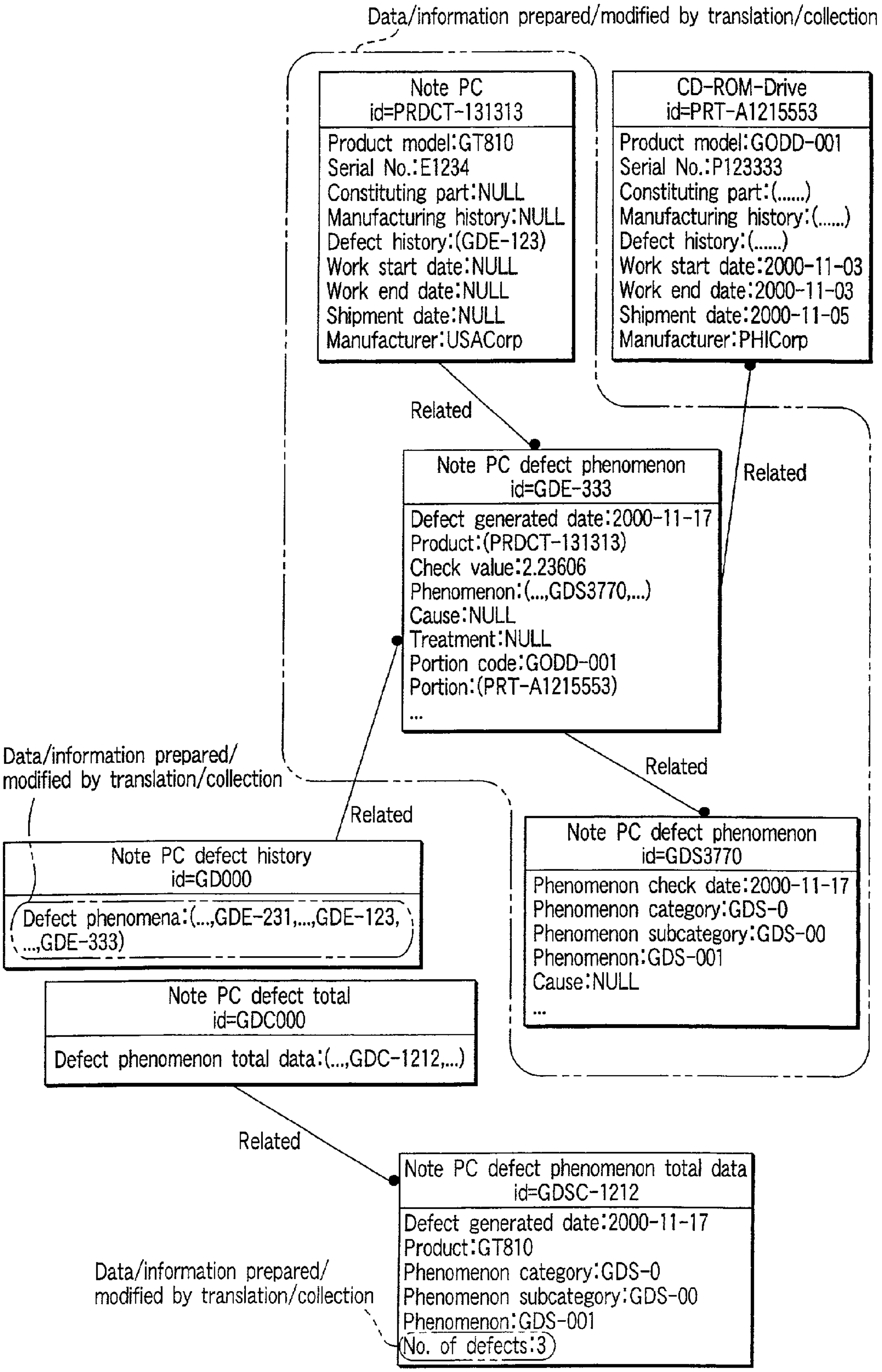
FIG. 14 is a diagram showing one example of another information obtained by the translation of information.

FIG. 13 shows one example of the translated/collected information obtained by the translation of the information Din shown in FIGS. 5 and 6. FIG. 14 is a schematic diagram showing one example of the translated/collected information obtained by the translation of the information Din shown in FIGS. 7 and 8.

Here, FIGS. 13 and 14 are similar to FIG. 11, and therefore the detailed description thereof is omitted. Additionally, for the number of defects in the information prepared/modified by the translation/collection, in FIG. 13, there is one in the "note PC defect phenomenon total data" shown in FIG. 11. Also in FIG. 13, there is one "note PC defect phenomenon".

Therefore, for the number of defects in the information prepared/modified by the translation/collection, one matter is added and the total is two.

Similarly, for the number of defects in the information prepared/modified by the translation/collection, in FIG. 14, there are two "note PC defect phenomenon total data" shown in FIG. 13, and there is one "note PC defect phenomenon" shown in FIG. 14. Therefore, for the number of defects in the information prepared/modified by the translation/collection, there are three.

On the other hand, FIGS. 15 to 18 show one example of the translation method dictionary for use in translating the information Din shown in FIGS. 3 and 4. Each translation method dictionary is stored in the translation method dictionary storage 11. Additionally, in FIGS. 15 to 19, circled numerals 1, 2, . . . indicate mutual connection.

Figure 15A:
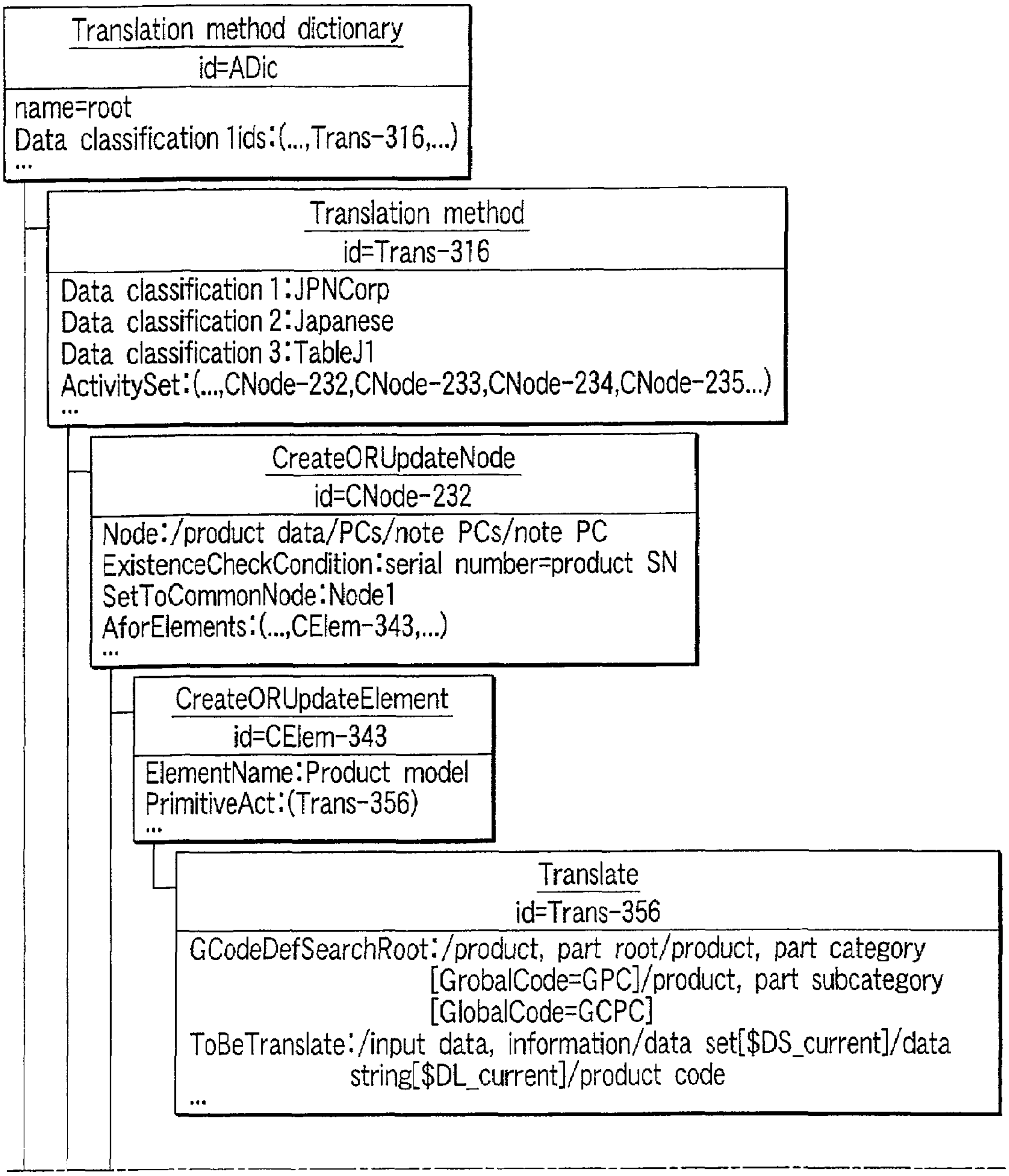
FIG. 15 is a diagram showing one example of the translation method dictionary.
Figure 16:
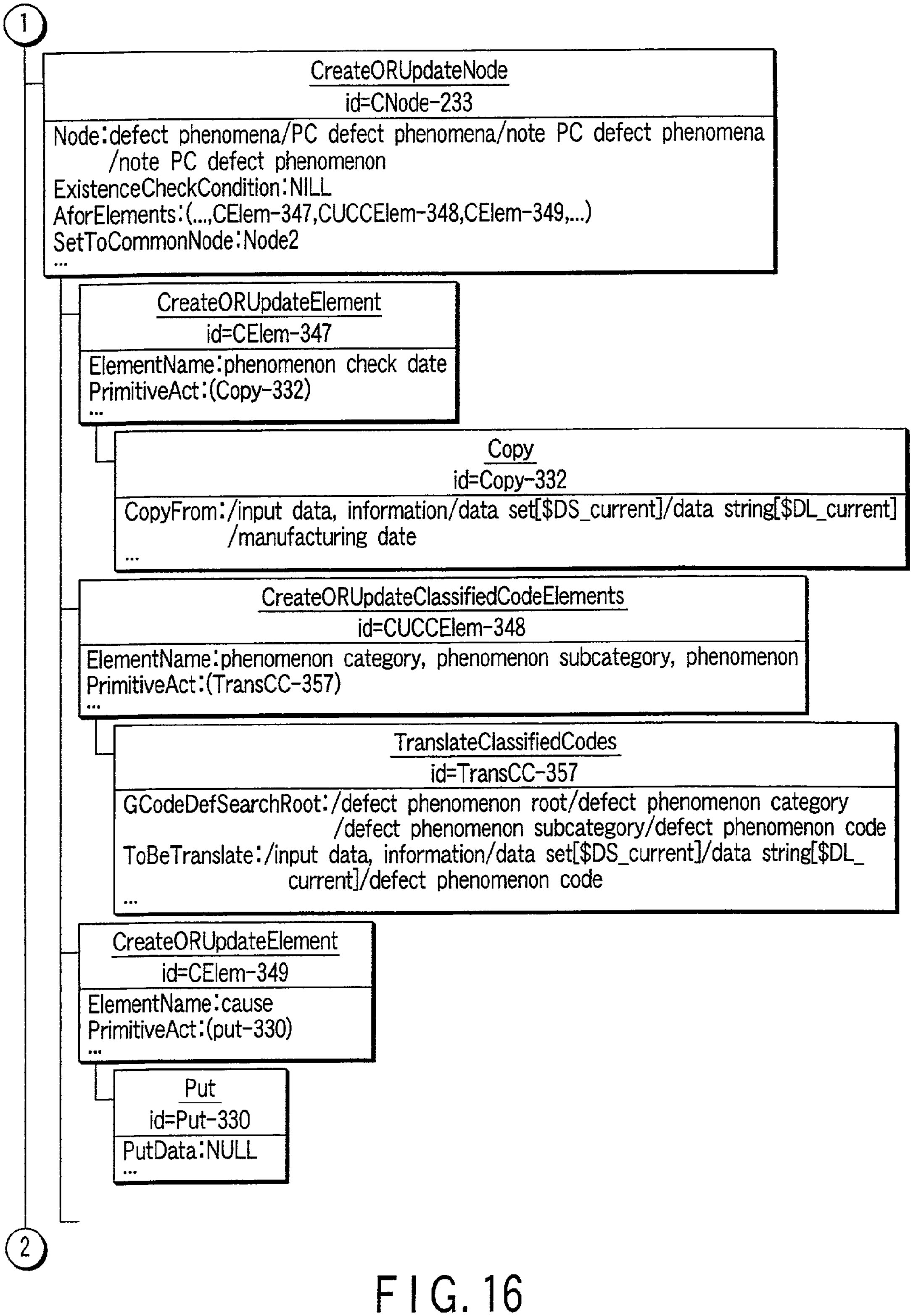
FIG. 16 is a diagram showing one example of the translation method dictionary.
Figure 19:
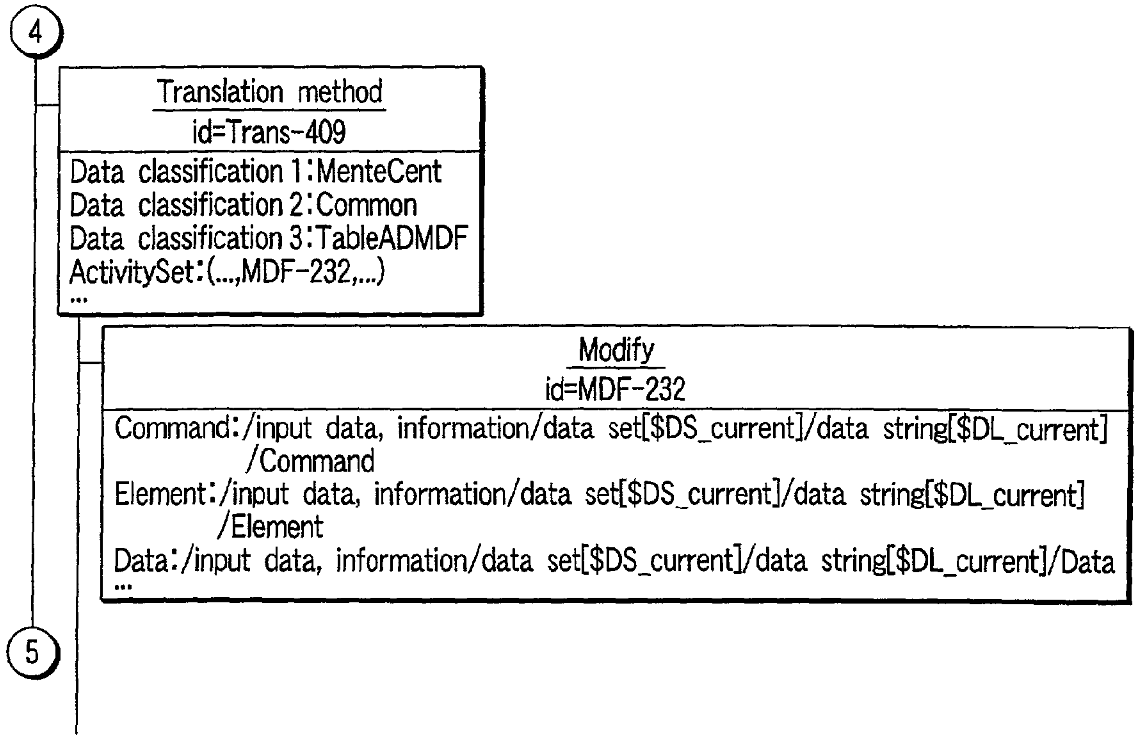
FIG. 19 is a diagram showing one example of the translation method dictionary for modifying the translation method dictionary and data/information definition dictionary.
Figure 20:
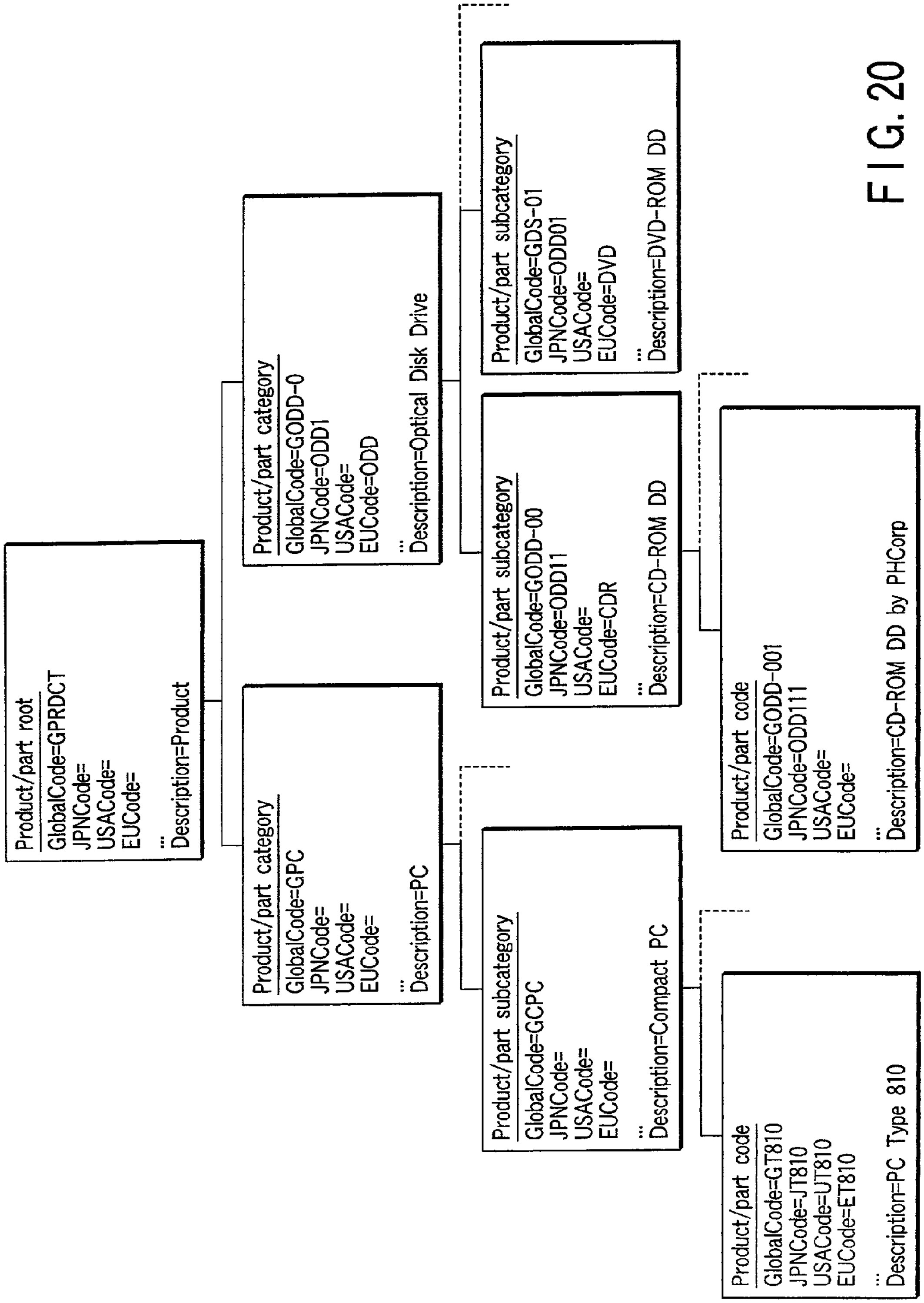
FIG. 20 is a diagram showing one example of the data/information definition dictionary.
Figure 21A:
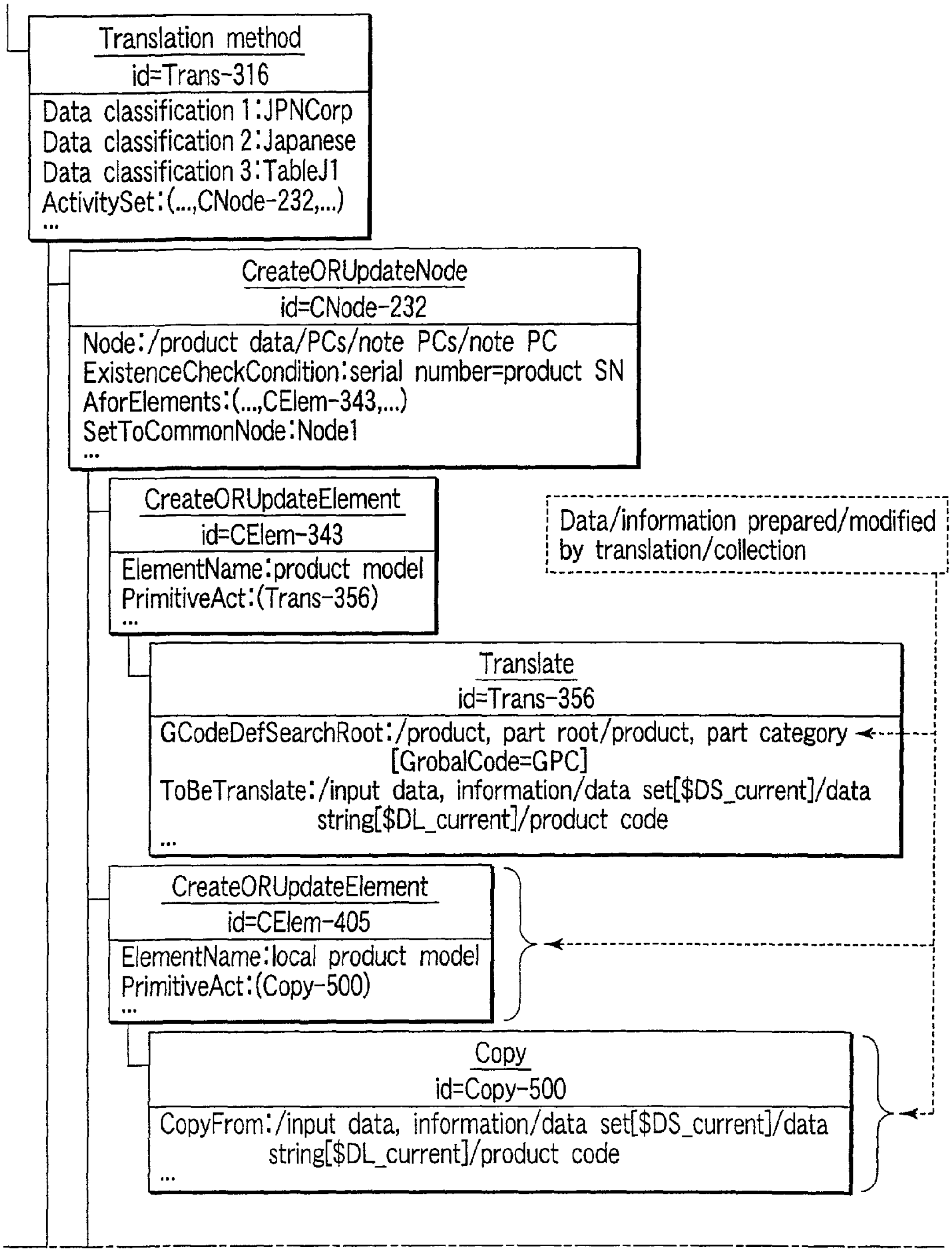
FIG. 21 is a diagram showing the information modified by the translation method dictionary.
Figure 21B:
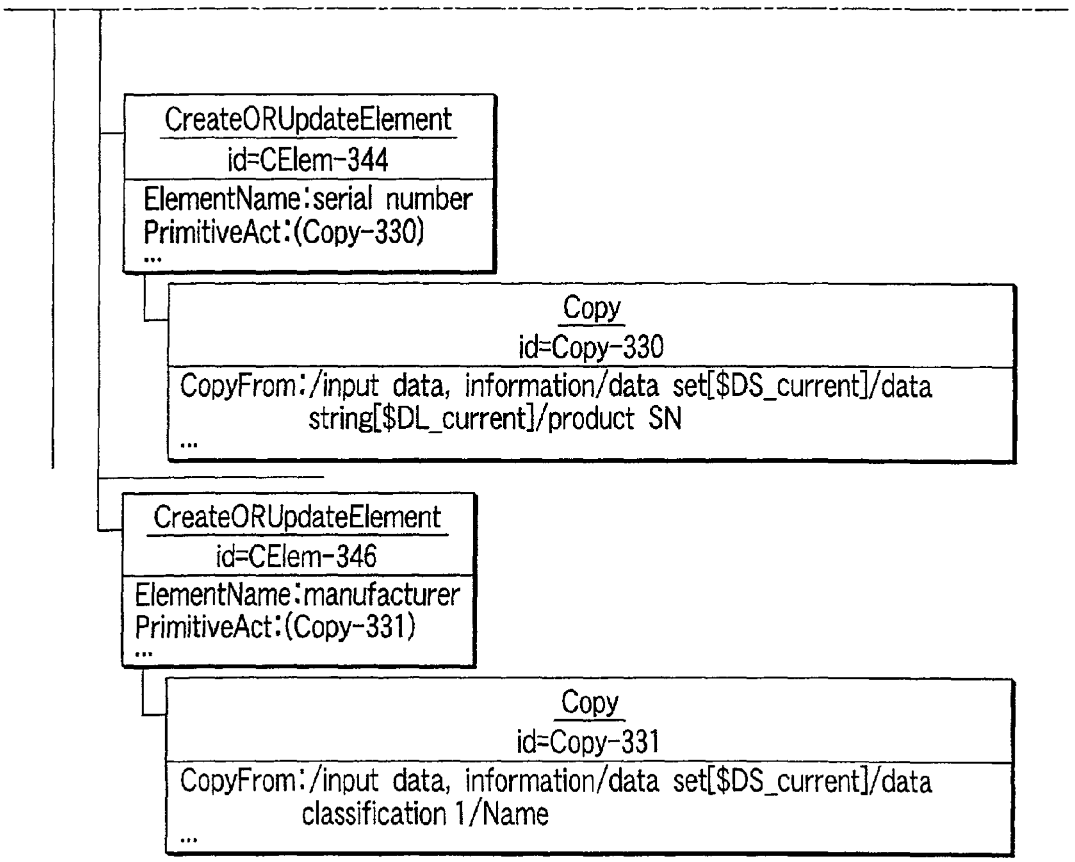

Moreover, FIG. 19 shows one example of the translation method dictionary shown in FIG. 15 using the information Din shown in FIG. 9, and one example of the translation method dictionary for modifying the data/information definition dictionary shown in FIG. 20. Additionally, FIG. 21 shows the data/information modified by the translation method dictionary. FIG. 14 shows one example of the translation method dictionary modified by the translation of the information shown in FIG. 9.

The data of the translation method for translating the information Din is registered in the translation method dictionary stored in the translation method dictionary storage 11. The information for identifying the information Din, and creating method and updating method of the node in the translation are registered in the translation method dictionary.

The methods of creating and updating the element included in the node are registered in the methods of creating and updating the node. In the method of creating the element, the method of creating various values with respect to the element is registered.

The translation method dictionary is prepared beforehand before used in the translation in accordance with the identification information of the information Din. In one example of the translation method dictionary shown in FIG. 15, as the information for identifying the inputted information Din, the data classifications "1" to "31" are used.

Therefore, when the information Din meeting the data classifications "1" to "3" is inputted, the translation section 10 identifies the respective data classifications "1" to "3", refers to the translation method dictionary stored in the translation method dictionary storage 11 and translates the information Din.

In the translation method dictionary, the "method of creating or updating the node" (CreateORUpdateNode) in the translation shown in FIGS. 15 to 18B is registered.

In the translation method dictionary, a template for receiving modification information for the node or the element such as Modify shown in FIG. 19 may be registered.

When CreateORUpdateNode is described in the dictionary, the translation section 10 checks whether the node as a creation object is present in the already translated/collected information Dout. When there is already the node, the translation section 10 starts a processing of updating the information.

When the node is not present in the already translated/collected information Dout, the translation section 10 starts a processing of inserting the information Din.

The "method of creating or updating the element" included in the node is registered in the method of creating or updating the node in the translation method dictionary shown in FIGS. 15 to 18. The method of creating the element includes CreateORUpdateElement, CreateElement, UpdateElement, and the like.

When CreateORUpdateElement is described in the dictionary, and when the node is already present during the processing of referring to CreateORUpdateElement, the translation section 10 starts the update processing with respect to the element.

When the node is newly created, the translation section 10 starts a processing of newly creating the element.

When CreateElement is described in the dictionary, the like) of coded data, addition (CreateLink) of the related information of the data/information, and data/information update (Copy in CreateORUpdateElement and UpdateElement) in the functions of the data/information translation.

As described above, when the translation section 10 refers to one example of the translation method dictionary shown in FIG. 15, the node of the "Note PC" in the translated/collected information Dout shown in FIG. 11 from the information Din shown in FIGS. 3 and 4.

Figure 17A:
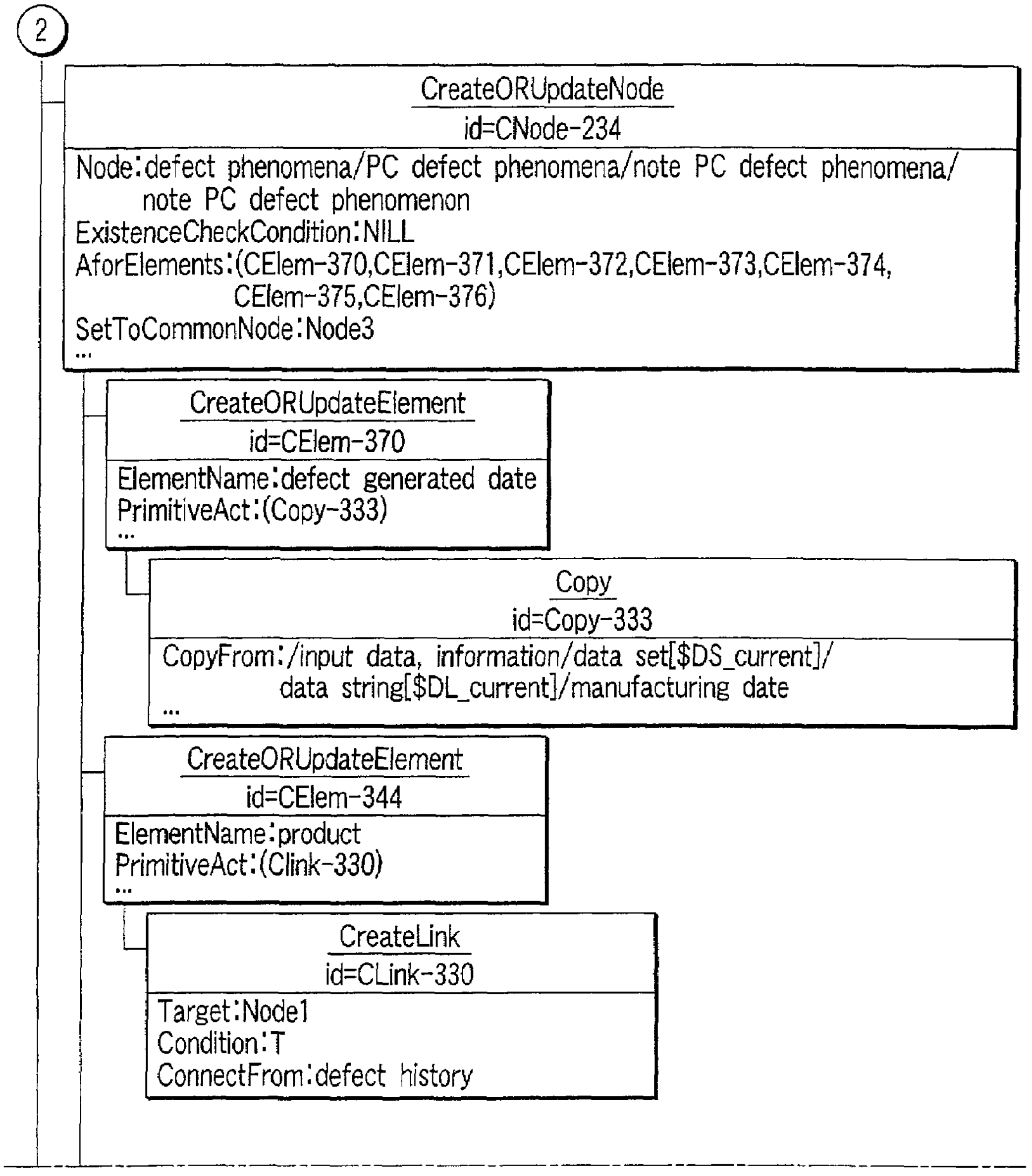
FIG. 17 is a diagram showing one example of the translation method dictionary.
Figure 17B:
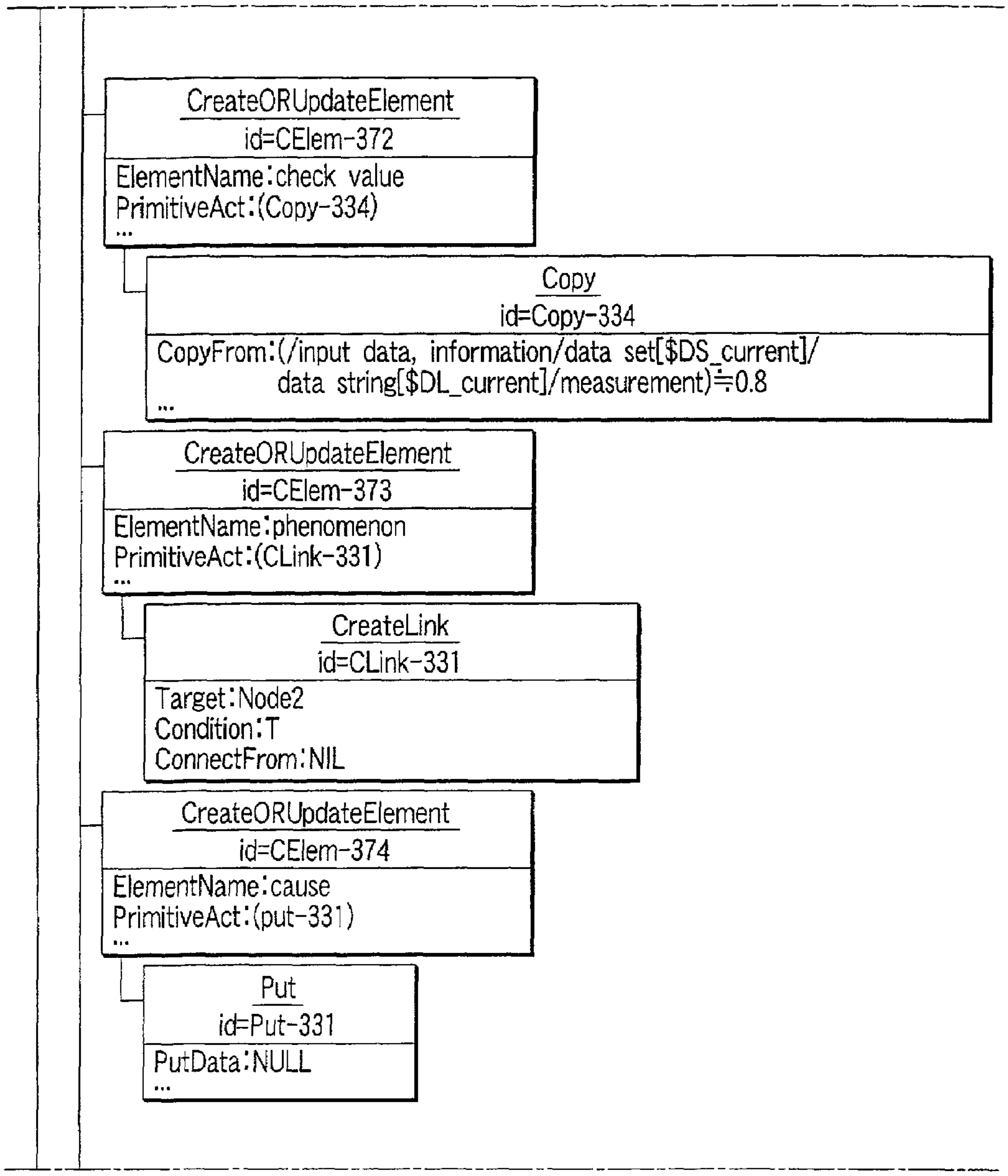
Figure 17C:
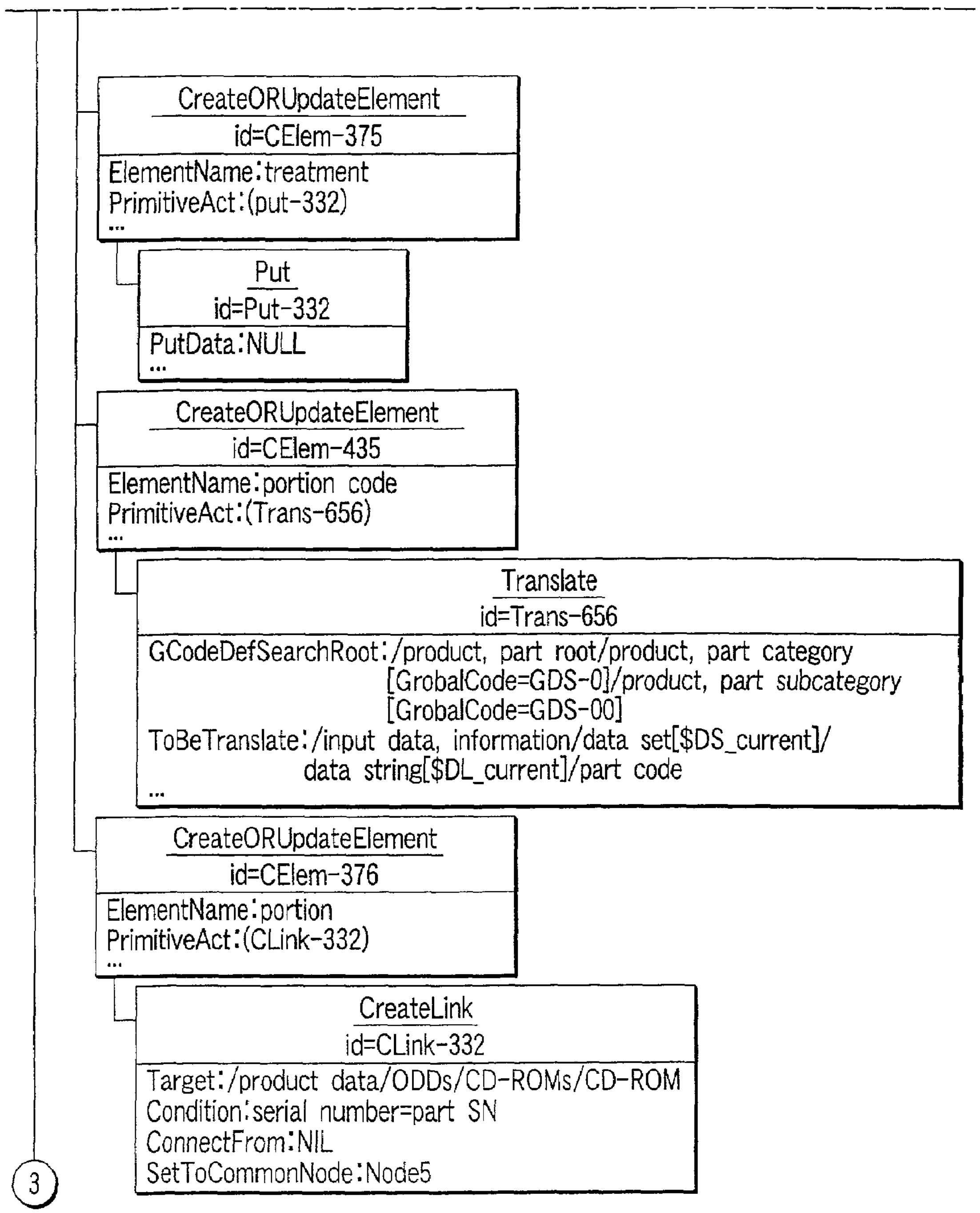
Figure 18A:
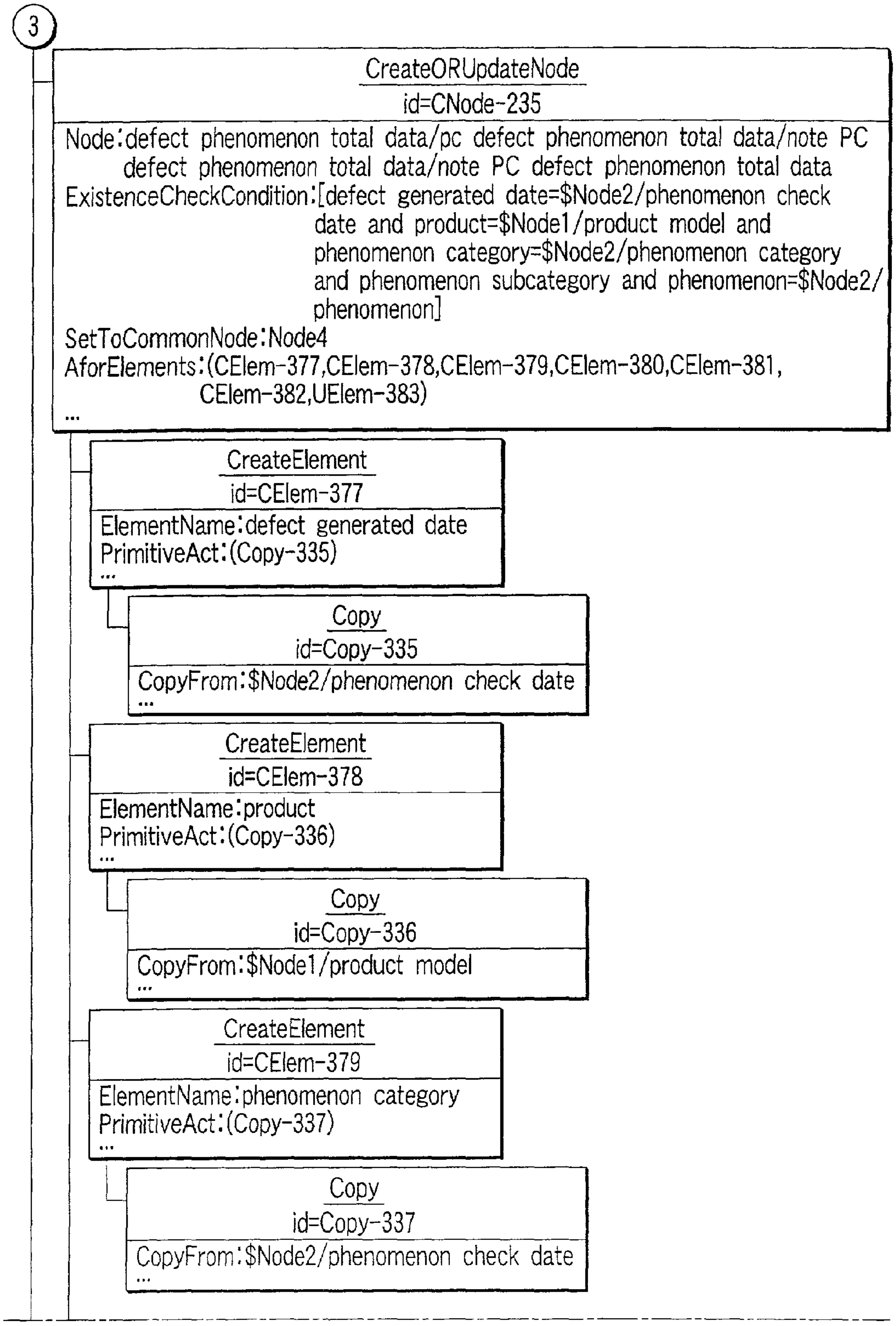
FIG. 18 is a diagram showing one example of the translation method dictionary.
Figure 18B:
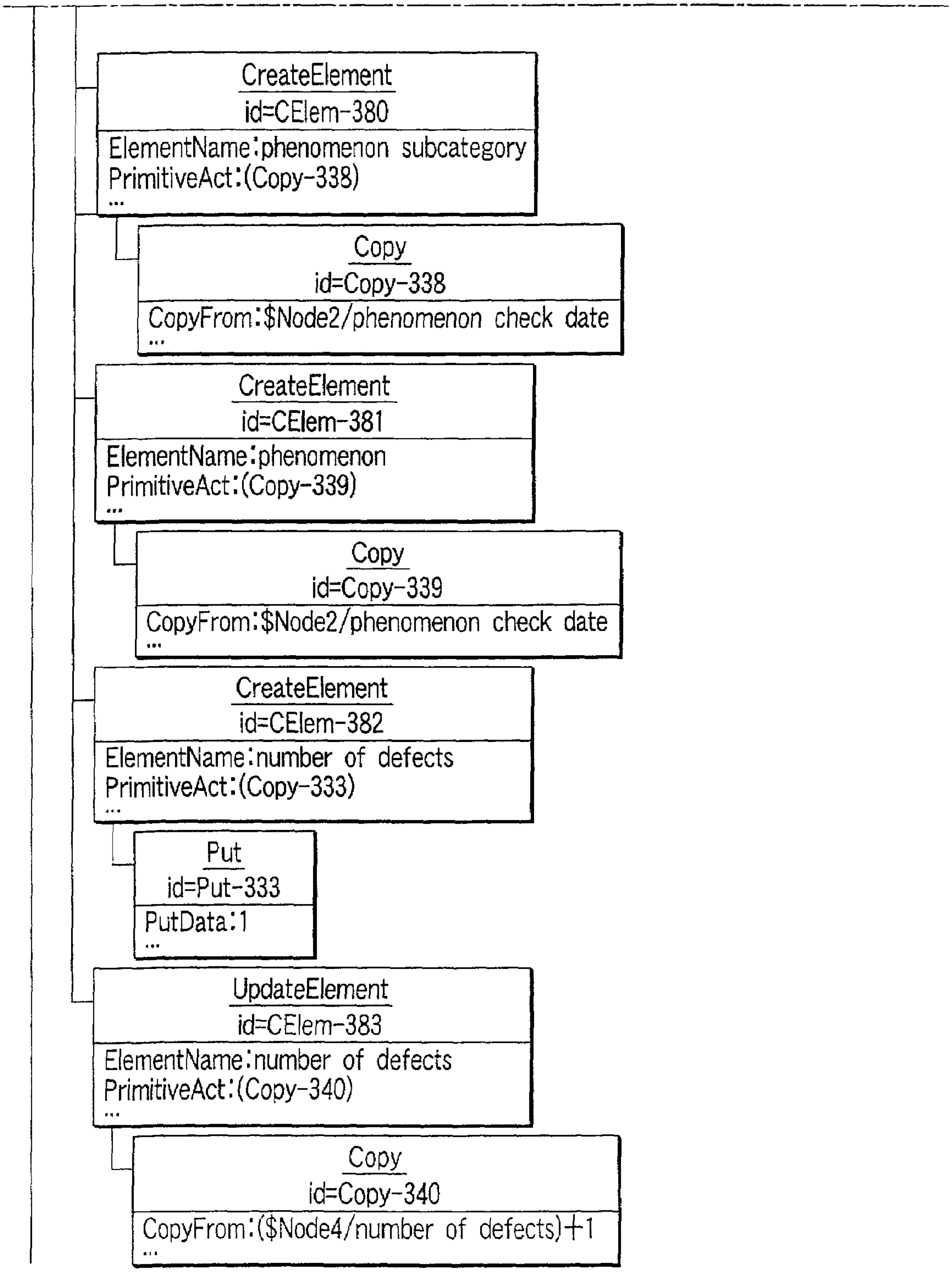
Figure 22:
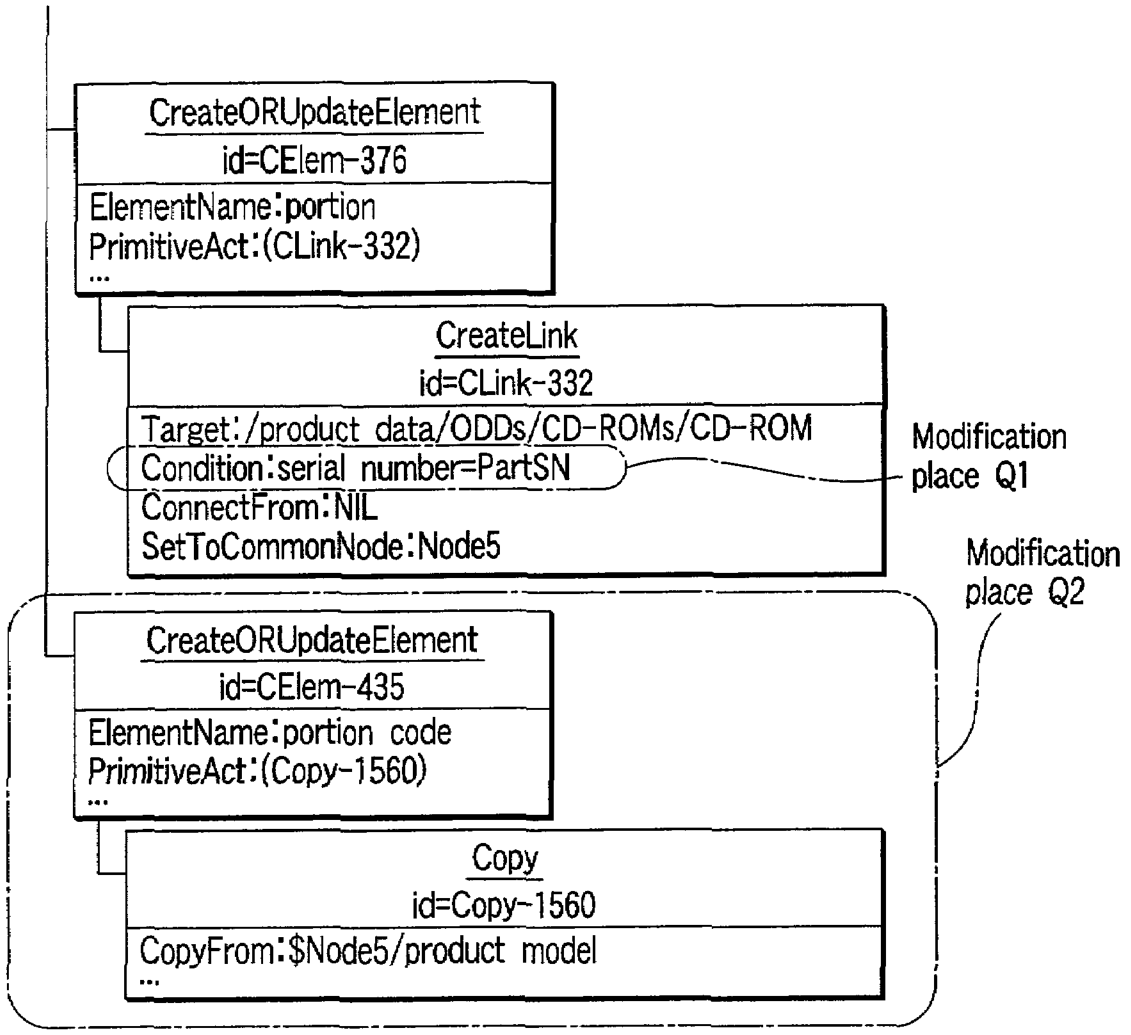
FIG. 22 is a diagram showing an example in which the translation method dictionary is modified.

FIG. 22 shows an example in which the translation method dictionary shown in FIG. 17 is modified in order to translate the information Din shown in FIGS. 5 and 6 into the information Dout shown in FIG. 13. In a modification example of the translation method dictionary, a modification place $Q_1$ "Condition: serial number=PartSN" with respect to "CreateLink id=Clink-332" in the translation method dictionary shown in FIG. 17 is modified, and "CreateORUpdateElement" as a modification place $Q_2$ and the "Copy" are modified.

Figure 23B:
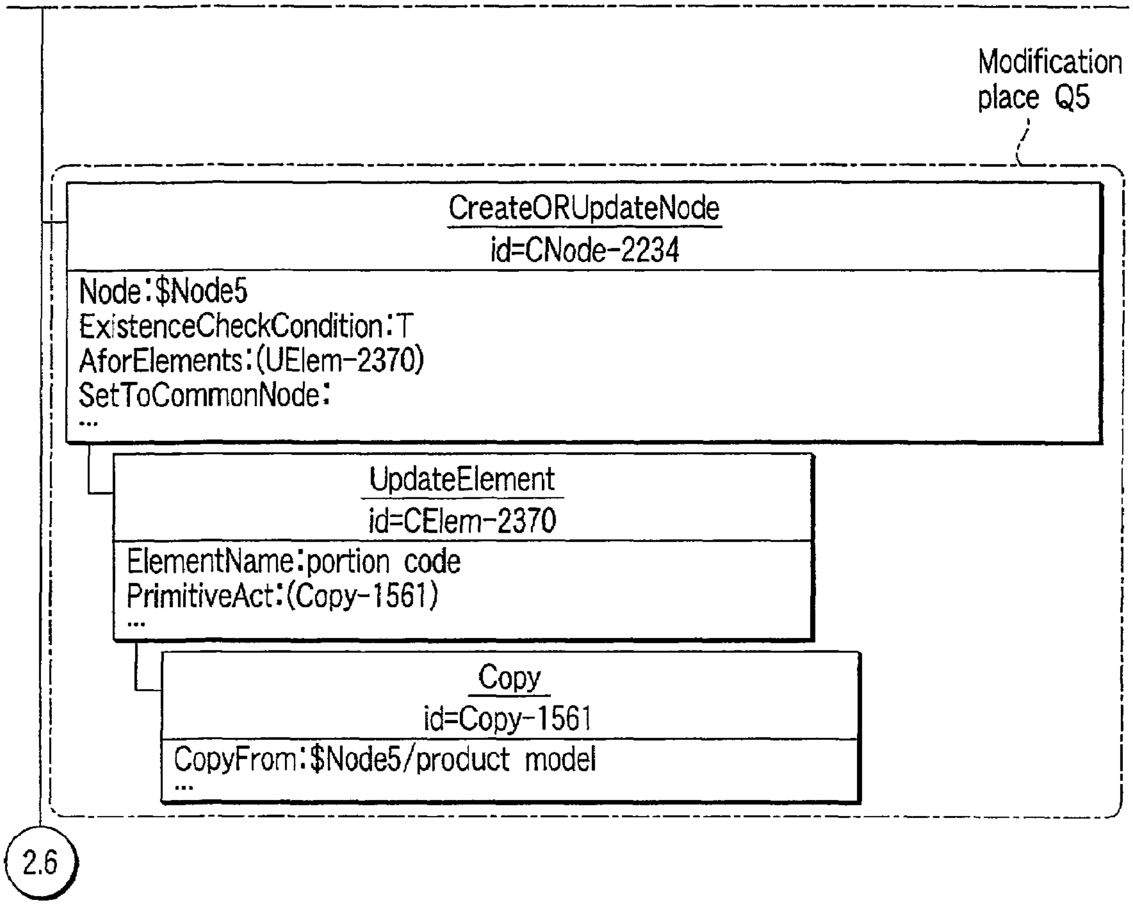
FIG. 23 is a diagram showing an example in which the translation method dictionary is modified.

FIG. 23 shows examples in which the translation method dictionary shown in FIG. 17 is modified in order to translate the information Din shown in FIGS. 7 and 8 into the information Dout shown in FIG. 14. In the modification example of the translation method dictionary, a modification place $Q_3$ is modified in "Translate", a modification place $Q_4$ is modified in "CreateLink", and as a modification place $Q_5$, "CreateORUpdateElement", "UpdateElement", and "Copy" are modified.

In the description of the translation method dictionary stored in the translation method dictionary storage 11, for the description for specifying the information, the following syntax is permitted.

(a) Representation of Group of Information Din

An example of syntax is Node:/product data/PCs/note PCs/note PC.

In the example of syntax, the product data and PCs have one-to-multiple, or one-to-one correspondence. Furthermore, the PCs and note PCs, and note PCs and note PC are supposed to have the one-to-multiple, or one-to-one correspondence.

The example of syntax satisfies the correspondence and indicates the group of information indicating the note PC which can be traced from the group of the information of the product data.

(b) Representation of Value Comparison of Input Data/Information with Translated/Collected Data An example of syntax is ExistenceCheckCondition: serial number=product SN.

In the example of syntax, when the value of the serial number included in the translated/collected information is equal to the value of the product SN included in the information Din, the data is evaluated as "true". When the values are not equal, the data is evaluated as "false".

(c) Specifying of Data/Information

An example of syntax is GCodeDefSearchRoot:/product, part root/product, part category [GlobalCode=GPC]/product, part subcategory [GlobalCode=GCPC].

When the information Din is specified, conditions are appropriately put in the description indicating the group of the information Din. In the example of syntax, a portion held in "["and"]" indicates the condition. In the example of syntax, one of data/information such as the product/part subcategory of the data/information definition dictionary shown in FIG. 20 is specified.

(d) Alternatively, a variable may be used in the condition.

An example of syntax is ToBeTranslate:/input data, information/data set[$DS_current]/data string[$DL_current]/product code.

In the example of syntax, the variable starting with "$" is used to specify the input data/information Din. $DS_current and $DL_current are assumed to be variables to specify the data set and string in the translation. In the example of syntax, the value of the specific product code can be obtained from the data string in the translation by the variable.

The information Din shown in FIGS. 6 and 8 is similar to the information Din shown in FIG. 4, but there are different respects as follows. The different respects include difference of a data element name in the information Din, difference of the unit system of numeric data, and difference of the coded data from code definition.

The difference of the data element name is the modification of ToBeTranslate element of the modification place $Q_1$ shown in FIG. 22 and modification places $Q_3$, $Q_4$ shown in FIG. 23. When only the portion using the element name in the information Din is modified, the translation method for different information Din can be described.

Moreover, the difference of the unit system of the numeric data is the modification of a portion of calculation described in CopyFrom element of Copy (id=Copy-334) of the translation method dictionary shown in FIG. 17, and the translation method for the different information can be described.

Subsequently, for the difference of the code definition, when the content of the code definition and code definition system are the same and individual codes are different, the portion using the element name in the information Din shown in the modification place $Q_3$ shown in FIG. 23 is modified. Only with this modification, a reference destination of the data/information definition dictionary is changed by the difference of the data identification information, and the code for use in the translated/collected information Din can be selected.

Additionally, when the content of the code definition and code definition system are different, for example, there is a difference in presence/absence of the coded data and detail degree of coding. For the presence/absence of the coded data, in the present embodiment, the coded data corresponding to the portion code exists in JPNCorp and EUCorp, but does not exist in USCorp.

For the difference of the detail degree of the coding, for example, the detail degree of the code of EUCorp is coarse as compared with JPNCorp in the present embodiment.

With this difference, as in the modification place $Q_2$ shown in FIG. 22, an order of creating the portion code element is set with respect to the translation method dictionary for JPNCorp shown in FIG. 17, after the portion element is prepared.

Subsequently, the product model of the product is copied from the product data ($Node5) of CD-ROM used as the portion.

Thereby, the information not included in the information Din from USCorp can be supplemented by checking the already translated/collected information Dout separately from PHICorp having produced CD-ROM.

In the modification place $Q_3$ shown in FIG. 23, once the translation is performed with a level of the coarse code which can be translated with the information Din from EUCorp. To acquire the code data having the same detail degree as that of JPNCorp, as in the modification place $Q_5$, the product model of the product is copied from the product data ($Node5) of CD-ROM. Thereby, the value of the portion code element can be updated if necessary.

The translation method dictionary stored in the translation method dictionary storage 11 may be describe din an XML format.

Additionally, when data representation of the XML format is used, the data is appropriately represented using an attribute, tag and text. Thereby, the information does not necessarily have the same format, as long as the represented content is equivalent.

For example, the information Dout outputted as the translation result and the data structure are represented as the tag as such, and may be described between DataCreationTAGs. Moreover, the value of the element in which the value of the information is to be inserted may also be obtained by evaluating a function, argument, variable, and constant given as the text of the element.

Additionally, the function is given with a name starting with $. The argument may be distinguished so that the argument is held by a bracket "("and bracket")" after the function name, and divided with double quotation (") and comma (,).

The variable may be given with a name starting with $$. The variable may also be used in the argument.

The constant may also be distinguished as a character string without $ or $$ in the top and without (") or (,).

To allow the condition described in the text of the tag of the data classifications "1" to "3" to meet the data classifications "1" to "3" of the information Din, the data structure of the translation result is prepared in accordance with the tag included in DataCreationTAGs. The data structure is prepared not only in the XML format but also in a data representing format representing the equivalent convent.

Moreover, the value of the information obtained by evaluating the function, argument, variable, and constant described as the text is used.

The information for identifying the information of the translation method dictionary does not have to be necessarily described in the translation method dictionary. The information for identifying the information of the translation method dictionary is stored as the data different from that for the identification of the information Din, and the identification information may be referred to select the tag from DataCreationTAGs. The identification information may be buried in the calculator program.

The translation method dictionary may include the description for modifying the translation method dictionary and data/information definition dictionary.

FIG. 20 shows one example of the data/information definition dictionary in the present invention. In this example, the classification of the product and part is defined. All the products and parts are segmented into a product/part category, product/part subcategory, and product/part code in order using a product/part root as a root node.

In each node, the codes such as GlobalCode, JPNCode, USACode, EUCode are defined. The codes other than GlobalCode are used in the information Din. GlobalCode is a basic code which basically covers the codes of the information Din.

The code for use in the information Din does not necessarily correspond to all GlobalCode, and a portion having no correspondence is blank. In Description, the character string indicating a meaning of the data whose code is defined is registered.

Figure 24:
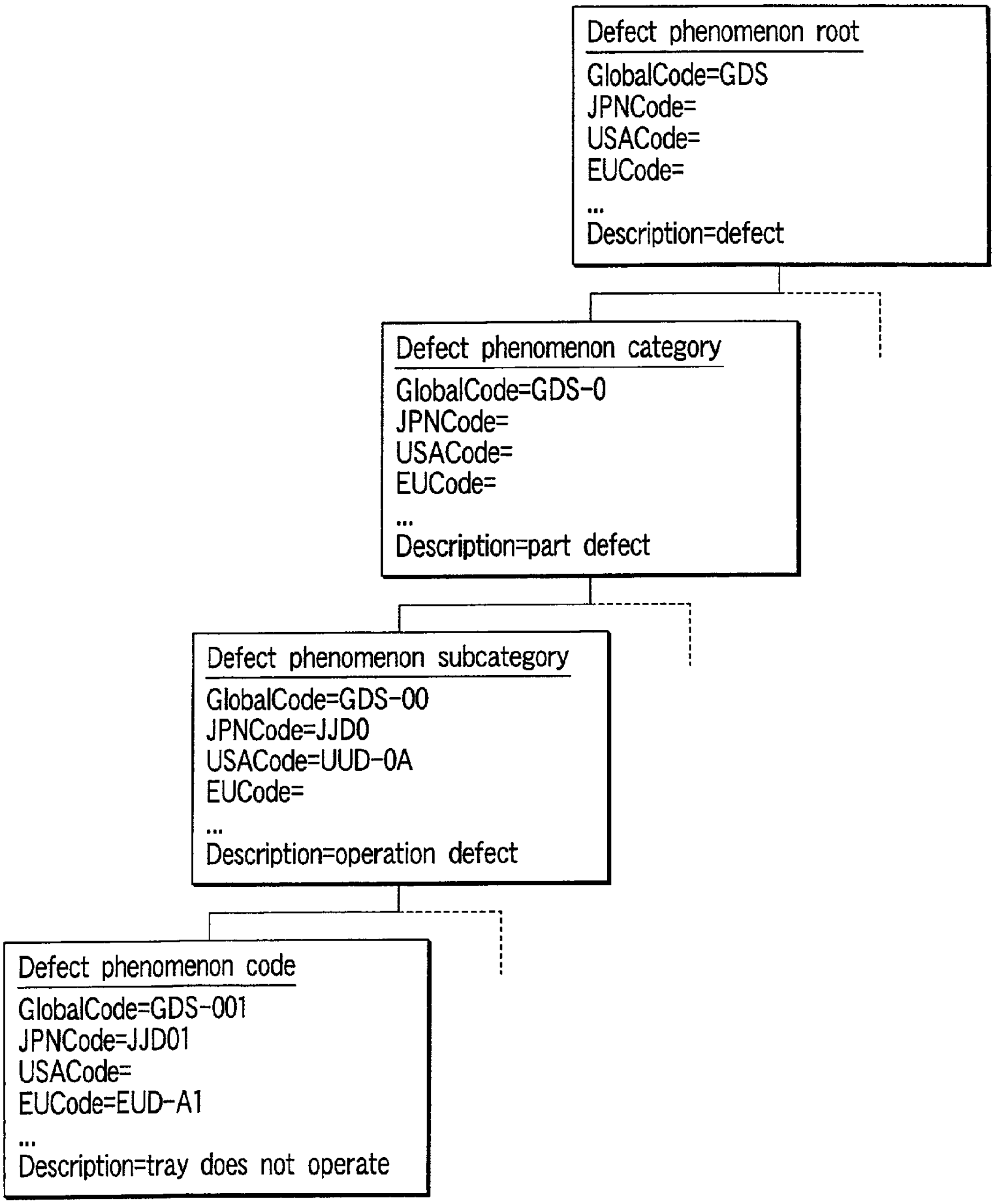
FIG. 24 is a diagram showing one example of the data/information definition dictionary.

FIG. 24 shows one example of the data/information definition dictionary. In the data/information definition dictionary, the classification of defect phenomenon in a manufacturing stage is defined. All the manufacturing defect phenomena are segmented into a defect phenomenon category, defect phenomenon subcategory, and defect phenomenon code in order using the defect phenomenon root as the root node.

In each node, the codes such as GlobalCode, JPNCode, USACode, and EUCode are defined. The codes other than GlobalCode are used in the information Din.

GlobalCode is a basic code which basically covers the code of the information Din.

The code for use in the information Din does not necessarily correspond to all GlobalCode, and the portion having no correspondence is blank. In Description, the character string indicating the meaning of the data whose code is defined is registered.

A translation operation in the translation apparatus 1 in the manufacturing data integrate system described above will next be described.

As shown in FIG. 1, the quality control apparatuses 5-1 to 5-n are installed in the installation districts 6-1 to 6-n such as the business places in Japan, divisions in the business place, and business places in overseas countries.

The quality control apparatuses 5-1 to 5-n manage the information on product manufacturing.

The quality control apparatuses 5-1 to 5-n manage the information in independent formats based on various backgrounds such as the business place in Japan, nation, district, race, language, and development concept.

The translation apparatus 1 of the present invention receives the information Din from the quality control apparatuses 5-1 to 5-n via Internet 3, translates and integrates the information Din having the independent formats, and holds the information Dout which are to be originally related with one another, for example, the organic link among the information of the same part and product.

The translation section 10 refers to the =data/information definition dictionary in the data/information definition dictionary storage 12 based on the translation method of the translation method dictionary stored in the translation method dictionary storage 11 if necessary to translate the data/information Din, and outputs the information Dout as the translation result.

During the executing of the translation, to translate the information Din handled by the quality control apparatuses 5-1 to 5-n, the translation apparatus 1 executes the processing such as the conversion of structure of information Din, copy of the information Din, supplement of the information Din, conversion of numeric data in the information Din, calculation of related numeric data in the information Din, code conversion of the coded information Din, addition of related information among the information Din, and update of the information Din.

Moreover, the translation apparatus 1 reconstitutes the information Din handled by the quality control apparatuses 5-1 to 5-n.

Additionally, the translation section 10 operates any one of the translation method dictionary interpreter 13 for applying the translation method dictionary to the translation processing, data/information definition referring section 14 for referring to the data/information definition stored in the data/information definition dictionary storage 12, data/information generator 15 for creating different information from the information Din of each format based on the translation method dictionary and data/information definition dictionary, and data/information calculation section 16 for adding various types of calculation processing to the information Din of each format if necessary.

Furthermore, the translation section 10 appropriately call at least one of the translation method dictionary modification/consolidation section 17, data/information separation section 18, data/information associating section 19, data/information integrate section 20, data/information modification section 21, data/information consolidation section 22, and data/information definition dictionary modification/consolidation section 23 in accordance with the translation content in translating the information Din and expands the translation function.

When the information Din concerning the modification of the translation method dictionary stored in the translation method dictionary storage 11 is obtained in the process of translation of the information Din, the translation method dictionary modification/consolidation section 17 modifies the translation method dictionary based on the modification information.

When the necessity of dividing the content of the information Din and preparing a plurality of translated pieces of information Din is generated in the process of translation of the information Din, the data/information separation section 18 prepares the modification information if necessary, and adds the information to the translated information Dout.

When the relation is generated between the translated information Dout, between the information Dout stored in the translated/collected data/information storage 24, and between the information Dout and the information Dout stored in the translated/collected data/information storage 24 in the process of translation of the information Din, the data/information associating section 19 prepares the relation information, and adds the relation information to the translated information Dout.

The data/information integrate section 20 obtains the information Dout which can be integrated from the already translated/collected information Dout, and integrates the information with the existing information Dout in the process of translation of the information Din.

When the necessity of modifying the information Dout stored in the translated/collected data/information storage 24 is generated in the process of translation of the information Din, the data/information modification section 21 prepares the modification information for modifying the information Dout, and adds the modification information to the translated information Dout.

When the consolidation information concerning consolidation of the information Dout stored in the translated/collected data/information storage 24 is obtained in the process of translation of the information Din, the data/information consolidation section 22 adds the consolidation information to the translated information Dout.

When the modification information concerning the modification of the data/information definition dictionary stored in the data/information definition dictionary storage 12 is obtained in the process of translation of the information Din, the data/information definition dictionary modification/consolidation section 23 modifies the data/information definition dictionary based on the modification information.

The information Dout translated by the translation apparatus 1 in this manner is stored in the translated/collected data/information storage 24.

The translation operation of the translation apparatus 1 will next be described more concretely.

FIGS. 25 to 36 show flowcharts for using the translation method dictionary shown in FIGS. 15 to 19, 22 and 23 or the translation method dictionary having an XML format 1 to perform the translation processing.

Figure 25:
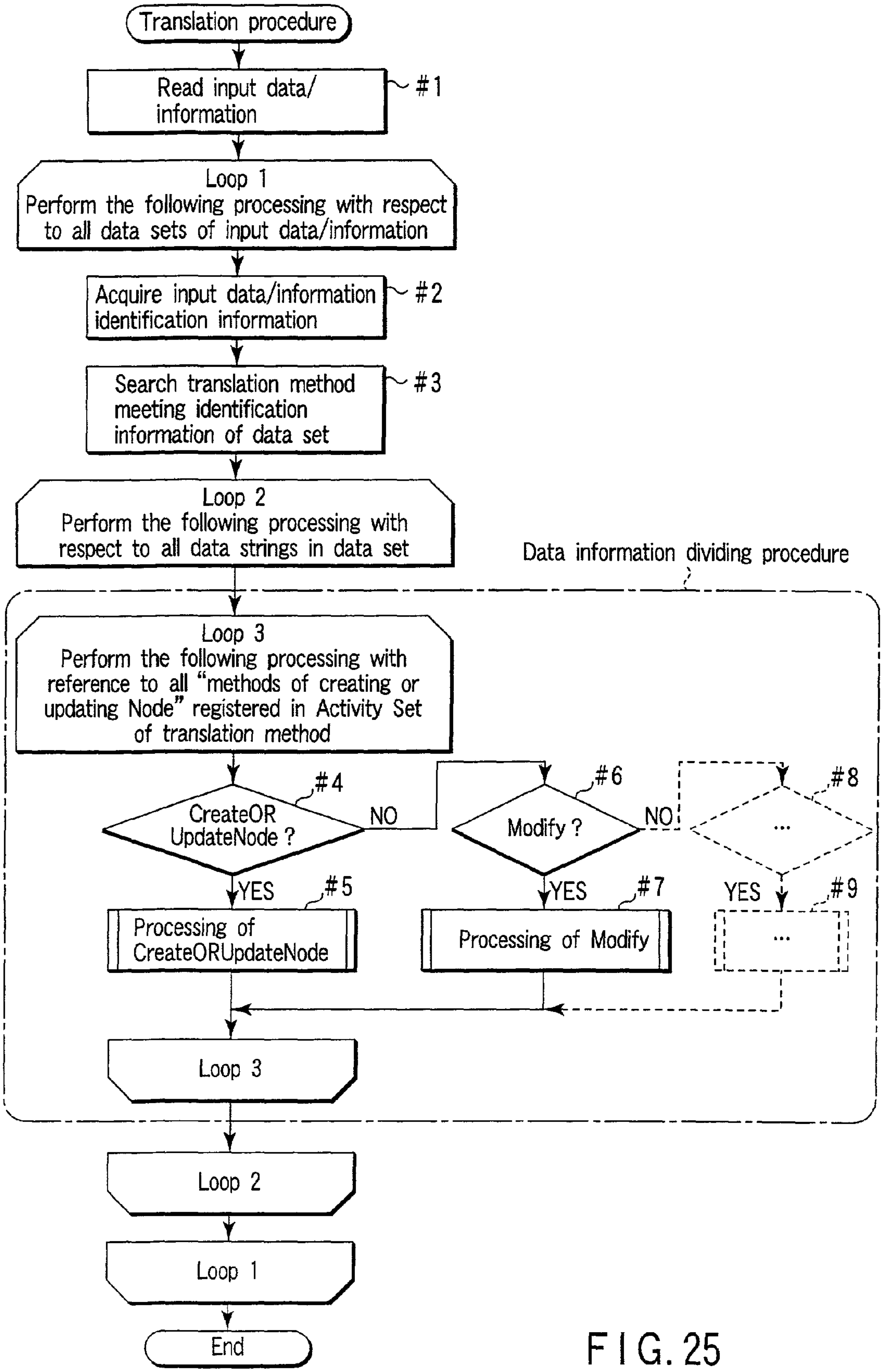
FIG. 25 is a flowchart showing a top-level procedure of a translation processing.

FIG. 25 shows a procedure having a top level of translation processing in the translation procedure. The translation apparatus 1 follows the procedure with the top level of the translation processing, refers to the described content of the translation method dictionary and starts a concrete translation method.

Additionally, when the translation method dictionary having an XML format 2 is used to translate the information, a processing of referring to the method of creating or updating the node such as CreateORUpdateNode, or a processing of referring to the method of creating or updating the element such as CreateORUpdateElement may be changed.

For a change content, the data outputted as the translation result, and the tag indicating the data structure are referred to as such, and the information for creating or updating the information is prepared.

The present embodiment will be described with respect to the following case. The information Din is assumed to be a group of data sets. The data set is constituted of the information for identifying the included information Din, and a group of data strings including the concrete information Din.

The data structure of the information Din is not limited to the data structure of the present embodiment, as long as the inputted concrete information Din can appropriately be associated with the identification information. In the present embodiment, the information Din may appropriately be referred to and the translation procedure may be changed in accordance with the data structure.

Furthermore, the flowcharts of the translation procedure shown in FIGS. 25 to 36 show an example of the processing procedure having a hierarchy structure shown in FIGS. 15 to 18 according to the present embodiment, that is, including the "translation method dictionary", "translation method", "method of creating or updating the node", "method of creating or updating the element", and "method of creating various values with respect to the element" from the upper hierarchy.

The translation apparatus 1 executes the translation processing in accordance with the translation procedure shown in FIG. 25.

First, in step #1, the translation apparatus 1 receives the information Din from the quality control apparatuses 5-1 to 5-n installed in the installation districts 6-1 to 6-n via Internet 3, and reads the information Din having the independent formats so that the translation section 10 can refer to the information.

Subsequently, the translation section 10 repeatedly executes the following processing in loop "1" in order to perform the translation processing with respect to all data sets of the information Din.

In step #2, the translation section 10 acquires the identification information included in each data set. For example, the translation section 10 reads the information Din shown in FIG. 4, and acquires the identification information including JPNCode as the value of the element name of the data classification "1", Japanese as the value of the element name of the data classification "2", and TableJ1 as the value of the element name of the data classification "3" in the processing of the first data set.

Subsequently, the translation section 10 searches the translation method which meets the identification information of the data set in step #3. For example, with the identification information including JPNCode in the value of the element name of the data classification "1", Japanese in the value of the element name of the data classification "2", and TableJ1 in the value of the element name of the data classification "3", the translation section 10 searches for the translation method shown in FIG. 15.

Subsequently, the translation section 10 repeatedly executes the following processing in loop "2" with respect to all the data strings included in the data set being processed. Here, for example, for the first processing object, in the above-described example, the data string described by a solid line in FIG. 4 is an object.

As the processing for translating all the data strings in loop "3", the translation section 10 refers to all the "methods of creating or updating the node" registered in ActivitySet of the above-described searched translation method and performs the following processing.

In step #4, the translation section 10 judges whether or not the "method of creating or updating the node" is described using CreateORUpdateNode. As a result of judgment, when CreateORUpdateNode is used in the description, the translation section 10 shifts to step #5 to start the processing for referring to CreateORUpdateNode.

As a result of judgment of the step #4, the method is not described using CreateORUpdateNode, and the translation section 10 shifts to step #6 and judges whether or not the "method of creating or updating the node" is described using Modify.

As a result of the judgment, the method is described using Modify, and the translation section 10 shifts to step #7, and starts the processing in a case in which Modify is referred to.

Additionally, the "method of creating or updating the node" does not have to be necessarily described only using CreateORUpdateNode and Modify, and may be added/deleted in accordance with a change of variation of the described content.

When the method is not described using CreateORUpdateNode and Modify, the translation section 10 shifts to step #8, #9 for the description with CreateORUpdateNode and Modify.

Thereafter, the translation section 10 repeats the loop "3", refers to all the "methods of creating or updating the node" and completes the processing, then executes the processing of the next data string.

Subsequently, the translation section 10 repeats the loop "2", completes the processing with respect to all the data strings, then executes the processing of the next data set.

Thereafter, the translation section 10 repeats the loop "1", completes the processing with respect to all the data sets, and then ends the translation processing with respect to the input data/information.

Figure 26:
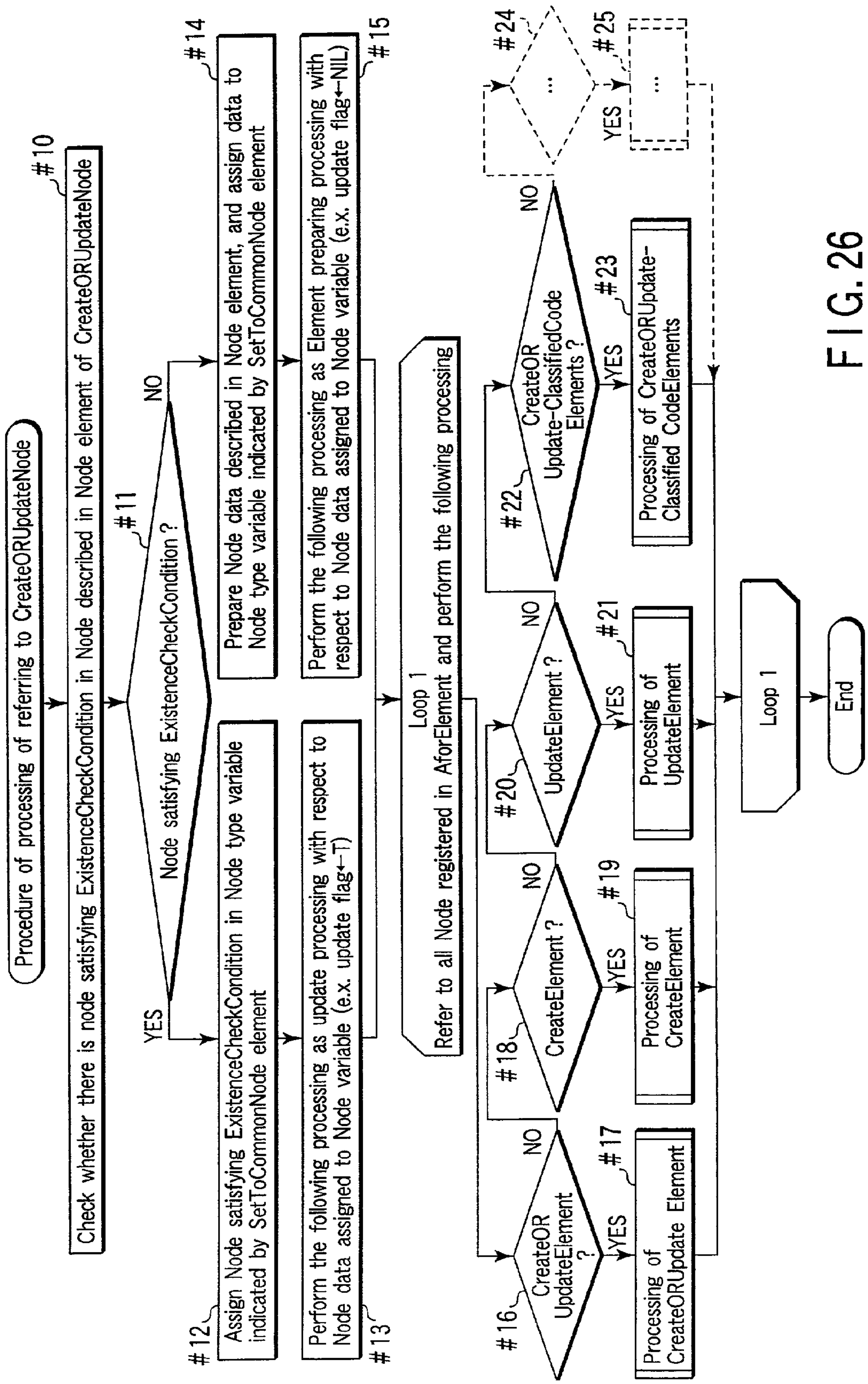
FIG. 26 is a flowchart showing a processing of referring to CreateORUpdateNode.

The processing of CreateORUpdateNode of the step #5 in FIG. 25 will next be described. FIG. 26 is a flowchart showing a processing of referring to CreateORUpdateNode.

In step #10, the translation section 10 judges whether or not there is a node satisfying ExistenceCheckCondition (serial number=product SN) in the nodes (/product data/PCs/note PCc/note PC) described in the node element of CreateORUpdateNode.

As a result of the judgment, when there is the node satisfying ExistenceCheckCondition (serial number=product SN), the translation section 10 shifts to step #12 from #11, and assigns the node satisfying ExistenceCheckCondition to the node type variable (Nodel) indicated by SetToCommonNode element.

The variable (Nodel) designated by the dictionary may be held in a form such that the program concerning the translation processing can be referred to if necessary. In this case, in step #13, the translation section 10 sets the following processing to an update processing with respect to Node data assigned to Node variable (e.g., update flag←T).

As a result of judgment in the step #11, when there is no node satisfying ExistenceCheckCondition (serial number=product SN), the translation section 10 shifts to step #14 from #11, prepares Node data (/product data/PCs/note PCs/note PC) described in Node element, and assigns the data to Node type variable (Nodel) indicated by SetToCommonNode element.

Subsequently, the translation section 10 sets the following processing to Element preparation processing with respect to Node data assigned to Node variable (e.g., update flag←NIL).

In the loop "1", the translation section 10 refers to the node in which all the "methods of creating or updating Element" registered in ActivitySet element of CreateORUpdateNode are described and performs the following processing.

In step #16, the translation section 10 judges whether or not the node registered in AforElement is described using CreateORUpdateElement.

As a result of judgment, the node is described using CreateORUpdateElement, and then the translation section 10 shifts to step #17 and starts a processing in a case in which CreateORUpdateElement is referred to.

As a result of the judgment of the step #16, the node is not described using CreateORUpdateElement, and then the translation section 10 shifts to step #18 and judges whether or not the node registered in AforElement is described using CreateElement.

As a result of the judgment, the node is described using CreateElement, and then the translation section 10 shifts to step #19 and starts a processing in which CreateElement is referred to.

As a result of the judgment of the step #18, the node is not described using CreateElement, and then the translation section 10 shifts to step #20 and judges whether or not the node registered in AforElement is described using UpdateElement.

As a result of the judgment, the node is described using UpdateElement, and then the translation section 10 shifts to step #21 and starts a processing in a case in which UpdateElement is referred to.

As a result of the judgment of the step #20, the node is not described using UpdateElement, and then the translation section 10 shifts to step #22 and judges whether or not the node registered in AforElement is described using CreateORUpdateClassifiedCodeElements.

As a result of the judgment, the node is described using CreateORUpdateClassifiedCodeElements, and then the translation section 10 shifts to step #23 and starts a processing in a case in which CreateORUpdateClassifiedCodeElements are referred to.

Additionally, each node registered in AforElement does not have to be necessarily described using only CreateORUpdateElement, CreateElement, UpdateElement and CreateORUpdateClassifiedCodeElements, and may be added/deleted in accordance with the change of variation of the described content.

When the node is not described in this manner, the translation section 10 shifts to step #24, #25 corresponding to the description.

When the processing ends referring to all the nodes registered in AforElement, the translation section 10 ends the translation processing referring to one CreateORUpdateNode.

Figure 27:
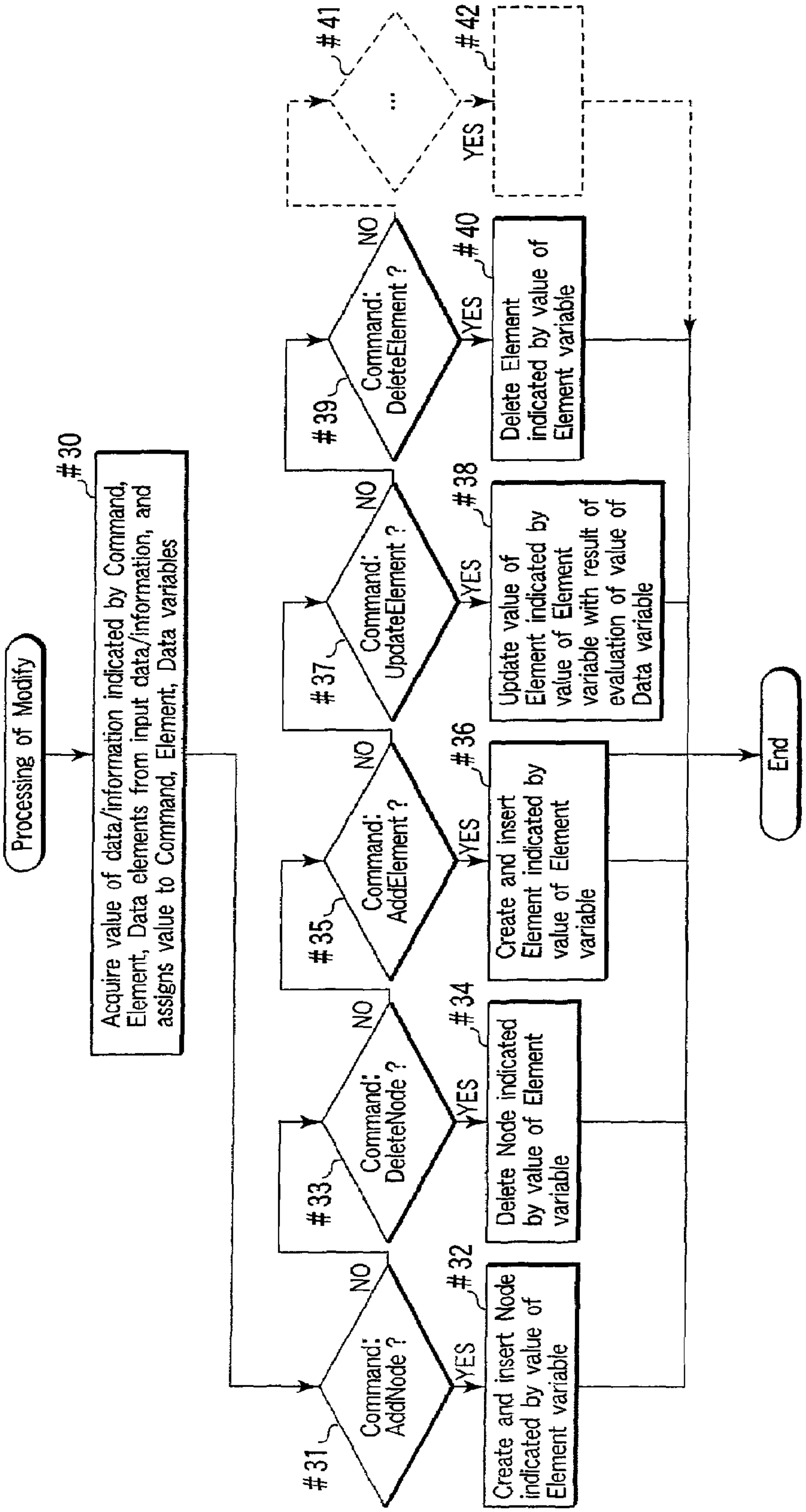
FIG. 27 is a flowchart showing a processing of referring to Modify.
Figure 28:
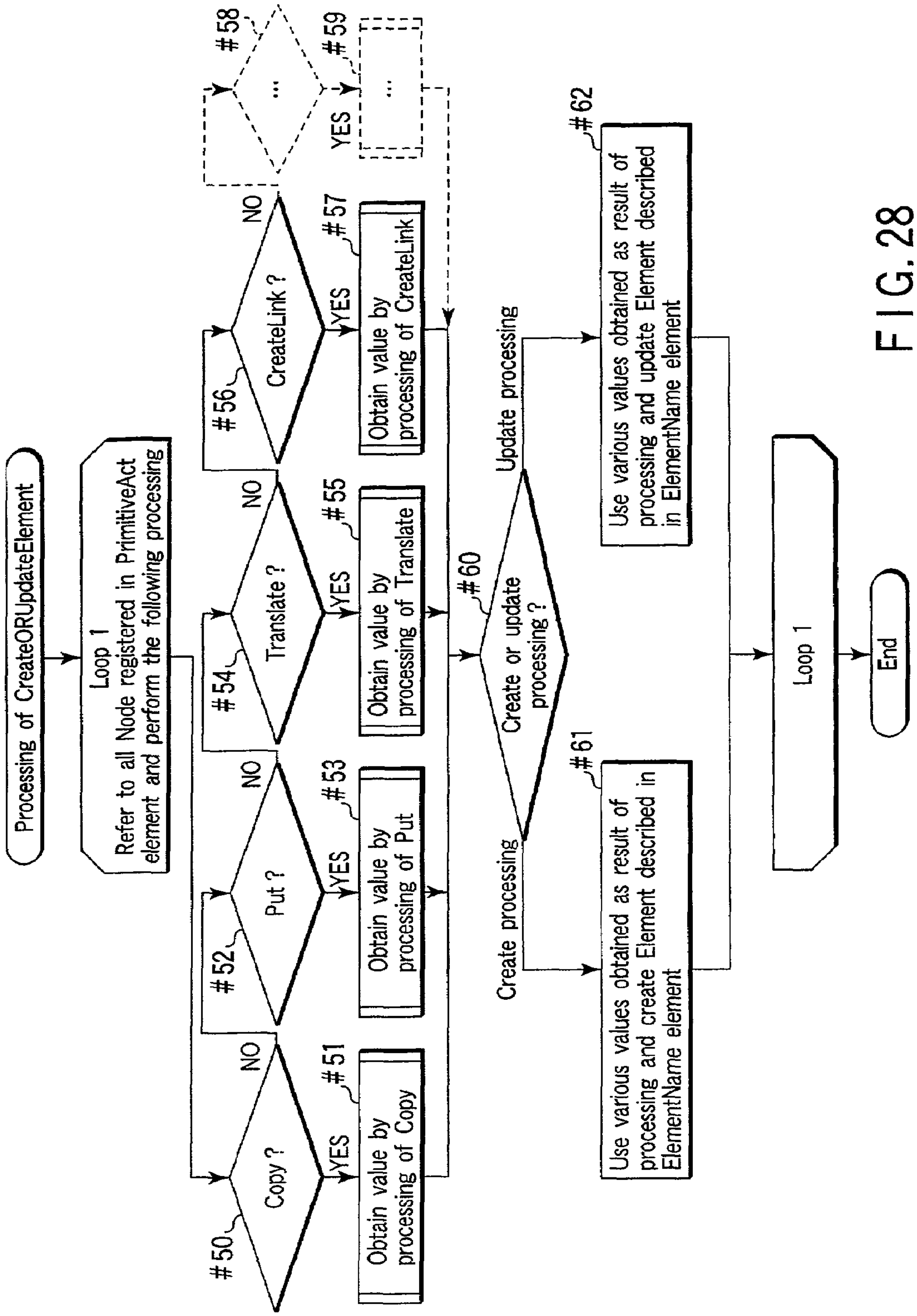
FIG. 28 is a flowchart showing a processing of CreateORUpdateElement.

The processing of Modify of the step #7 in FIG. 28 will next be described. FIG. 27 is a flowchart showing a processing referring to Modify.

In step #30, the translation section 10 acquires the values of the information Din indicated by Command, Element, Data elements from the information Din, and assigns the values to Command, Element, and Data variables.

For example, the description of the translation method dictionary referred to when the information Din has the content shown in FIG. 10 is Modify shown in FIG. 19. In Modify, the Command, Element, and Data elements are as follows:

"/input data, information/data set[$DS_current]/data string[$DL_current]/Command";

"/input data, information/data set[$DS_current]/data string[$DL_current]/Element"; and "/input data, information/data set[$DS_current]/data string[$DL_current]/Data".

For example, with the values in the data string shown in FIG. 10, the values of the information Din shown by the description are as follows:

Command: UpdateElement;

Element:/translation method dictionary/translation method [data classification "1"=JPNCorp and data classification "2"=Japanese and data classification "3"=TableJ1]/CreateORUpdateNode /CreateORUpdateElement /Translate /GcodeDefSearchRoot; and Data: /product, part root/product, part category [GlobalCode=GPC].

Here, the translation section 10 judges whether or not Command is AddNode in step #31.

As a result of the judgment, when Command is AddNode, the translation section 10 shifts to step #32 and creates and inserts the node indicated by the value of Element variable.

Subsequently, as a result of the judgment of the step #31, Command is not AddNode, and then the translation section 10 shifts to step #33 and judges whether or not Command is DeleteNode.

As a result of the judgment, when Command is DeleteNode, the translation section 10 shifts to step #34 and deletes the node indicated by the value of Element variable.

Subsequently, as a result of the judgment of the step #33, Command is not DeleteNode, and then the translation section 10 shifts to step #35 and judges whether or not Command is AddElement.

As a result of the judgment, when Command is AddElement, the translation section 10 shifts to step #36 and creates and inserts the element indicated by the value of Element variable.

Subsequently, as a result of the judgment of the step #35, Command is not AddElement, and then the translation section 10 shifts to step #37 and judges whether or not Command is UpdateElement.

As a result of the judgment, when Command is UpdateElement, the translation section 10 shifts to step #38 and updates the value of Element indicated by the value of Element variable with a result of evaluation of the value of Data variable. In this example, the portion of Translate shown in FIG. 15 is modified as shown in FIG. 13.

Subsequently, as a result of the judgment of the step #37, Command is not UpdateElement, and then the translation section 10 shifts to step #39 and judges whether or not Command is DeleteElement.

As a result of the judgment, when Command is DeleteElement, the translation section 10 shifts to step #40 and deletes Element indicated by the value of Element variable.

Additionally, each node registered in Modify element does not have to be necessarily described using only AddNode, DeleteNode, AddElement, UpdateElement and DeleteElement, and may be added/deleted in accordance with the change of variation of the described content.

When the node is not described in this manner, the translation section 10 shifts to step #41, #42 corresponding to the description.

A processing of CreateORUpdateElement in the step #17 shown in FIG. 26 will next be described. FIG. 28 is a flowchart showing the processing of CreateORUpdateElement.

The translation section 10 repeats the loop "1", refers to the node in which all the "methods of creating various values with respect to Element" registered in PrimitiveAct element are described and performs the following processing.

First, in step #50, the translation section 10 whether or not the node is Copy. With Copy, the section shifts to step #51 and obtains the value by the processing of Copy.

Figure 31:
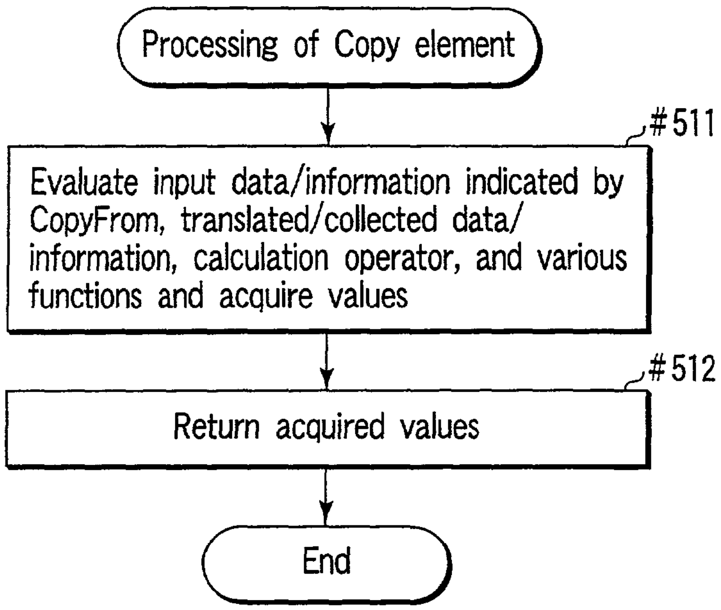

The processing of Copy is executed according to the flowchart showing the procedure of the processing in a case in which Copy as one of the "methods of creating various values with respect to Element" shown in FIG. 31 is referred to.

In step #511, the translation section 10 evaluates the input data/information Din indicated by CopyFrom, translated/collected data/information Dout, calculation operator, and various functions and acquires the values.

Subsequently, in step #512, the translation section 10 returns these acquired values and ends the processing with reference to Copy.

Again, the translation section 10 returns to the step #50. As a result of the judgment, the node is not Copy, and then the section shifts to step #52 and judges whether or not the node is Put.

Figure 32:
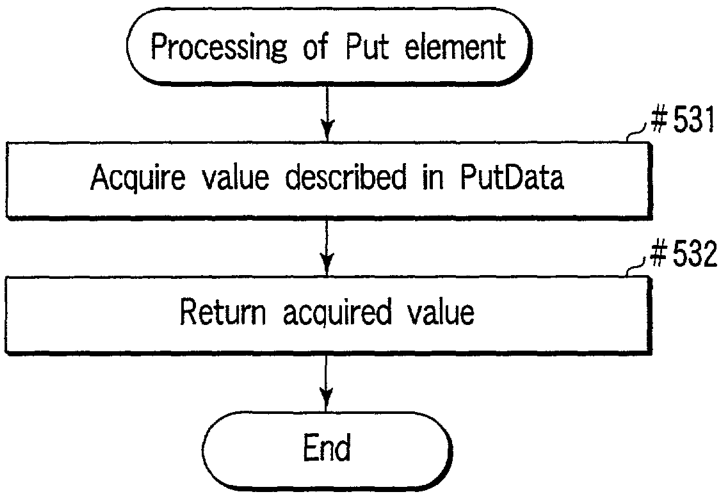

As a result of the judgment, when the node is Put, the translation section 10 shifts to step #53 and obtains the value by the processing of Put. The processing of Put is executed according to the flowchart showing the procedure of the processing in a case in which Put as one of the "methods of creating various values with respect to Element" shown in FIG. 32 is referred to.

The translation section 10 acquires the value described in PutData in step #531.

Subsequently, the translation section 10 returns the acquired value and ends the processing with reference to Put in step #532.

Again, the translation section 10 returns to the step #52. As a result of the judgment, the node is not Copy, and then the section shifts to step #54, and judges whether or not the node is Translate.

Figure 33:
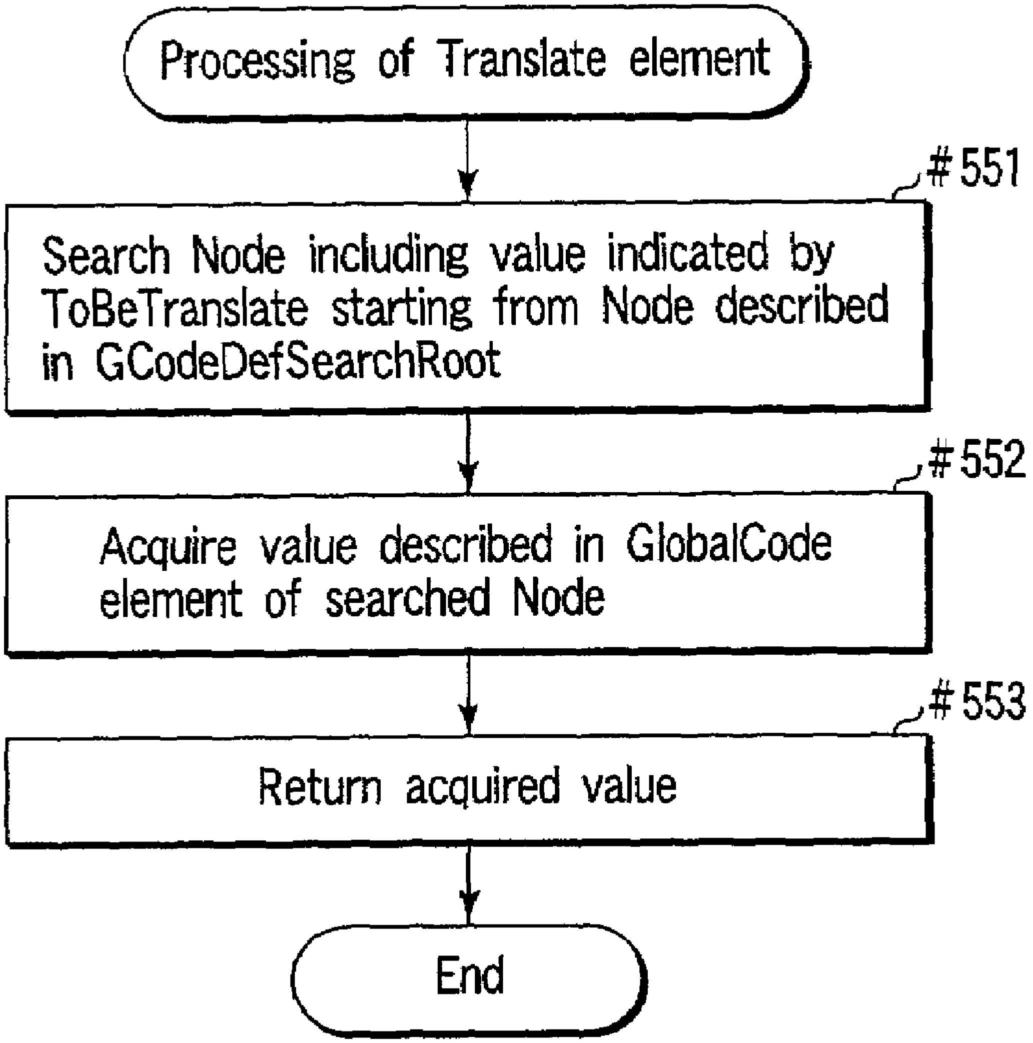

As a result of the judgment, when the node is Translate, the translation section 10 shifts to step #55 and obtains the value by the processing of Translate. The processing of Translate is executed according to the flowchart showing the procedure of the processing in a case in which Translate as one of the "methods of creating various values with respect to Element" shown in FIG. 33 is referred to.

In step #551, the translation section 10 starts with the node described in GCodeDefSearchRoot, and searches the node including the value indicated by ToBeTranslate.

Subsequently, in step #552, the translation section 10 acquires the value registered in GlobalCode element of the searched node.

Subsequently, in step #553, the translation section 10 returns the acquired value and ends the processing of referring to Translate.

Again, the translation section 10 returns to the step #54. As a result of the judgment, the node is not Translate, and then the section shifts to step #56, and judges whether or not the node is CreateLink.

Figure 34:
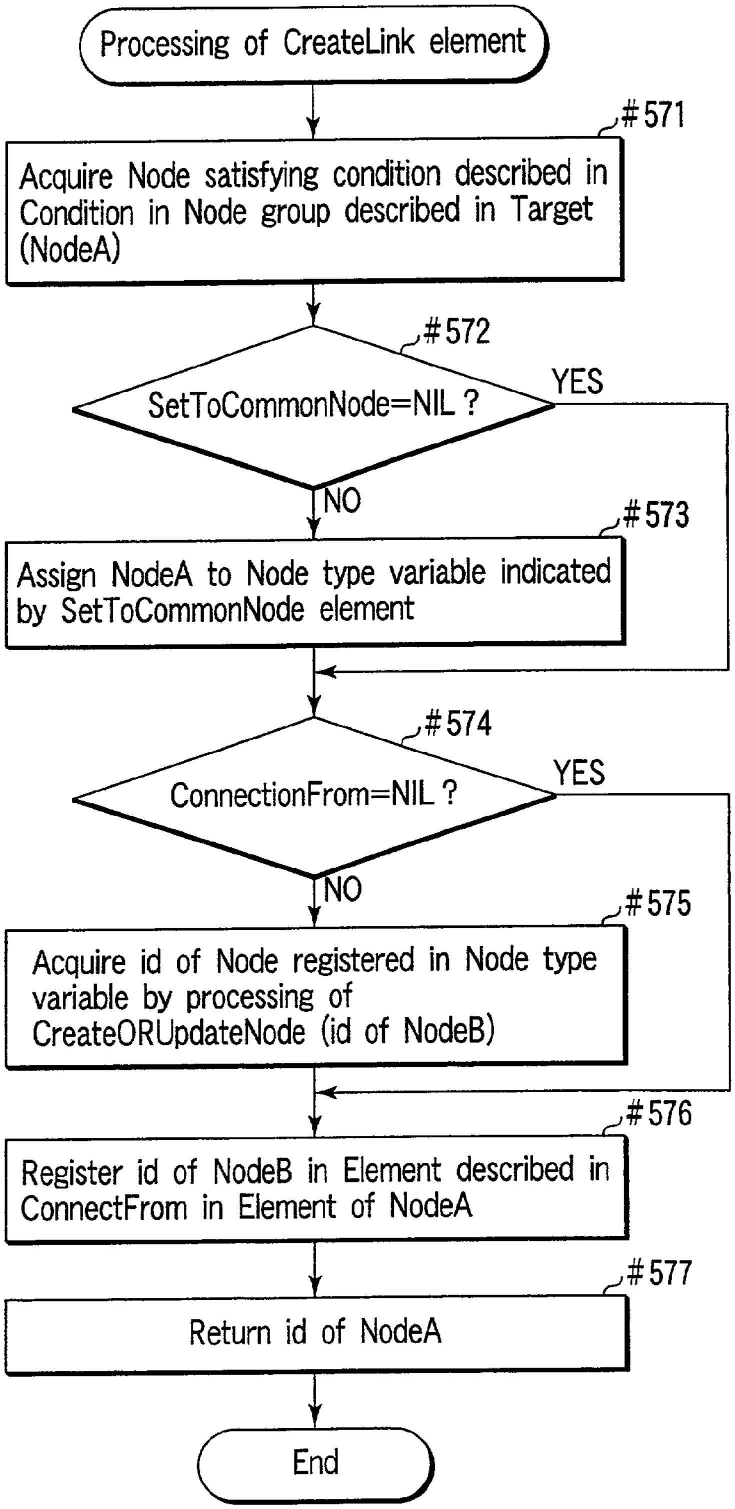

As a result of the judgment, when the node is CreateLink, the translation section 10 shifts to step #57 and obtains the value by the processing of CreateLink. The processing of CreateLink is executed according to the flowchart showing the procedure of the processing in a case in which CreateLink as one of the "methods of creating various values with respect to Element" shown in FIG. 34 is referred to.

In step #571, the translation section 10 acquires Node satisfying the condition described in Condition in Node group described in Target (NodeA).

Next in step #572, the translation section 10 judges whether or not SetToCommonNode=NIL.

As a result of the judgment, if not SetToCommonNode=NIL, the translation section 10 shifts to step #573 and assigns NodeA to Node type variable indicated by SetToCommonNode element.

Next, as a result of the judgment of the step #572, with SetToCommonNode=NIL, or after the processing of the step #573, in step #574 the translation section 10 judges whether or not ConnectionFrom=NIL.

As a result of the judgment, if not ConnectionFrom=NIL, the translation section 10 shifts to step #575, and acquires id of Node registered in Node type variable in the processing of CreateORUpdateNode (id of NodeB).

Next, as a result of the judgment of the step #574, with ConnectionFrom=NIL, or after the processing of the step #575, in step #576 the translation section 10 registered id of NodeB in Element described in ConnectFrom among Element of NodeA.

Subsequently, in step #577, the translation section 10 returns id of NodeA. Thereby, the translation section 10 returns the acquired value and ends the processing with reference to CreateLink.

Again, the translation section 10 advances to step #60, and judges a create processing or an update processing.

As a result of the judgment, with the create processing, the translation section 10 shifts to step #61, and uses various values obtained by the processing result to create Element described in ElementName element.

As a result of the judgment of the step #60, with the update processing, the translation section 10 shifts to step #62, and uses various values obtained as the result of the processing to update Element described in ElementName element.

Thereafter, the translation section 10 repeats the loop "1", performs the processing with reference to all the nodes registered in PrimitiveAct element, and ends the processing of translation with reference to CreateORUpdateElement.

The processing of CreateElement in the step #19 shown in FIG. 26 will next be described. FIG. 29 is a flowchart showing the processing of CreateElement.

In step #70, the translation section 10 judges whether or not the processing is the create processing. As a result of judgment, when the processing is called in the create processing, the translation section 10 performs the following processing. When the processing is not in the create processing, the translation section 10 ends the processing.

With the create processing, the translation section 10 refers to Node in which all "the create methods of various values with respect to Element" registered in PrimitiveAct element are described and performs the following processing.

First, in step #71, the translation section 10 whether or not the node is Copy. With Copy, the section shifts to step #72 and obtains the value by the processing of Copy. The processing of Copy is executed according to the flowchart showing the procedure of the processing in a case in which Copy as one of the "methods of creating various values with respect to Element" shown in FIG. 31 is referred to. Additionally, since the processing of Copy is similar to the above-described processing, the description thereof is omitted.

Subsequently, the translation section 10 returns to the step #71. As a result of the judgment, the node is not Copy, and then the section shifts to step #73 and judges whether or not the node is Put.

As a result of the judgment, when the node is Put, the translation section 10 shifts to step #74 and obtains the value by the processing of Put. The processing of Put is executed according to the flowchart showing the procedure of the processing in a case in which Put as one of the "methods of creating various values with respect to Element" shown in FIG. 32 is referred to.

Subsequently, the translation section 10 returns to the step #73. As a result of the judgment, the node is not Put, and then the section shifts to step #75 and judges whether or not the node is Translate.

As a result of the judgment, when the node is Translate, the translation section 10 shifts to step #76 and obtains the value by the processing of Translate. The processing of Translate is executed according to the flowchart showing the procedure of the processing in a case in which Translate as one of the "methods of creating various values with respect to Element" shown in FIG. 33 is referred to. Additionally, since the processing of Translate is similar to the above-described processing, the description thereof is omitted.

Subsequently, the translation section 10 returns to the step #75. As a result of the judgment, the node is not Translate, and then the section shifts to step #77 and judges whether or not the node is CreateLink.

As a result of the judgment, when the node is CreateLink, the translation section 10 shifts to step #78 and obtains the value by the processing of CreateLink. The processing of CreateLink is executed according to the flowchart showing the procedure of the processing in a case in which CreateLink as one of the "methods of creating various values with respect to Element" shown in FIG. 34 is referred to. Additionally, since the processing is similar to the above-described processing, the description thereof is omitted.

Subsequently, in step #81, the translation section 10 uses various values obtained as the result of the processing and creates Element described in ElementName element.

Thereafter, the translation section 10 ends the processing with reference to all Node registered in PrimitiveAct element, and then ends the processing of translation with reference to CreateElement.

A processing of UpdateElement in step #21 shown in FIG. 26 will next be described. FIG. 30 is a flowchart showing the processing of UpdateElement.

In step #90, the translation section 10 judges whether or not the processing is the update processing. As a result of judgment, when the processing is called in the update processing, the translation section 10 performs the following processing. When the processing is not in the update processing, the translation section 10 ends the processing.

With the update processing, the translation section 10 refers to Node in which all "the create methods of various values with respect to Element" registered in PrimitiveAct element are described and performs the following processing.

First, in step #91, the translation section 10 whether or not the node is Copy. With Copy, the section shifts to step #92 and obtains the value by the processing of Copy. The processing of Copy is executed according to the flowchart showing the procedure of the processing in a case in which Copy as one of the "methods of creating various values with respect to Element" shown in FIG. 31 is referred to. Additionally, since the processing of Copy is similar to the above-described processing, the description thereof is omitted.

Subsequently, the translation section 10 returns to the step #91. As a result of the judgment, the node is not Copy, and then the section shifts to step #93 and judges whether or not the node is Put.

When the node is Put, the translation section 10 shifts to step #94 and obtains the value by the processing of Put. The processing of Put is executed according to the flowchart showing the procedure of the processing in a case in which Put as one of the "methods of creating various values with respect to Element" shown in FIG. 32 is referred to. Additionally, since the processing of Put is similar to the above-described processing, the description thereof is omitted.

Subsequently, the translation section 10 returns to the step #93. As a result of the judgment, the node is not Put, and then the section shifts to step #95 and judges whether or not the node is Translate.

As a result of the judgment, when the node is Translate, the translation section 10 shifts to step #96 and obtains the value by the processing of Translate. The processing of Translate is executed according to the flowchart showing the procedure of the processing in a case in which Translate as one of the "methods of creating various values with respect to Element" shown in FIG. 33 is referred to. Additionally, since the processing of Translate is similar to the above-described processing, the description thereof is omitted.

Subsequently, the translation section 10 returns to the step #95. As a result of the judgment, the node is not Translate, and then the section shifts to step #97 and judges whether or not the node is CreateLink.

With CreateLink, the translation section 10 shifts to step #98 and obtains the value by the processing of CreateLink. The processing of CreateLink is executed according to the flowchart showing the procedure of the processing in a case in which CreateLink as one of the "methods of creating various values with respect to Element" shown in FIG. 34 is referred to. Additionally, since the processing is similar to the above-described processing, the description thereof is omitted.

Subsequently, in step #101, the translation section 10 uses various values obtained as the result of the processing and creates Element described in ElementName element.

Thereafter, the translation section 10 ends the processing with reference to all Node registered in PrimitiveAct element, and then ends the processing of translation with reference to UpdateElement.

Figure 35:
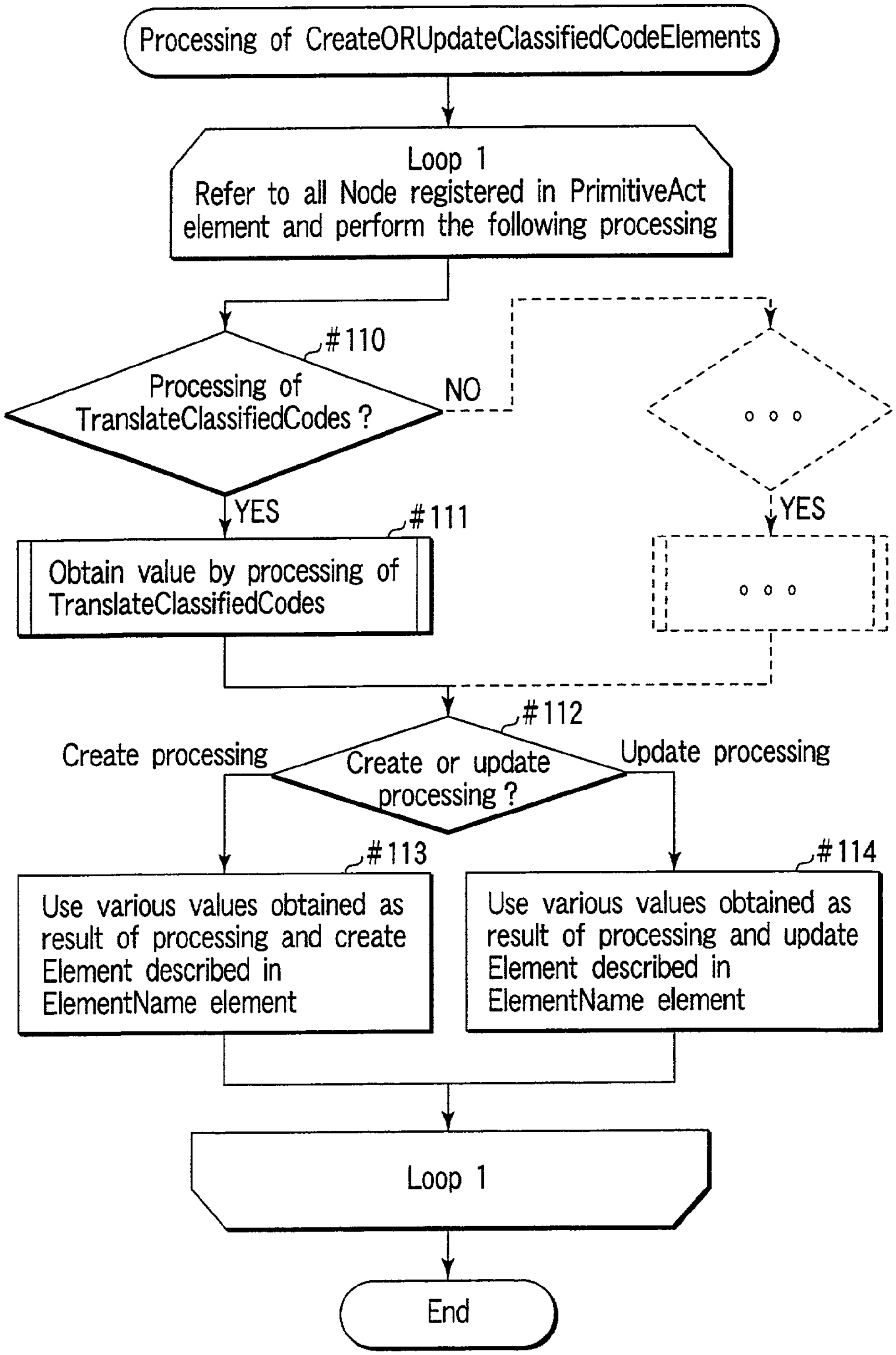
FIG. 35 is a flowchart showing the processing of CreateORUpdataClassifiedCodeElements.

A processing of CreateORUpdateClassifiedCodeElements in step #23 shown in FIG. 26 will next be described in which the "method of creating or updating Element" is described. FIG. 35 is a flowchart showing the processing of CreateORUpdateClassifiedCodeElements.

The translation section 10 repeats the loop 1, refers to all Node registered in PrimitiveAct element and performs the following processing.

In step #110, the translation section 10 judges whether or not the processing is TranslateClassifiedCodes.

As a result of judgment, with the processing of TranslateClassifiedCodes, the translation section 10 shifts to step #111 and obtains values by the processing of TranslateClassifiedCodes.

Figure 36:
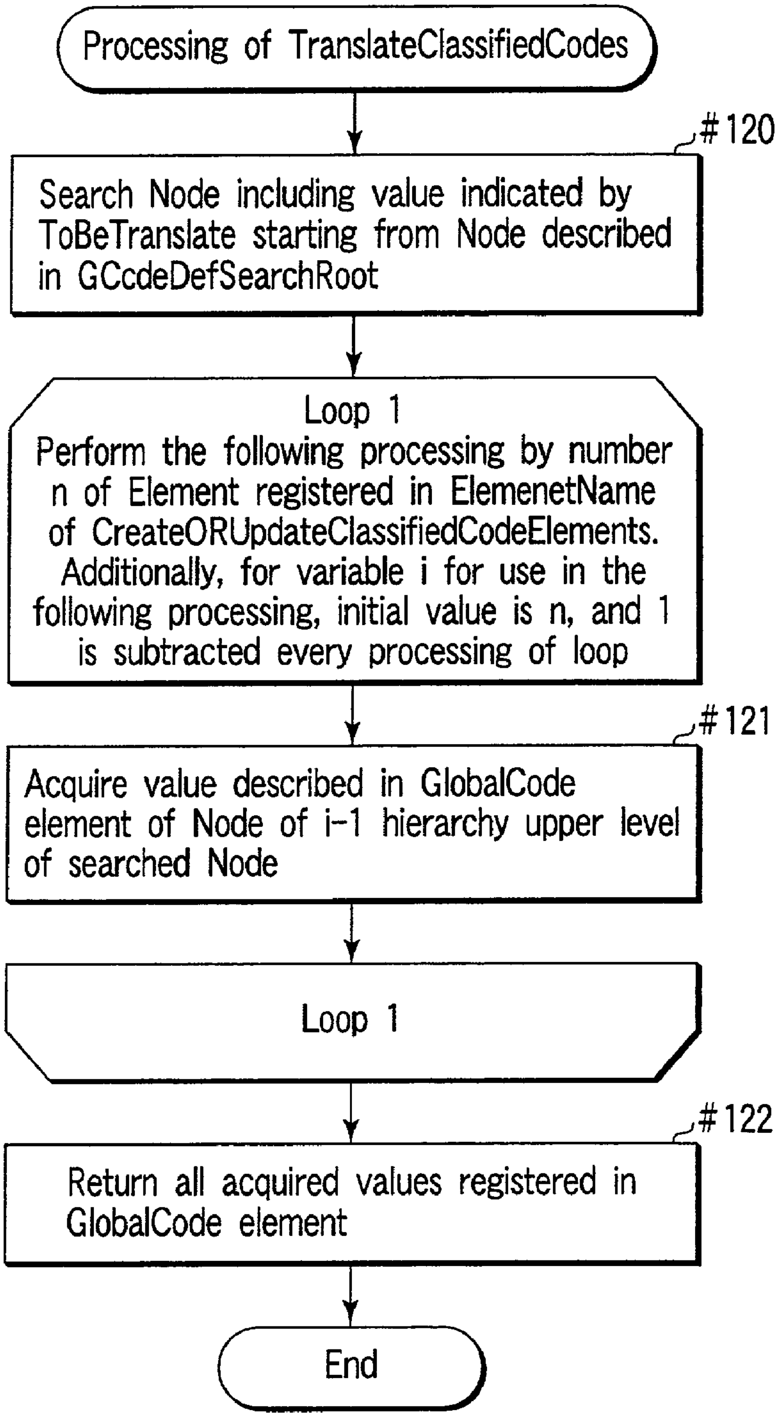

The processing of TranslateClassifiedCodes is performed by executing the flowchart showing the procedure of the processing in a case in which TranslateClassifiedCodes as one of the "methods of creating various values with respect to Element" shown in FIG. 36 are referred to.

In step #120, the translation section 10 searches the node including the value indicated by ToBeTranslate starting from Node described in GCodeDefSearchRoot.

Subsequently, the translation section 10 repeats the loop 1, and performs the following processing by the number n of Element registered in ElementName of CreateORUpdateClassifiedCodeElements.

Additionally, for a variable I for use in the following processing, an initial value is n, and 1 is subtracted every processing of the loop.

In step #121, the translation section 10 acquires the value registered in GlobalCode element of Node of i-1 hierarchy upper level of searched Node.

Here, the translation section 10 repeats the processing I times and ends the processing.

Subsequently, in step #122, the translation section 10 returns all the acquired values registered in the GlobalCode element.

Again, in the step #112, the translation section 10 judges whether the processing is the create processing or the update processing.

As a result of the judgment, with the create processing, the translation section 10 shifts to step #113 and uses various values obtained as the result of the processing to create Element described in the ElementName element.

As a result of the judgment of the step #112, with the update processing, the translation section 10 shifts to step #114, and uses various values obtained as the result of the processing to update Element described in the ElementName element.

After performing the processing with respect to all the nodes, the translation section 10 ends the processing in the case in which TranslateClassifiedCodes are referred to.

As a result of the above-described translation operation, the translation section 10 first inputs and translates the information Din collected, for example, from the quality control apparatus 5-1 and having the representing format shown in FIG. 3, and acquires the information Dout as the translated result shown in FIG. 11.

The information Dout includes the node of the note PC, "note PC defect phenomenon" related with the node of the note PC, further "note PC defect phenomenon", "part CD-ROM-Drive", "note PC defect phenomenon total data", and the like.

Subsequently, the translation section 10 translates the information Din collected from the quality control apparatus 5-2 and having the representing format shown in FIG. 5, and acquires the information Dout as the translated result shown in FIG. 13. The information Din having the representing format shown in FIG. 5 is different in the representing format from the information Din having the representing format shown in FIG. 3.

As described above, the information Dout includes the node of the note PC, "note PC defect phenomenon" related with the node of the note PC, further "note PC defect phenomenon", "part CD-ROM-Drive", "note PC defect phenomenon total data", and the like.

Subsequently, the translation section 10 inputs and translates the information Din collected from the quality control apparatus 5-n and shown in FIG. 7, and acquires the information Dout as the translated result shown in FIG. 14. The representing format of the information Din shown in FIG. 7 is different from the representing format of the information Din shown in FIGS. 3 and 5.

As described above, the information Dout includes the node of the note PC, "note PC defect phenomenon" related with the node of the note PC, further "note PC defect phenomenon", "part CD-ROM-Drive", "note PC defect phenomenon total data", and the like.

As a result, the translation section 10 translates the information Din having different representing formats, and acquires the information Dout having the same representing format shown in FIGS. 11 to 14. The information Dout is stored in the translated/collected data/information storage 24.

On the other hand, the data/information sophistication section 26 monitors the freshness of the information Dout stored in the translated/collected data/information storage 24. The information Dout whose freshness drops is monitored. Then, the data/information sophistication section 26 notifies a supplier of the information Dout having the freshness drop (data/information source) of the freshness drop.

A notifying method comprises: notifying freshness information via E-Mail; or notifying link to the freshness information. Moreover, the method of notification comprises: modifying the information Dout stored in the translated/collected data/information storage 24 based on the interchange with the information source.

During the modification, the information source does not have to necessarily perform the modification. A modification operation may be requested.

Figure 37:
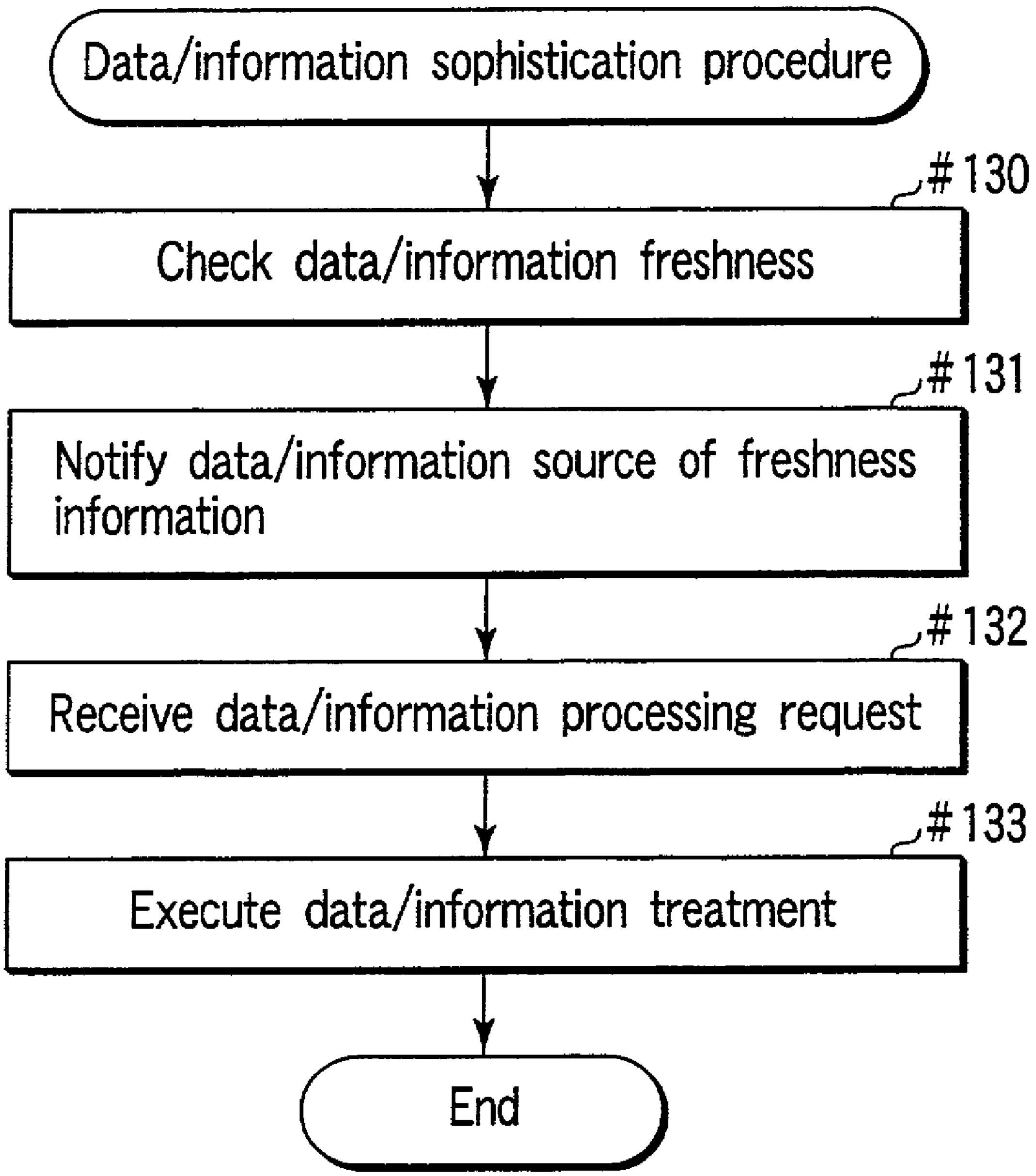
FIG. 37 is a flowchart of a data/information sophistication processing procedure.

The data/information sophistication section 26 executes a data/information sophistication processing according to a flowchart of a data/information sophistication processing procedure concretely shown in FIG. 37.

First, in step #130, the data/information sophistication section 26 checks the freshness of the information Dout. The freshness of the information Dout is judged based on matters concerning the maintenance of the data, such as a time elapsed since the preparation of the information Dout, and consistency of the classification, code definition, structure, evaluation standard and unit system of the information Dout on the translated/collected data/information storage 24.

As a result of the freshness check, when there is the information Dout having the freshness drop, in the next step #131, the data/information sophistication section 26 notifies the information source of the freshness information.

Next in step #132, the data/information sophistication section 26 receives a treatment request of the information. In the next step #133, the data/information sophistication section 26 executes the treatment of the information.

Furthermore, the data/information sophistication section 26 modifies the translation method dictionary stored in the translation method dictionary storage 11, and the data/information definition stored in the data/information definition dictionary storage 12.

Additionally, the data/information sophistication section 26 monitors the freshness of the translation method dictionary stored in the translation method dictionary storage 11 and data/information definition stored in the data/information definition dictionary storage 12.

There is one or both of the translation method dictionary and data/information definition dictionary whose freshness is monitored to have dropped. In this case, the data/information sophistication section 26 notifies the translation method dictionary storage 11 and/or the data/information definition dictionary storage 12 of the freshness drop.

Furthermore, the data/information sophistication section 26 may supply the service information concerning the freshness maintenance of the data/information to the translated/collected data/information storage/maintenance fee calculator. When there is a request of the modification operation, the information is also calculated as the counter value.

Subsequently, the data/information disclosure section 25 refers to and discloses the information Dout stored in the translated/collected data/information storage 24. For example, the data/information disclosure section 25 displays the information Dout in the display, or sends the information to the quality control apparatuses 5-1 to 5-n via the Internet 3.

In this case, the data/information disclosure section 25 directly refers to and discloses the translated information Dout. Moreover, the data/information disclosure section 25 processes and discloses the information Dout to be referred to if necessary. Furthermore, to display the information Dout, the data/information disclosure section 25 discloses the data useful for advertisement or the link information to the data useful for advertisement.

The data/information disclosure section 25 executes a data/information disclosure processing according to a flowchart of a data/information disclosure processing procedure concretely shown in FIG. 38.

First, the data/information disclosure section 25 acquires a disclosure request of the data/information Dout in step #140.

Next in step #141, the data/information disclosure section 25 searches the data/information Dout.

Next in step #142, the data/information disclosure section 25 selects an advertisement effect of the data/information Dout.

Next in step #143, the data/information disclosure section 25 determines a disclosure form of the data/information Dout.

Next in step #144, the data/information disclosure section 25 prepares display data in order to disclose the data/information Dout in accordance with the disclosure form.

Next in step #145, the data/information disclosure section 25 transfers the display data to the display or the quality control apparatuses 5-1 to 5-n.

Moreover, the data/information disclosure section 25 may dispose a calculation standard concerning a processing of indirectly producing the advertisement effect by a disclosure method of the information Dout to disclose, not by direct advertisement data.

Examples of the calculation standard include: adjustment of a display size of the information Dout during the disclosure of the information Dout; application of symbols and marks which easily and visually attract attentions; adjustment of a display order; adjustment of a disclosure timing; redundant disclosure; rendition for attracting attentions using image and sound during the disclosure of the data/information; and the like.

The data/information disclosure section 25 totals, classifies and displays a plurality of pieces of information Dout, when reading the information Dout stored in the translated/collected data/information storage 24 and displaying the information in the display.

As shown in FIGS. 11 to 14, the information Dout is represented by the same representing format of the nodes such as the note PC, "note PC defect phenomenon", "note PC defect phenomenon", "part CD-ROM-Drive", and "note PC defect phenomenon total data".

Thereby, the data classified and totaled, for example, by the classifications of dates, products, parts, phenomena, treatments, steps and transmitters can be acquired from each node.

The information Dout, for example, of the quality control apparatuses 5-1 to 5-n installed in the installation districts 6-1 to 6-n can also be totaled and classified. That is, the information Dout of the quality control apparatuses 5-1 to 5-n is stored in the translated/collected data/information storage 24.

Therefore, when a plurality of pieces of information Dout stored in the translated/collected data/information storage 24 are read, the information Dout of the quality control apparatuses 5-1 to 5-n can be totaled and classified.

Calculation of the fee of translation will next be described.

The translation fee calculator 31 prepares the data concerning the counter value to the translation processing in accordance with the use situation of the translation section 10. In this case, the translation fee calculator 31 also uses the use situation of each processing section called and executed by the translation section 10 as the calculation object.

Moreover, the translation fee calculator 31 changes the calculation method of the counter value/price, charging destination and bill collection method by each processing section called from the translation section 10.

Additionally, examples of the processing section concerning the fee required for the translation include, translation method dictionary interpreter 13, data/information definition referring section 14, data/information generator 15, data/information calculation section 16, further translation method dictionary modification/consolidation section 17, data/information separation section 18, data/information associating section 19, data/information integrate section 20, data/information modification section 21, data/information consolidation section 22, and data/information definition dictionary modification/consolidation section 23.

Figure 39:
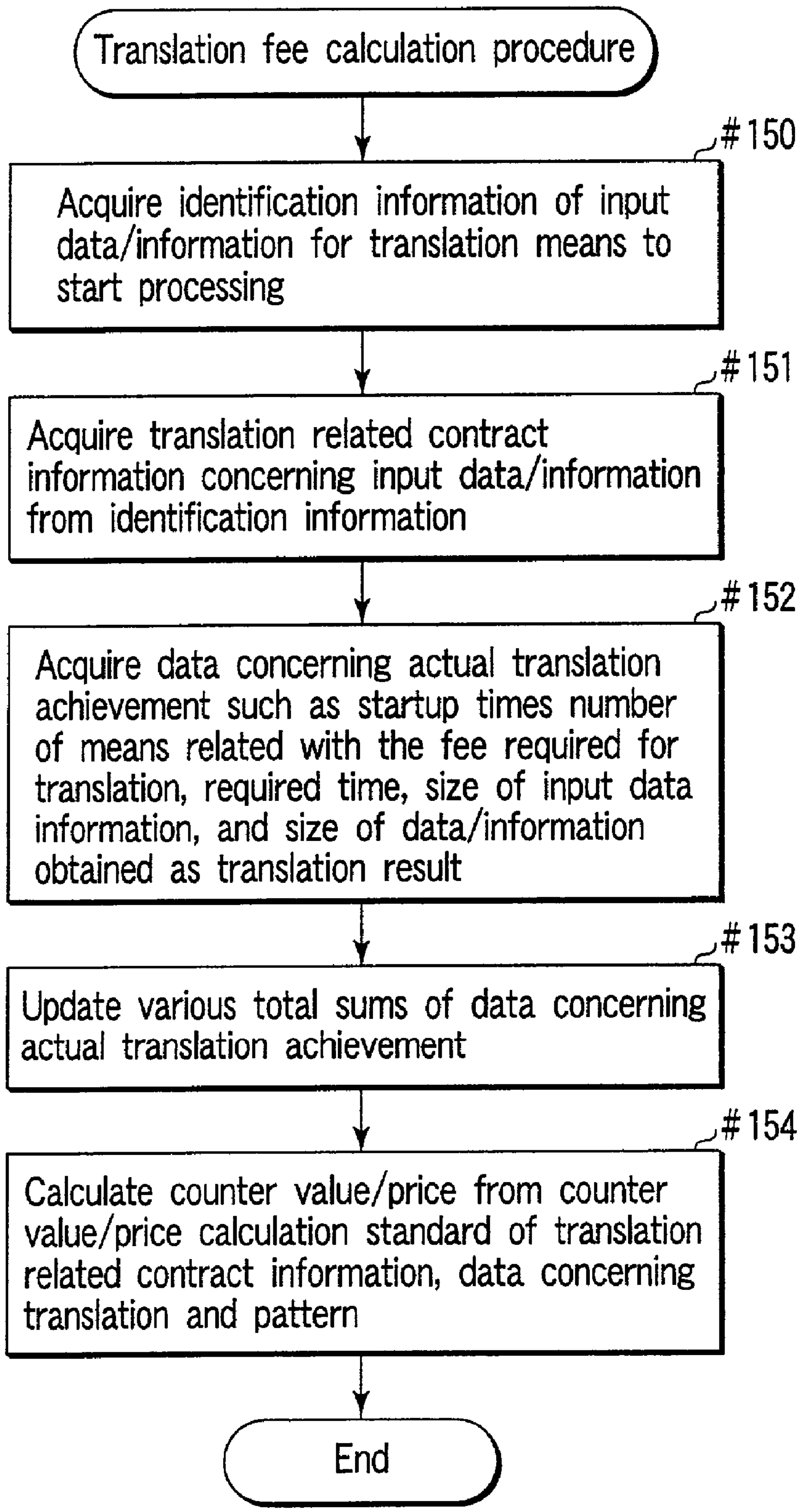
FIG. 39 is a flowchart of a procedure of a translation fee calculation processing.

Concretely, the translation fee calculator 31 executes the flowchart of the procedure of a translation fee calculation processing shown in FIG. 39 and calculates the translation fee.

First, in step #150, the translation fee calculator 31 acquires the identification information of the information Din for the translation section 10 to start the processing, such as the data classifications "1" to "3".

Subsequently, in step #151, the translation fee calculator 31 acquires the translation related contract information concerning the information Din from the identification information of the information Din (e.g., the data classifications "1" to "3") via the translation related contract information storage 30.

Next in step #152, the translation fee calculator 31 acquires data concerning actual translation achievement, such as the number of startups of the section involved in the fee required for the translation, required time, size of input data/information, and size of the information Dout obtained as the translation result.

Next in step #153, the translation fee calculator 31 updates various total sums of the data concerning the actual translation achievement.

Next in step #154, the translation fee calculator 31 calculates the counter value/price from the counter value/price calculation standard of the translation related contract information stored in the translation related contract information storage 30, data concerning the translation and pattern.

Calculation of the use fee of the translation method dictionary will next be described.

The translation method dictionary use fee calculator 32 prepares data concerning calculation in accordance with the use situation of the translation method dictionary stored in the translation method dictionary storage 11.

The standard of the counter value/price calculation includes a unit price concerning the number of accesses, unit price of the data size in which the translation method is described, unit price based on the content of the translation method, and unit price of the use time or period during the using of the translation method dictionary.

Figure 40:
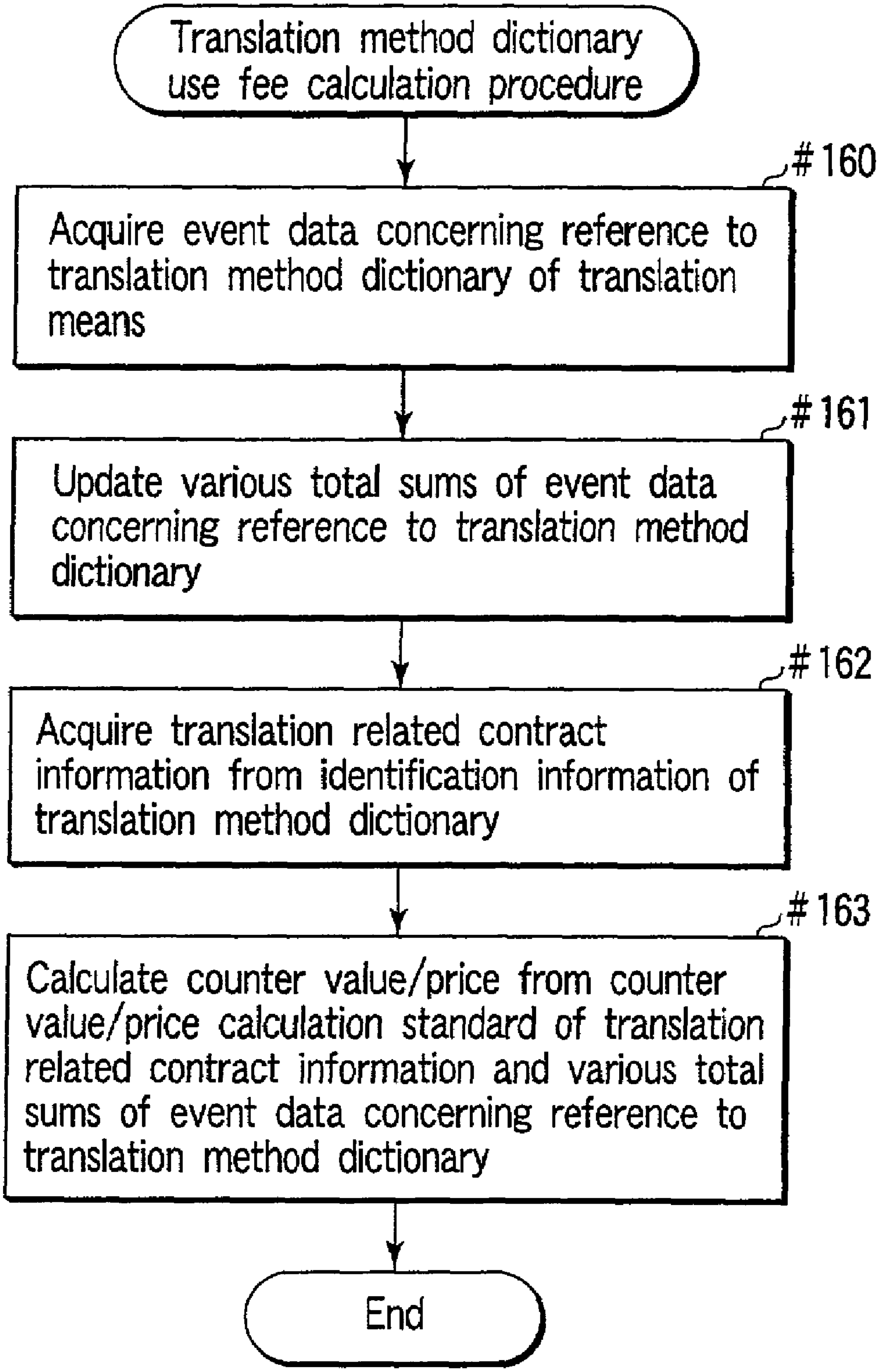
FIG. 40 is a flowchart of a procedure of translation method dictionary use fee calculation.

Concretely, the translation method dictionary use fee calculator 32 executes the flowchart of the procedure of a translation method dictionary use fee calculation processing shown in FIG. 40 and calculates the use fee of the translation method dictionary.

First, in step #160, the translation method dictionary use fee calculator 32 acquires event data concerning the reference to the translation method dictionary.

Next in step #161, the translation method dictionary use fee calculator 32 updates various total sums of the event data concerning the reference to the translation method dictionary.

Next in step #162, the translation method dictionary use fee calculator 32 acquires the translation related contract information from the identification information of the translation method dictionary.

Next in step #163, the translation method dictionary use fee calculator 32 calculates the counter value/price from the counter value/price calculation standard of the translation related contract information and various total sums of the event data concerning the reference to the translation method is dictionary.

The calculation of a modification fee of the translation method dictionary will next be described.

The translation method dictionary modification fee calculator 33 prepares counter value data in accordance with the situation to modify the translation method dictionary stored in the translation method dictionary storage 11.

The standard of the counter value/price calculation includes the unit price concerning the number of accesses, unit price of the data size transmitted for the modification of the translation method, unit price based on the modification content of the translation method, and unit price of the use time or period during the modifying of the translation method dictionary.

Concretely, the translation method dictionary modification fee calculator 33 executes the flowchart of the procedure of a translation method dictionary modification fee calculation processing shown in FIG. 41 and calculates the modification fee of the translation method dictionary.

First in step #170, the translation method dictionary modification fee calculator 33 acquires the data concerning the modified content of the translation method dictionary stored in the translation method dictionary storage 11 by the translation method dictionary modification/consolidation section 17.

Next in step #171, the translation method dictionary modification fee calculator 33 updates various total sums of the data concerning the modification of the translation method dictionary.

Next in step #172, the translation method dictionary modification fee calculator 33 acquires the translation related contract information stored in the translation related contract information storage 30 from the identification information concerning the modified portion of the translation method dictionary.

Next in step #173, the translation method dictionary modification fee calculator 33 calculates the counter value/price from the counter value/price calculation standard of the translation related contract information and various total sums of the data concerning the modification of the translation method dictionary.

The calculation of the data/information definition dictionary use fee will next be described.

The data/information definition dictionary use fee calculator 34 prepares the data concerning the counter value in accordance with the use situation of the data/information definition dictionary stored in the data/information definition dictionary storage 12.

The standard of the counter value/price calculation includes the unit price concerning the number of accesses, unit price of the data size in which the data/information definition is described, unit price based on the content of the data/information definition, and unit price of the use time or period during the using of the data/information definition dictionary.

Concretely, the data/information definition dictionary use fee calculator 34 executes the flowchart of the procedure of a data/information definition dictionary use fee calculation shown in FIG. 42 and calculates the use fee of the data/information definition dictionary.

First, in step #180, the data/information definition dictionary use fee calculator 34 acquires the event data concerning the translated information Dout and the reference to the data/information definition dictionary stored in the data/information definition dictionary storage 12.

Next in step #181, the data/information definition dictionary use fee calculator 34 updates various total sums of the information Din and event data concerning the reference to the data/information definition dictionary.

Next in step #182, the data/information definition dictionary use fee calculator 34 acquires the translation related contract information stored in the translation related contract information storage 30 from the identification information of the information Din.

Next in step #183, the data/information definition dictionary use fee calculator 34 calculates the counter value/price from the counter value/price calculation standard of the translation related contract information and various total sums of the event data concerning the reference to the data/information definition dictionary.

The calculation of the modification fee of the data/information definition dictionary will next be described.

The data/information definition dictionary modification fee calculator 35 prepares the counter value data in accordance with the situation to modify the data/information definition dictionary stored in the data/information definition dictionary storage 12.

The standard of the counter value/price calculation includes the unit price concerning the number of accesses, unit price of the data size transmitted for the modification of the data/information definition, unit price based on the modified content of the data/information definition, and unit price of the use time or period during the modifying of the data/information definition dictionary.

Figure 43:
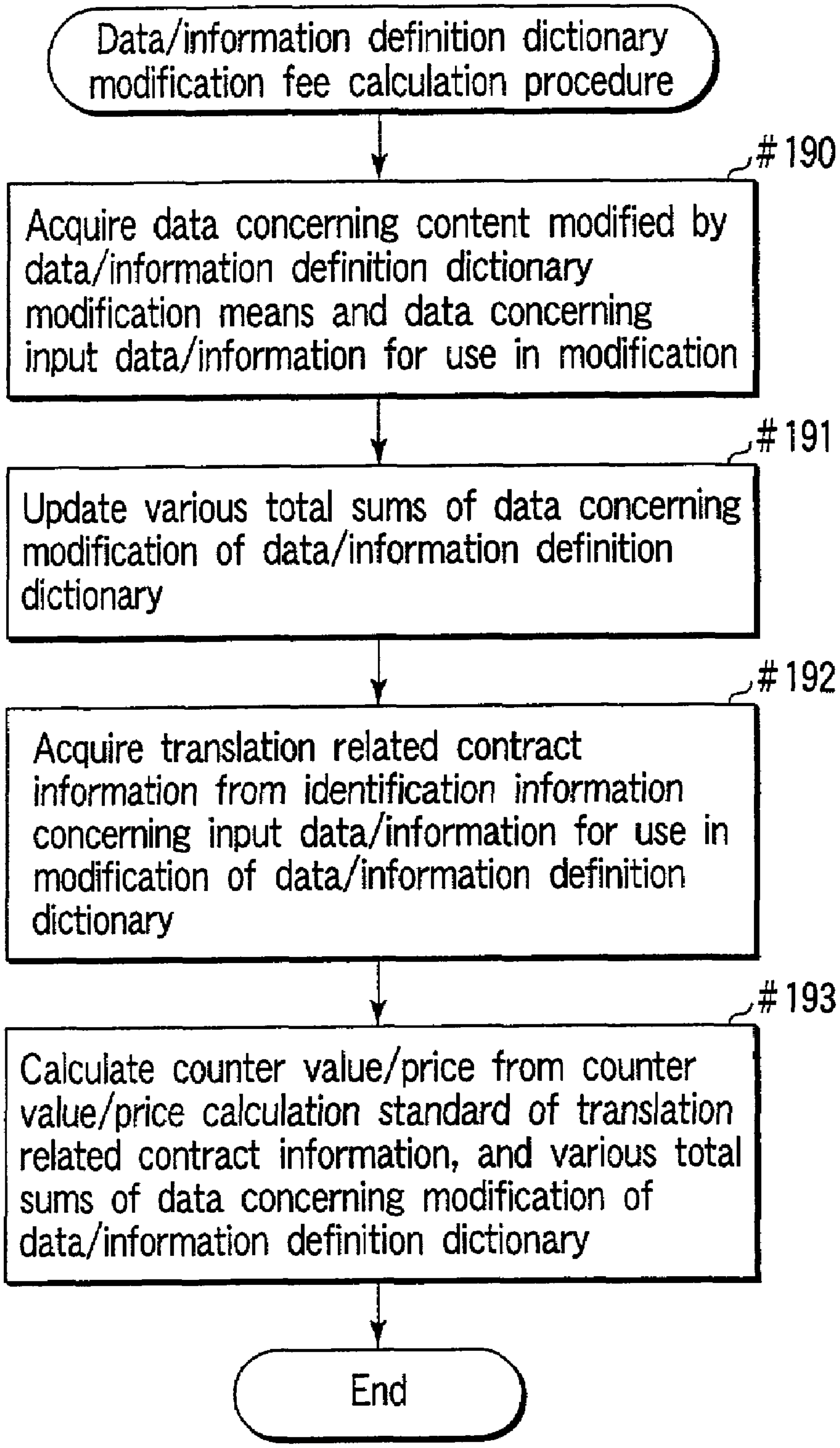
FIG. 43 is a flowchart of the procedure of data/information definition dictionary modification fee calculation.

Concretely, the data/information definition dictionary modification fee calculator 35 executes the flowchart of the procedure of a data/information definition dictionary modification fee calculation shown in FIG. 43 and calculates the modification fee of the data/information definition dictionary.

First in step #190, the data/information definition dictionary modification fee calculator 35 acquires the data concerning the content of the data/information definition dictionary modified by the data/information definition dictionary modification section 21 and information Din for use in the modification.

Next in step #191, the data/information definition dictionary modification fee calculator 35 updates various total sums of the data concerning the modification of the data/information definition dictionary.

Next in step #192, the data/information definition dictionary modification fee calculator 35 acquires the translation related contract information stored in the translation related contract information storage 30 from the identification information concerning the information Din for use in modifying the data/information definition dictionary.

Next in step #193, the data/information definition dictionary modification fee calculator 35 calculates the counter value/price from the counter value/price calculation standard of the translation related contract information and various total sums of the data concerning the modification of the data/information definition dictionary.

The calculation of a translated/collected data/information storage/maintenance fee will next be described.

The translated/collected data/information storage/maintenance fee calculator 27 prepares the data concerning the calculation in accordance with the use situation of the information stored in the translated/collected data/information storage related contract information storage 36.

Moreover, the translated/collected data/information storage/maintenance fee calculator 27 also calculates the counter value/price based on the service information concerning the freshness maintenance of the information.

Figure 44:
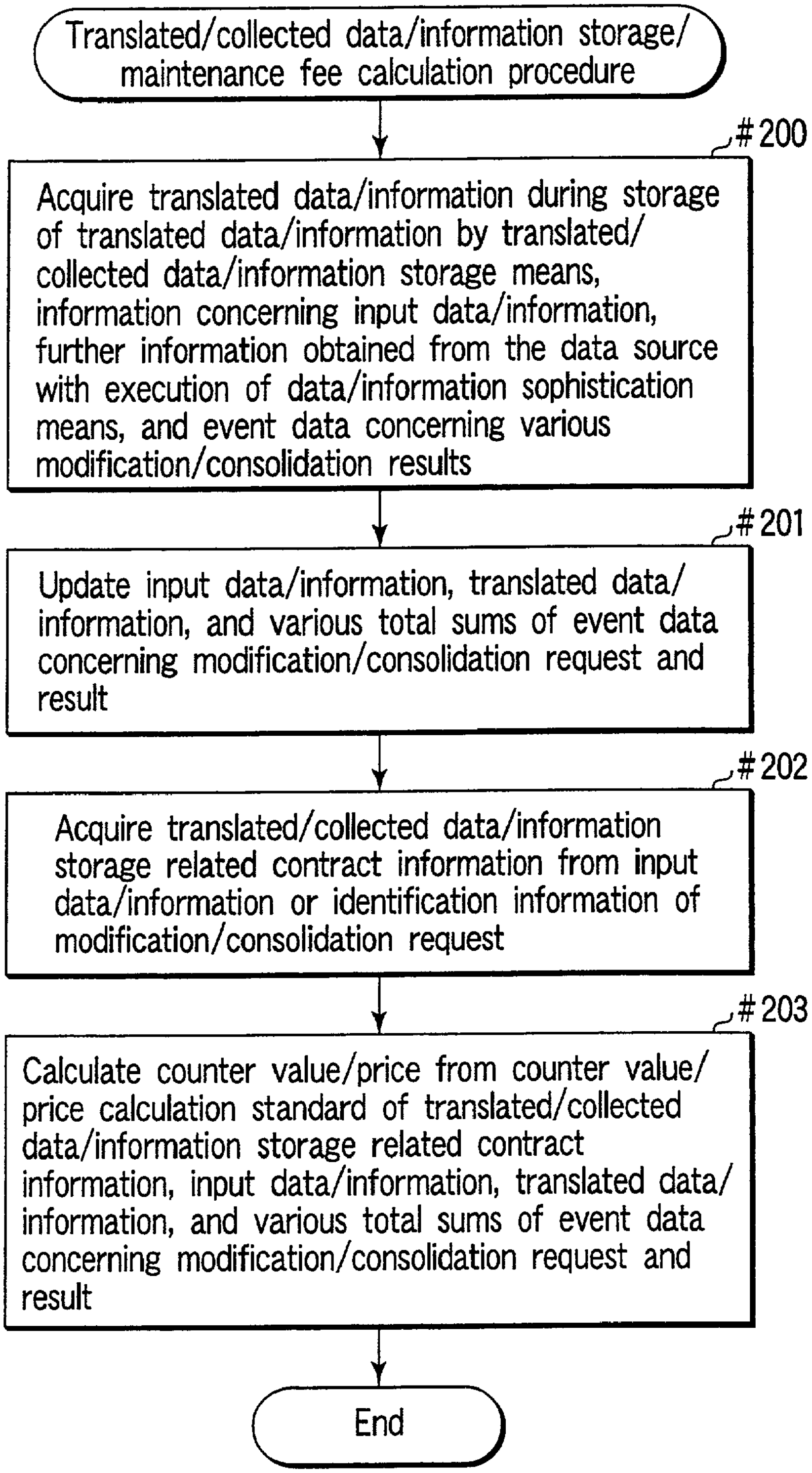
FIG. 44 is a flowchart showing a procedure of a translated/collected data/information storage/maintenance fee calculation processing.

Concretely, the translated/collected data/information storage/maintenance fee calculator 27 executes the flowchart showing the procedure of a translated/collected data/information storage/maintenance fee calculation processing shown in FIG. 44 and calculates the translated/collected data/information storage/maintenance fee.

First in step #200, the translated/collected data/information storage/maintenance fee calculator 27 acquires information concerning the information Dout and Din stored in the translated/collected data/information storage 24, information obtained from the data source with the execution of the data/information sophistication section 26, and event data concerning various modification/consolidation results.

Next in step #201, the translated/collected data/information storage/maintenance fee calculator 27 updates the information Din, translated information Dout, and various results of the event data concerning a modification/consolidation request and result.

Next in step #202, the translated/collected data/information storage/maintenance fee calculator 27 acquires translated/collected data/information storage related contract information from the information Din or the identification information of the modification/consolidation request.

Next in step #203, the translated/collected data/information storage/maintenance fee calculator 27 calculates the counter value/price from the counter value/price calculation standard of the translated/collected data/information storage related contract information, input information Din, translated information Dout, and various total sums of the event data concerning the modification/consolidation request and result.

The calculation of a translated/collected data/information disclosure inquiry response fee will next be described.

The translated/collected data/information disclosure inquiry response fee calculator 39 calculates the counter value/price based on various uses of the translated/collected data via the data/information disclosure section 25.

The calculation standard of the counter value/price sets the unit price based on the amount of information Dout and the type of processing in a time of disclosure, and the unit price based on the use time or period.

The translated/collected data/information disclosure inquiry response fee calculator 39 sets the fee structure based on the disclosed content, and items associated with the setting of use environment as to whether or not to display the advertisement.

For example, a case in which the advertisement may be displayed is set to be more inexpensive than a case in which the display of advertisement is rejected. In this manner, the setting is differentiated.

Figure 45:
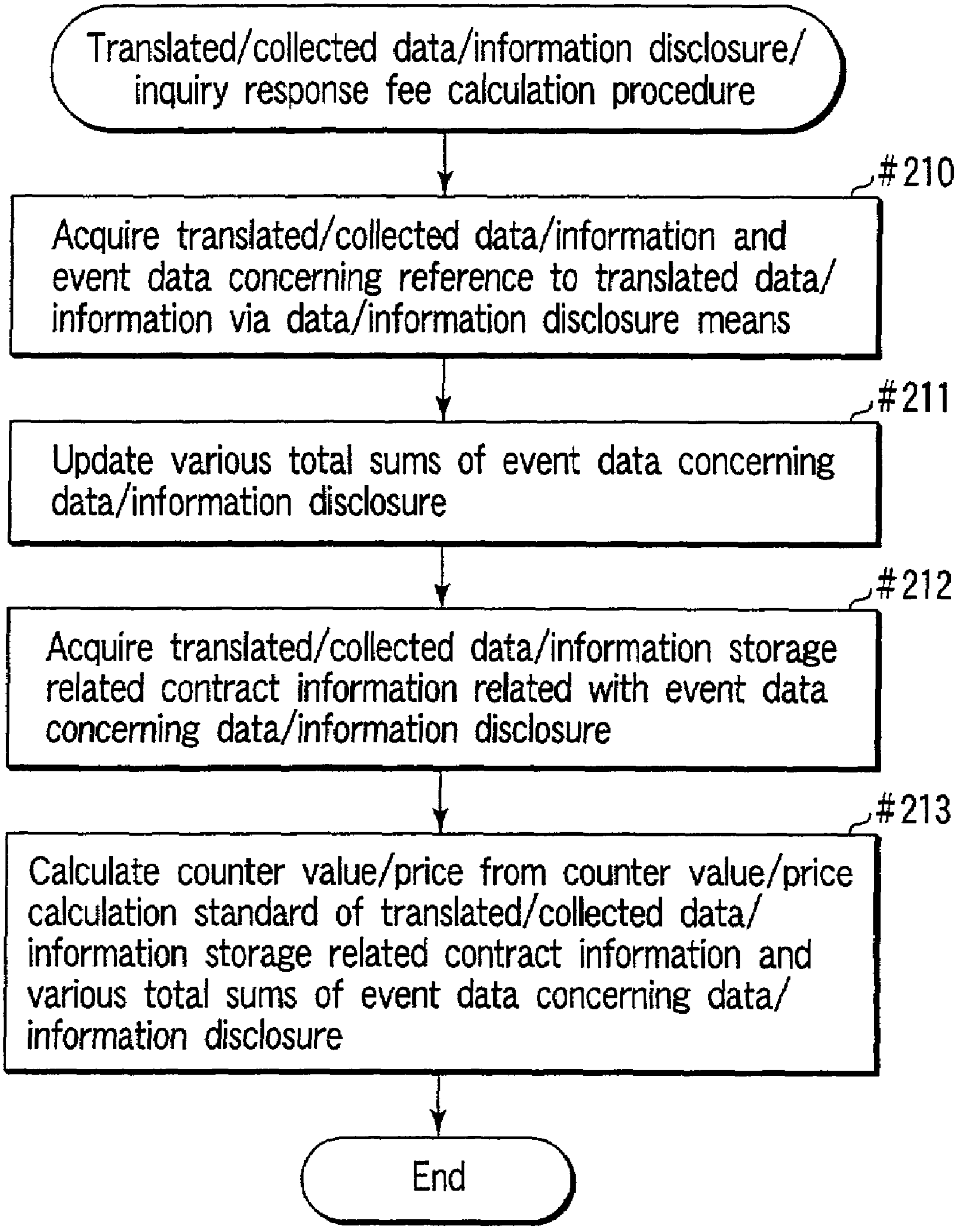
FIG. 45 is a flowchart showing a procedure of translated/collected data/information disclosure inquiry response fee calculation.

Concretely, the translated/collected data/information disclosure inquiry response fee calculator 39 executes the flowchart of procedure of a translated/collected data/information disclosure inquiry response fee calculation shown in FIG. 45, and calculates the translated/collected data/information disclosure inquiry response fee.

First, in step #210, the translated/collected data/information disclosure inquiry response fee calculator 39 acquires the event data concerning the reference to the translated/collected data/information and translated information Dout via the data/information disclosure section 25.

Next in step #211, the translated/collected data/information disclosure inquiry response fee calculator 39 updates various total sums of the event data concerning the data/information disclosure.

Next in step #212, the translated/collected data/information disclosure inquiry response fee calculator 39 acquires translated/collected data/information storage related contract information related with the event data concerning the data/information disclosure.

Next in step #213, the translated/collected data/information disclosure inquiry response fee calculator 39 calculates the counter value/price from the counter value/price calculation standard of the translated/collected data/information storage related contract information and various total sums of the event data concerning the information disclosure.

The calculation of an advertisement fee will next be described.

The advertisement fee calculator 40 prepared the information concerning the counter value based on disclosure situations such as the data useful for advertisement and link information for obtaining the data useful for advertisement during the transmitting/receiving of the information using the data/information disclosure section 25.

The calculation standards of the counter value/price are used such as the unit price based on the type of the data useful for the advertisement, number of disclosures of advertisement data, disclosure frequency, disclosure destination, or arrangement of the data useful for the advertisement.

When the processing of producing the advertisement effect is performed indirectly by the disclosure method of the data/information to be disclosed, not by direct advertisement data, the calculation standards may also be disposed concerning the processing of indirectly producing the advertisement effect.

In the processing of producing the advertisement effect, various settings are differentiated such as a color, size, and type of character font in the character data.

Moreover, when the data from the data source having a specific contract in a specific place is displayed in a scroll display, a scroll is momentarily stopped, and thereby an impression to a data browsing person is strengthened.

Furthermore, when the advertisement data and information to be disclosed cooperate and the specific data is disclosed, the data from the advertisement data source having made a specific contract is displayed. Additionally, to display the specific advertisement data, a timing to disclose is adjusted so that the information having the specific contract is just disclosed.

Figure 46:
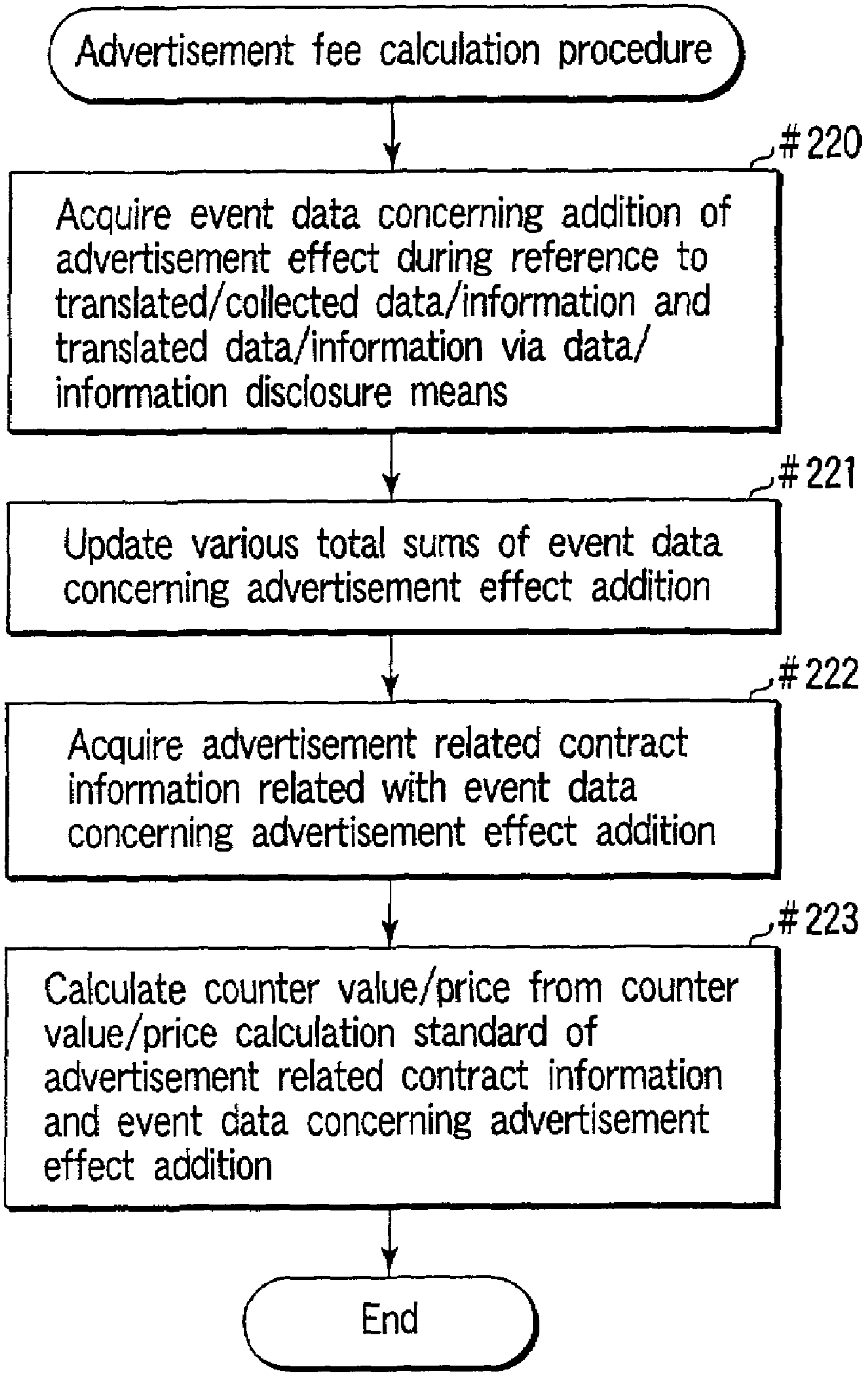
FIG. 46 is a flowchart showing a procedure of an advertisement fee calculation processing.

Concretely, the advertisement fee calculator 40 executes the flowchart showing the procedure of an advertisement fee calculation processing shown in FIG. 46 and calculates the advertisement fee.

First, in step #220, the advertisement fee calculator 40 acquires the event data concerning the addition of the advertisement effect of the time of reference to the translated/collected data/information and translated information Dout via the data/information disclosure section 25.

Next in step #221, the advertisement fee calculator 40 updates various total sums of the event data concerning the addition to the advertisement effect.

Next in step #222, the advertisement fee calculator 40 acquires the advertisement related contract information related with the event data concerning the addition to the advertisement effect from the advertisement related contract information storage 38.

Next in step #223, the advertisement fee calculator 40 calculates the counter value/price from the counter value/price calculation standard and various total sums of the event data concerning the addition to the advertisement effect.

As described above, in one embodiment, there is constructed a manufacturing data integrate system which obtains a plurality of pieces of information Din concerning the manufacturing managed in a plurality of manufacturing facilities in different forms, and which integrates the information Din and translate the information into the information Dout handled in common to the plurality of manufacturing facilities by the translation apparatus 1.

Thereby, in the above-described embodiment, a plurality of pieces of information Din generated by various different backgrounds such as the nation, district, race, language and development concept and represented by the independent definitions, classifications, code definitions, structures, evaluation standards, and unit systems can be translated into the common classification, code definition, structure, evaluation standard, and unit system.

Therefore, without much modifying the quality control apparatuses 5-1 to 5-n, for the information Din from the installation districts 6-1 to 6-n, the respective pieces of information Din to be originally related with one another can organically be linked and flexibly be integrated by the translation.

The information Dout as the translation result can be stored in the translated/collected data/information storage 24 and disclosed through the data/information disclosure section 25. That is, the information Dout as the translation result can be displayed/outputted to the display or transmitted to the quality control apparatuses 5-1 to 5-n of the installation districts 6-1 to 6-n through the Internet 3 from the translation apparatus 1.

The quality control apparatuses 5-1 to 5-n can read the information Dout as the translation result with respect to the translation apparatus 1.

In this case, even when the information Din as the translation object momentarily increases, and the definitions of the translation method and information Din daily change, the information Din can accordingly be translated.

Therefore, for example, when a defect is generated in the manufacturing facility in the installation district 6-1, the defect information Din is translated in the translation apparatus 1, the information Dout as the translation result is accumulated and disclosed. Thereby, in the manufacturing facilities of the other installation districts 6-2 to 6-n, the defect information Dout generated in the manufacturing facility of the installation district 6-1 can be shared, and countermeasure can be taken beforehand based on the defect information Dout against the defect generation in each manufacturing facility.

On the other hand, the translation apparatus 1 translates the information Din based on the translation method of the translation method dictionary stored in the translation method dictionary storage 11, and with reference to the data/information definition dictionary stored in the data/information definition dictionary storage 12 if necessary, and outputs the information Dout as the translation result.

Thereby, the plurality of pieces of information Din represented by the independent definitions, and independent classifications, code definitions, structures, evaluation standards and unit systems can automatically be translated into the common classification, code definition, structure, evaluation standard and unit system.

The translation apparatus 1 can be used not only in translating a plurality of pieces of information Din into the information Dout having the common format, but also in translating one piece of information Din into the information Dout having a desired format.

The information Din includes either one or both of translation method dictionary modification information $D_1$ for modifying the translation method dictionary, and data/information definition dictionary modification information $D_2$.

Thereby, when the translation method dictionary and data/information definition dictionary are modified based on the information $D_1$, $D_2$, the information Din as the translation object momentarily increases. Moreover, even when the definitions of the translation method and information Din daily change, the information Din can be translated in accordance with the change.

The translation method dictionary modification/consolidation section 17 is disposed. Therefore, when the information Din concerning the modification of the translation method dictionary stored in the translation method dictionary storage 11 is obtained in the process of translation of the information Din, the translation method dictionary can be modified based on the modification information.

The data/information definition dictionary modification/consolidation section 23 is disposed. Therefore, when the information Din concerning the modification of the data/information definition dictionary stored in the data/information definition dictionary storage 12 is obtained in the process of translation of the information Din, the data/information definition dictionary can be modified based on the modification information.

Since the translation section 10 includes the translation method dictionary modification/consolidation section 17, data/information separation section 18, data/information associating section 19, data/information integrate section 20, data/information definition dictionary modification section 21, data/information consolidation section 22, and data/information definition dictionary modification/consolidation section 23, the translation function is expanded.

Since the data/information sophistication section 26 is disposed, the freshness of the information Dout stored in the translated/collected data/information storage 24 is monitored. With the information Dout whose freshness has dropped, the supplier of the information Dout having the freshness drop is notified of the freshness drop, and the information can be handled.

Since the data/information sophistication section 26 is disposed, it is possible to modify the value of the information Dout stored in the translated/collected data/information storage 24 based on the interchange with the information source, to modify the translation method dictionary stored in the translation method dictionary storage 11 and data/information definition dictionary stored in the data/information definition dictionary storage 12, and to judge the freshness of the translation method dictionary stored in the translation method dictionary storage 11 and data/information definition dictionary stored in the data/information definition dictionary storage 12.

When the data/information disclosure section 25 reads the information Dout stored in the translated/collected data/information storage 24 and displays the information in the display, the section totals and classifies the plurality of pieces of information Dout. For example, the section can classify, total and display the plurality of pieces of information Dout by the classifications of the data, product, part, phenomenon, treatment, step and transmitter.

The totaling and classifying of the information Dout can also be performed with respect to the information of the quality control apparatuses 5-1 to 5-n installed in the installation districts 6-1 to 6-n.

On the other hand, when the translation apparatus 1 obtains a plurality of pieces of information Din concerning the manufacturing managed in different formats in a plurality of manufacturing facilities, integrates the information Din and translates the information into the information Dout to be handled in common in a plurality of manufacturing facilities, a quantitative additional value and counter value can be obtained with respect to the translation operation.

Concretely, the translation fee calculator 31 can calculate the data concerning the counter value to the translation processing in accordance with the use situation of the translation section 10. In this case, the data concerning the counter value can be calculated using the information described in the translation related contract information and including the access right to the translation section 10 and standard of the counter value/price calculation.

Examples of the information of the standards of counter value/price calculation include the amount of the data/information Din to translate, the startup unit price and use time unit price of various sections started by the translation section 10 during the translation operation, and the time or period unit price of the translation service.

In the calculation of the data concerning the counter value, the calculation method of the counter value/price, charging destination, and bill collection method can be changed.

For the translation fee, the fees not only of the translation operation of the translation section 10 but also of the operation related with the translation operation can be added.

That is, for the translation fee, the translation method dictionary use fee calculator 32 can prepare the counter value data in accordance with the use situation of the translation method dictionary stored in the translation method dictionary storage 11.

In this case, the standards of the counter value/price calculation include the unit price concerning the number of accesses during the using of the translation method dictionary, unit price of the data size in which the translation method is described, unit price based on the content of the translation method, and unit price of the use time or period.

Since the translation method dictionary modification fee calculator 33 is disposed, the counter value data can be prepared in accordance with the situation for modifying the translation method dictionary stored in the translation method dictionary storage 11.

In this case, the standards of the counter value/price calculation include the unit price concerning the number of accesses during the modifying of the translation method dictionary, unit price of the data size transmitted for the modification of the translation method, unit price based on the modified content of the translation method, and unit price of the use time or period.

Since the data/information definition dictionary use fee calculator 34 is disposed, the data concerning the counter value data can be prepared in accordance with the situation for using the data/information definition dictionary stored in the data/information definition dictionary storage 12.

In this case, the standards of the counter value/price calculation include the unit price concerning the number of accesses during the using of the data/information definition dictionary, unit price of the data size in which the data/information definition is described, unit price based on the content of the data/information definition, and unit price of the use time or period.

Since the data/information definition dictionary modification fee calculator 35 is disposed, the counter value data can be prepared in accordance with the situation for modifying the data/information definition dictionary stored in the data/information definition dictionary storage 12.

In this case, the standards of the counter value/price calculation include the unit price concerning the number of accesses during the modifying of the data/information definition dictionary, unit price of the data size transmitted for the modification of the data/information definition, unit price based on the modified content of the data/information definition, and unit price of the use time or period.

The disposed translated/collected data/information storage/maintenance fee calculator 27 can detect the use situation of the information Dout stored in the translated/collected data/information storage 24, and calculate the storage/maintenance fee of the information Dout based on the use situation and the translated/collected data/information storage related contract information stored in the translated/collected data/information storage related contract information storage 36.

The disposed translated/collected data/information storage/maintenance fee calculator 27 can receive the service information concerning the freshness maintenance of the information Dout upon a request by the data/information sophistication section 26, and calculate based on the service information and the translated/collected data/information storage related contract information stored in the translated/collected data/information storage related contract information storage 36.

Since the translated/collected data/information disclosure inquiry response fee calculator 39 is disposed, it is possible to calculate the counter value/price based on various uses of the translated/collected data via the data/information disclosure section 25.

In this case, the calculation standards of the counter value/price include the amount of data/information, the unit price based on the type of processing in the time of disclosure, and the unit price based on the use time or period.

The translated/collected data/information disclosure inquiry response fee calculator 39 sets the fee system in accordance with the disclosed content of the data/information Dout and the items concerning the setting of use environment as to whether or not to display the advertisement. For example, the case in which the advertisement may be displayed is set to be inexpensive and is otherwise differentiated from the case in which the display of the advertisement is rejected.

Since the advertisement fee calculator 40 is disposed, it is possible to prepare the information concerning the counter value such as the data useful for the advertisement and the link information for obtaining the data useful for the advertisement during the transmitting/receiving of the information Dout using the data/information disclosure section 25 based on the disclosure situation.

In this case, the calculation standards of the counter value/price are used such as the unit prices based on the type of the data useful for the advertisement, number of disclosures of advertisement data, disclosure frequency, disclosure destination, or arrangement of the data useful for the advertisement.

Moreover, when the processing of producing the advertisement effect is performed indirectly by the disclosure method of the data/information to disclose, not by the direct advertisement data, the calculation standards concerning the processing of indirectly producing the advertisement effect can be disposed.

Additionally, the present invention is not limited to the above-described embodiment, and can variously be modified.

For example, there is provided a program for the translation apparatus 1 to obtain a plurality of pieces of information Din concerning the manufacturing managed in the plurality of quality control apparatuses 5-1 to 5-n in mutually different forms, integrate the information Din and translate the information into the information Dout handled in common in the plurality of quality control apparatuses 5-1 to 5-n.

The program for translation can be recorded in storage mediums such as a floppy disk, optical magnetic disk, CD-ROM, CD-R, CD-RW, and hard disk drive.

Each processing section disposed in the translation apparatus 1 does not have to necessarily exist in the same program, system, calculator, site, country or district. Each processing section may only communicate data/information, control signals, various messages, and the like if necessary.

The case has been described above in which a plurality of pieces of information Din managed in a plurality of quality control apparatuses 5-1 to 5-n in mutually different formats are translated. However, needless to say, the information as the translation object can also be applied to the translation of the information of each technical field.

The information may be collected not only using the Internet 3 but also other communication sections such as radio communication.

Emergency information may be inputted and sent to the quality control apparatuses 5-1 to 5-n through the Internet 3.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A translation apparatus comprising:

a translation section which integrates a plurality of pieces of first information described in mutually different formats, and translates said plurality of pieces of first information into second information which is to be handled in common;

a translation method dictionary storing section which stores a translation method dictionary to translate at least said first information; and a data/information definition dictionary storing section which stores a correspondence between a representing format of said first information and a representing format of said second information, wherein said translation section includes:

a translation method dictionary interpretation section which applies said translation method dictionary to translation processing;

a data/information definition referring section which refers to said data/information definition dictionary;

a data/information generation section which sets said first information in the different formats to be in common based on said translation method dictionary and said data/information definition dictionary and prepares said second information; and a data/information calculation section which applies various types of calculation processing to said first information in the different formats if necessary;

a translation method dictionary modification/consolidation section which modifies said translation method dictionary based on said first information when first information concerning a modification of said translation method dictionary is obtained in a process of translation of said first information;

a data/information separation section which prepares division information and adds the division information to said second information when it is necessary to divide a content of said first information and prepare a plurality of pieces of division information in the process of translation of said first information;

a data/information associating section which prepares related information to prepare a relation and adds said related information to said second information when the relation is generated among a plurality of pieces of second information, and between the pieces of second information and said second information already obtained in the process of translation of said first information;

a data/information integrate section which acquires second information from said second information already obtained and collected and integrates the acquired second information with said second information in the process of translation of said first information;

a data/information modification section which prepares modification information to modify said second information and adds said modification information to said second information when it is necessary to modify said second information already obtained in the process of translation of said first information;

a data/information consolidation section which adds consolidation information to consolidate said second information based on consolidation data/information concerning a consolidation of said second information already obtained, to said second information when the consolidation data/information is obtained in the process of translation of said first information; and a data/information definition dictionary modification/consolidation section which modifies said data/information definition dictionary based on said first information when first information concerning a modification of said data/information definition dictionary is obtained in the process of translation of said first information.

* * * * *